(12) United States Patent
Jannson et al.

(10) Patent No.: US 9,689,987 B1
(45) Date of Patent: Jun. 27, 2017

(54) INTEGRATIVE OPTICS SYSTEM, DEVICE, AND METHOD

(71) Applicant: Physical Optics Corporation, Torrance, CA (US)

(72) Inventors: Tomasz Jannson, Torrance, CA (US); Ranjit Pradhan, Torrance, CA (US); Andrew Kostrzewski, Garden Grove, CA (US)

(73) Assignee: Physical Optics Corporation, Torrance, CA (US)

( * ) Notice: Subject to any disclaimer, the term of this patent is extended or adjusted under 35 U.S.C. 154(b) by 734 days.

(21) Appl. No.: 13/913,090

(22) Filed: Jun. 7, 2013

Related U.S. Application Data

(60) Provisional application No. 61/659,348, filed on Jun. 13, 2012, provisional application No. 61/675,256, filed on Jul. 24, 2012, provisional application No. 61/718,154, filed on Oct. 24, 2012.

(51) Int. Cl.
*H04N 13/00* (2006.01)
*G01S 17/66* (2006.01)

(52) U.S. Cl.
CPC .................................. *G01S 17/66* (2013.01)

(58) Field of Classification Search
CPC .......... G01B 11/16; G02B 27/46; G01S 17/66
USPC ............................... 250/550; 73/800; 348/44
See application file for complete search history.

(56) References Cited

U.S. PATENT DOCUMENTS

| 6,081,605 | A | * | 6/2000 | Roth | .................. | G06K 9/40 |
| | | | | | | 382/103 |
| 2006/0095207 | A1 | * | 5/2006 | Reid | .................. | G01S 11/12 |
| | | | | | | 701/301 |
| 2007/0116607 | A1 | * | 5/2007 | Wang | .............. | B01L 3/502715 |
| | | | | | | 422/83 |
| 2011/0026389 | A1 | * | 2/2011 | Nagatomi | .......... | G11B 7/0909 |
| | | | | | | 369/112.03 |
| 2015/0296193 | A1 | * | 10/2015 | Cote | .................. | H04N 9/646 |
| | | | | | | 382/167 |

* cited by examiner

*Primary Examiner* — Thai Tran
*Assistant Examiner* — Mishawn Hunter
(74) *Attorney, Agent, or Firm* — Sheppard, Mullin, Richter & Hampton LLP

(57) ABSTRACT

A laser is used to emit a diverging laser flash configured to illuminate a detection zone. A pseudoimaging optical receiver system is used to detect reflections from objects in the detection zone. The receiver system includes a time-gated photodetector array that is used to record signatures in a voxel array. A voxel processing module receives the voxel array and detects a reference clutter signal within the array. Potential targets are then detected according to target signals in relation to the reference clutter signal.

13 Claims, 35 Drawing Sheets

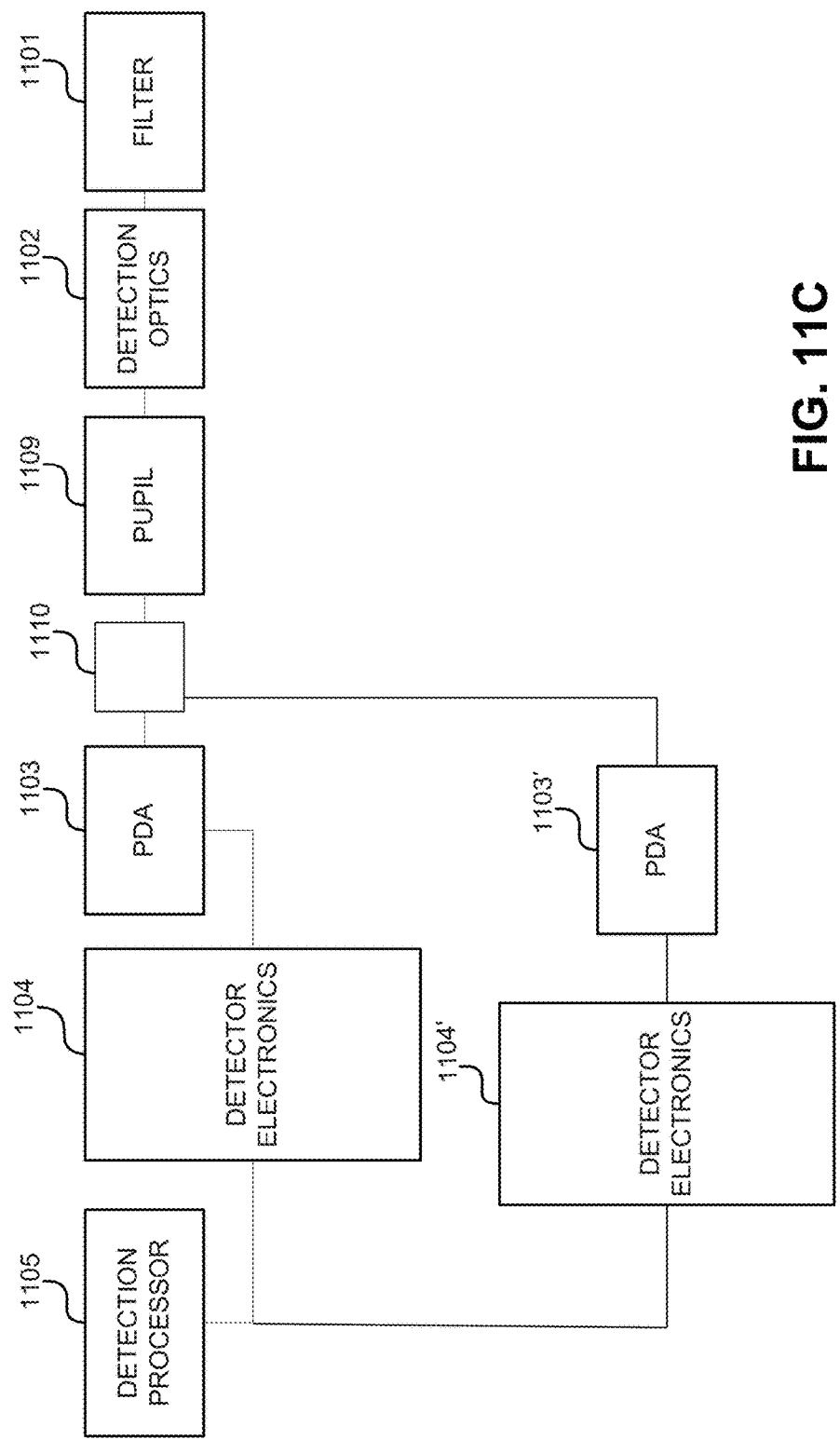

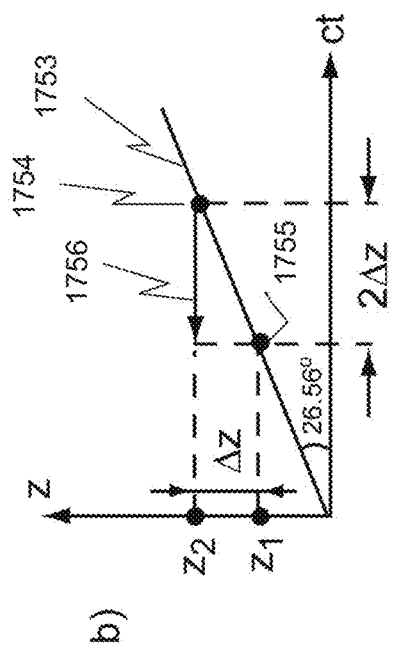
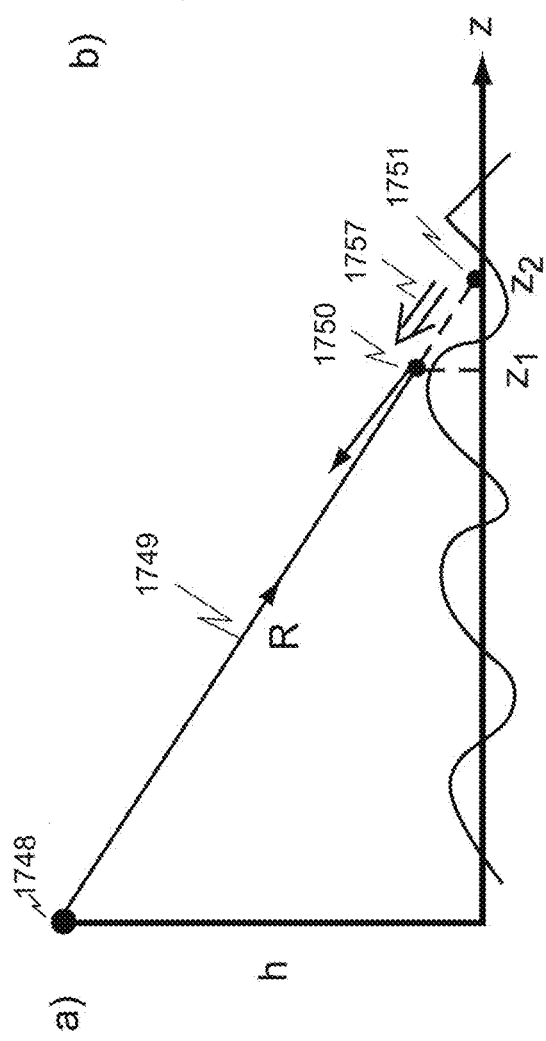
FIG. 17B
FIG. 17A

INTEGRATIVE OPTICS SYSTEM, DEVICE, AND METHOD

CROSS-REFERENCE TO RELATED APPLICATIONS

This application claims the benefit of U.S. Provisional Application No. 61/659,348, filed Jun. 13, 2012; U.S. Provisional Application No. 61/675,256, filed Jul. 24, 2012; and U.S. Provisional Application No. 61/718,154, filed Oct. 24, 2012, which are hereby incorporated herein by reference in their entireties.

STATEMENT OF GOVERNMENT RIGHTS

One or more inventions described herein are partially supported by the following contracts for the Department of Navy under the SBIR program: M67854-10-C-6531, N00024-06-C-4121, N00014-09-C-0456, and N00014-05-C-0423. The Government may have partial rights in such inventions.

TECHNICAL FIELD

The present invention relates generally to object detection systems, and more particularly, some embodiments relate to systems and methods for long distance optical detection.

DESCRIPTION OF THE RELATED ART

Clutter can cause serious performance issues in object detection systems, such as radar, LIDAR, sonar, and imaging systems. For example, in littoral environments, wave clutter can severely impede the ability of a radar system to detect objects such as periscopes.

BRIEF SUMMARY OF EMBODIMENTS OF THE INVENTION

Optical detection systems are provided for detecting objects in the presence of clutter and discriminating between target objects and clutter. In some embodiments, the system is configured for detection of high brightness objects and light sources—for example, non-Lambertian reflectors, such as retroreflectors.

In some embodiments, the system mitigates clutter in the scene by reducing false positives or increasing positive predictive values (PPV). Various signals may be used for target discrimination. For example, clutter signal patterns associated with known target types may be detected along with potential target signals. Additionally, specific target signals may be detected. For example, multiple retroreflections from a single ocular body may be detected, and the character of these multiple retrorefelections may be used for target discrimination.

In various embodiments, an eye-safe laser is used to emit a diverging laser flash configured to illuminate a detection zone. A pseudoimaging optical receiver system is used to detect reflections from objects in the detection zone. The receiver system includes a time-gated photodetector array that is used to record signatures in a voxel array. A voxel processing module receives the voxel array and detects a reference clutter signal within the array. Potential targets are then detected according to target signals in relation to the reference clutter signal.

Further embodiments of the invention use a temporal sequence of voxel-arrays from the same detection zone to implement voxel change detection. Potential target may be detected according to various temporal voxel signatures. More generally, the potential target may detected space/time voxel patterns manifested by voxel coherence.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

The present invention, in accordance with one or more various embodiments, is described in detail with reference to the following figures. The drawings are provided for purposes of illustration only and merely depict typical or example embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

Some of the figures included herein illustrate various embodiments of the invention from different viewing angles. Although the accompanying descriptive text may refer to such views as "top," "bottom" or "side" views, such references are merely descriptive and do not imply or require that the invention be implemented or used in a particular spatial orientation unless explicitly stated otherwise.

FIGS. 11A-D illustrate various laser reception systems.
FIGS. 17A-B illustrate example steps of target detection methods.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

As used herein the term "sensor" or "pixel" refers generally to an element of a sensor array. For example, the term sensor or pixel may refer to an individual photodetector of a photodetector array ("PDA"). In other cases, as indicated by context, the term "sensor" may refer to an entire sensor or pixel array.

Figure 1:
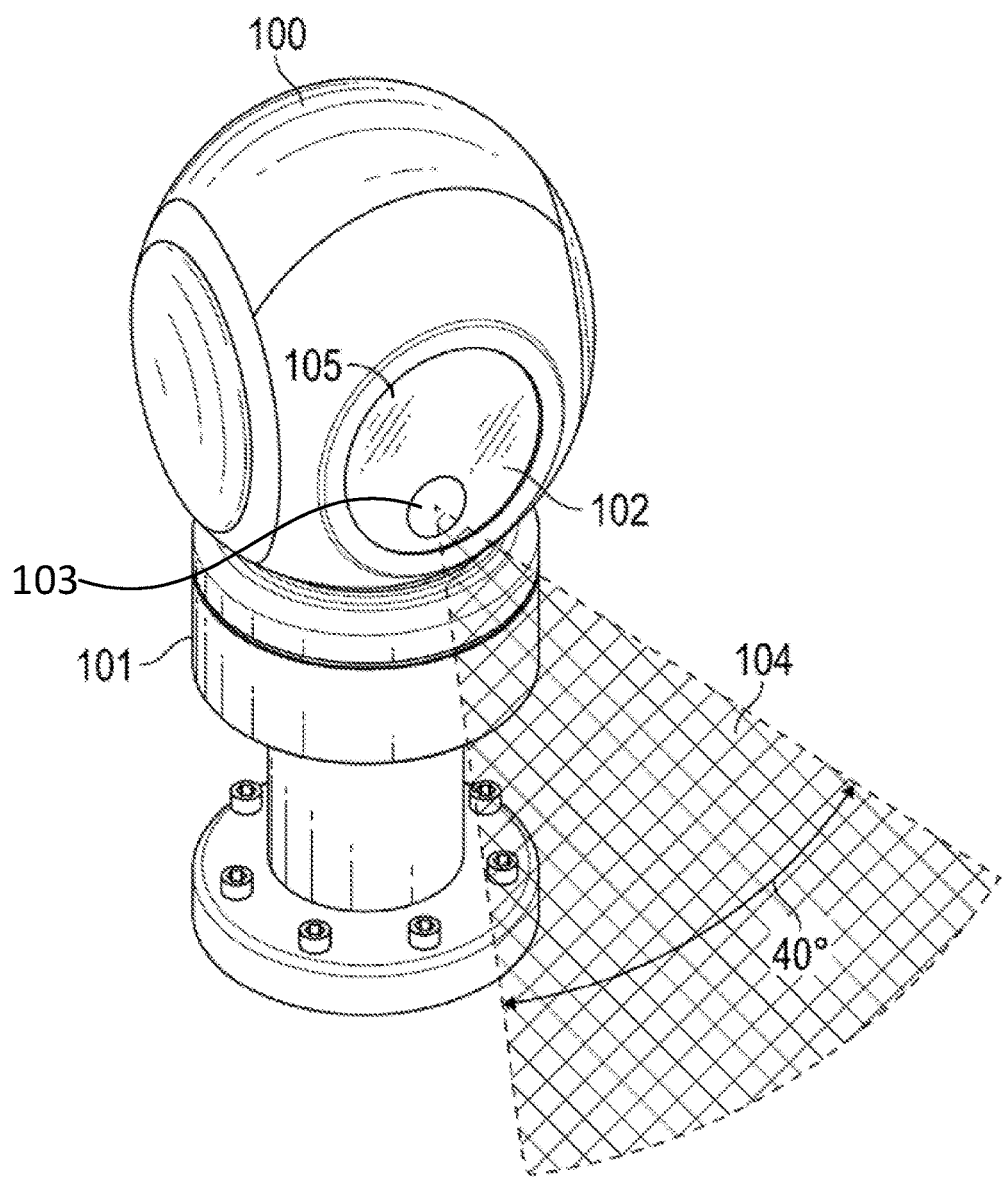
FIG. 1 illustrates an example system module.

FIG. 1 illustrates an exemplary integrative optics system. The system comprises a housing 100 mounted on a stabilized platform 101. One or more detection modules 105 are disposed within the housing. Each detection module 105 comprises a laser emitter 103 and an optical receiver 102. The module has a total field of view (FOV) 104. The total field of view is achieved by emitting flashes (or facets) that encompass a sub-range of the total field of view. The emitter 103 and the receiver 102 scan the total field of view using a plurality of facets at different angles. For example, to cover a 180° field of view, the housing may comprise 5 modules 105, each having a 40° field of view (with some overlap between fields of view). Each module 105 may emit flashes along about 100 facet angles, each flash having a 0.4° field of view. In another embodiment, the modules 105 scan to cover a plurality of views. For example, rather than 5 different modules 105 to cover a 180° field of view, a single module 105 may move to 5 different positions. For example, the stabilizing platform 101 may rotate the housing 100 to the different positions. In some embodiments, the stabilizing platform 101 rotates the housing 100 in a staccato fashion, stopping for each flash and return signal. In other embodiments, the stabilizing platform 101 smoothly rotates, and transforms are performed on the data to compensate for the rotation.

Figure 2:
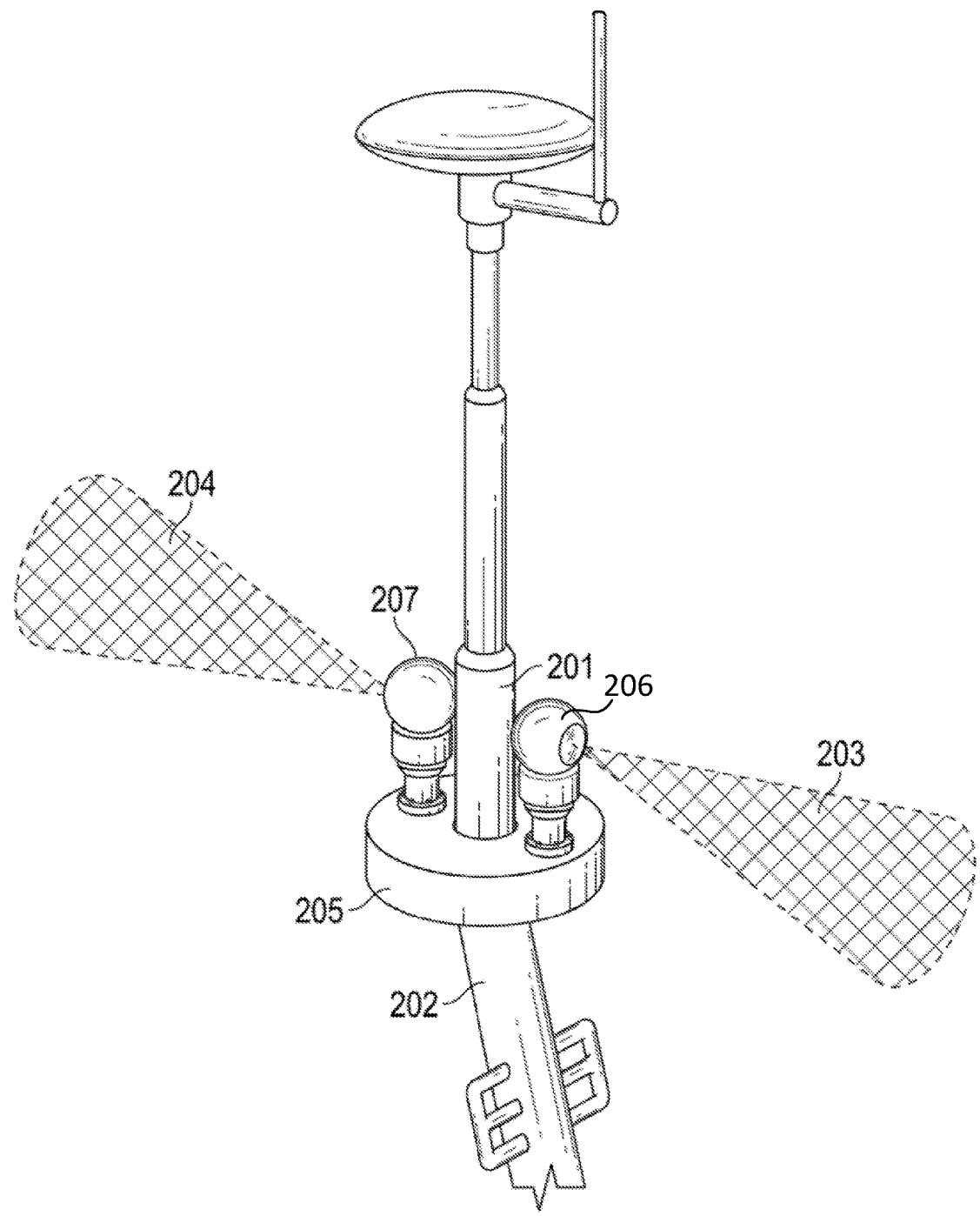
FIG. 2 illustrates an example dual-module system.

FIG. 2 illustrates a second exemplary integrative optics system. In this system, multiple housings 207, 206 may house emitters and receivers to provide additional fields of view 203, 204. In this particular implementation, the system 201 is mounted on a semi-platform 205 of a ships mast 202. In other embodiments, the system 201 may be mounted on other locations. For example, on a stationary tower (for example, on shore) or on an aircraft (for example, a helicopter).

Figure 3:
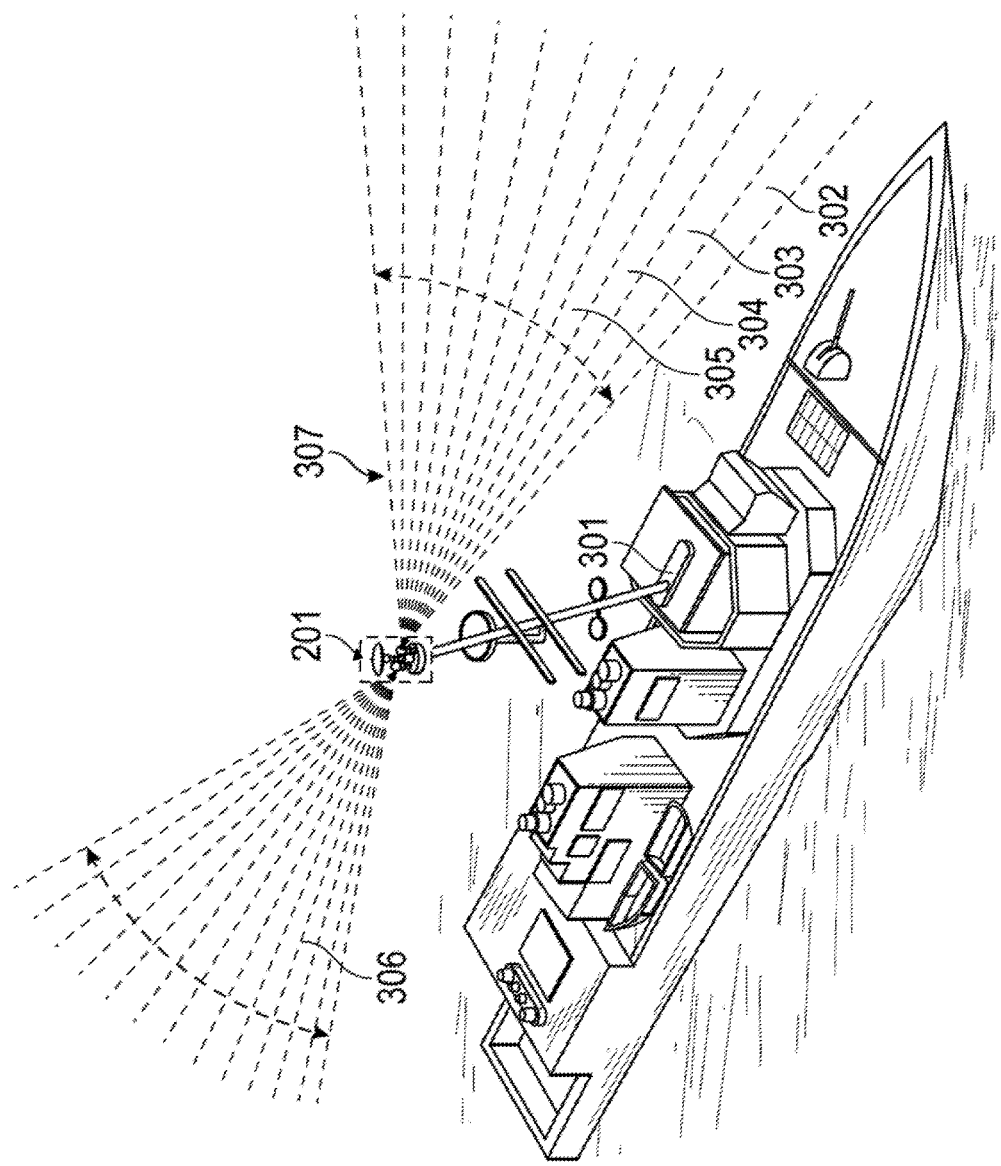
FIG. 3 illustrates an example system deployment.

FIG. 3 illustrates the system mounted on a marine platform. The FOV 307 of a detection module of the system 201 comprises a plurality of facets 302, 303, 304, 305. Each module may operate in parallel or serially with other modules to provide the full system FOV. Each facet FOV 302, 303, 304, 305 is provided by a laser flash illuminating a detection volume at a distance from the laser light emitter. In some embodiments, the detection volume is at least 3 km from the laser light emitter. In further embodiments, the laser is eye-safe, having a wavelength greater than 1.3 µm. In other embodiments, the laser has a wavelength greater than 1.5 µm. In still further embodiment, the laser is not eye-safe (for example, the laser may have a wavelength of 1 µm). In such embodiments, a baffle or other shield may be disposed between the system and operating personnel.

Figure 4A:
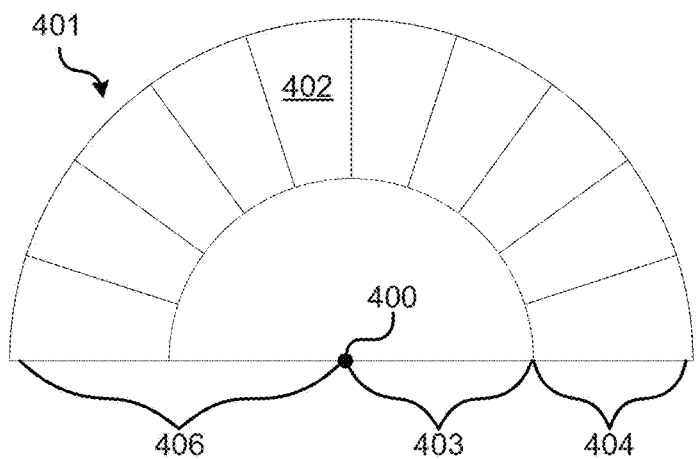
FIGS. 4A-B illustrate a top down view of the field of view and detection zone of an example system.
Figure 4B:
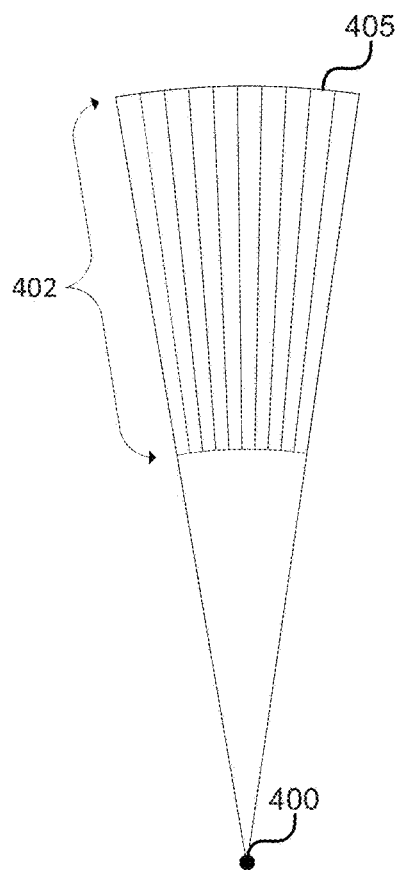

FIGS. 4A and 4B illustrate a top down view of the FOV and detection zone of an embodiment. The system 400 has a FOV 401 and is comprises of a plurality of modules. Each module has a FOV 402, which when combined provide the entire FOV 401. Each module has an inner detection radius 403 and an outer detection radius 406, to provide a detection zone 404. In some embodiments, the detection zone 404 is between an inner radius 403 between 3 and 10 km and outer radius 406 between 10 and 30 km. For example, in a particular embodiment, the detection zone 404 is between 5 km and 15 km. For single facet, its FOV=0.36°, for example, or FOV=0.00628, in radians. This is, for range of R=10 km, equivalent to horizontal range of: $10^4$ m×0.00628=62.8 m, per single facet.

In still further embodiments, the emitter 103 is optomechanically adjustable to adjust the size or range of the detection zone. Each module's FOV 402 is provided by the laser flashes 405 that illuminate a detection volume comprising a portion of the detection zone. The number of flashes 405 may vary in different implementations based on factors such as module FOV size, desired operational frequency, available laser power, available detection power, visibility, and other system or environmental factors. In one embodiment, for a detection zone between 5 km and 15 km, with each flash illuminating about 100 m at the 15 km radius, each flash has a horizontal FOV of 0.38° and a vertical FOV of 0.37°.

Figure 5:
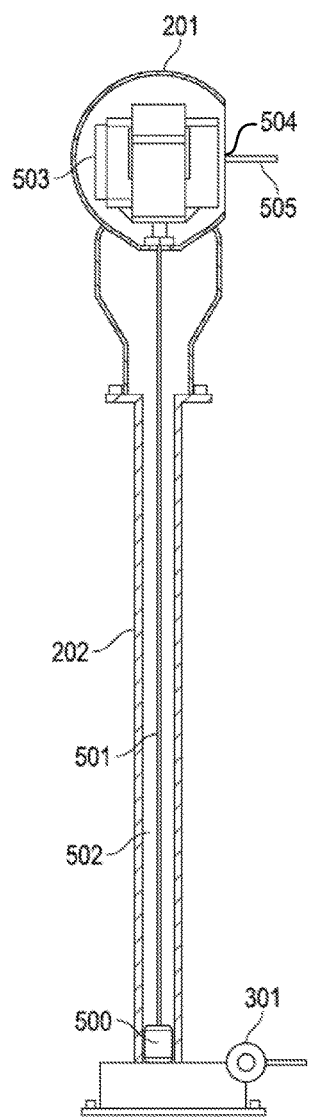
FIG. 5 illustrates an example laser source.

Returning to FIG. 3, in the illustrated embodiment, the laser is transported to the emitter in the system head 201 from a laser source proximal to the mast base 301. FIG. 5 illustrates a cross section of a system having a laser source 500 proximal to the base 301 of a mast 202. The laser source 500 emits a pulsed laser beam 501 into laser path 502. The pulsed laser beam 501 as sufficient peak power to illuminate the detection volume sufficiently for return pulses to be detected by the detector. In one embodiment, the peak laser power $P_0$ is greater than at least 1 MW. In a particular embodiment, the laser pulse peak power is $6.67 \times 10^6$ W.

As an example, the following formula relating pulse energy, $E_o$, and repetition frequency, n, into equivalent continuous watt (CW) power, $\overline{P}$ may be applied:

$$\overline{P} = E_o \cdot n_o \quad (1)$$

where $n_o$ is nominal repetition frequency:

$$n_o = 100 \text{ Hz} \quad (2)$$

Therefore:

$$P_o = \frac{E_o}{\tau_L} = \frac{\overline{P}}{n_o \tau_L} \quad (3)$$

As an example, assume $\overline{P}$=10 W, and $n_o$=100 Hz, then, $E_o$= $\overline{P}/n_o$=10 W/100 Hz=100 mJ, and for pulse length, $t_L$=10 nsec, $P_o$=100 mJ/10 nsec=0.1 J/$10^{-8}$ sec=10 MW.

In some embodiments, the laser path 502 may be free space, a waveguide, or an optical fiber. As discussed above, in some embodiments, the laser has a peak power greater than 1 MW. Optical fibers have a laser damage threshold which defines the maximum optical intensity in W/cm² that can be transmitted in the fiber. In particular embodiments, the laser path 502 comprises a multi-mode fiber with a core diameter of around 300 μm.

In one embodiment, the laser damage threshold is about:

$$I_o = 10 \text{ GW/cm}^2 = 10^{10} \text{ W/cm}^2 \quad (4)$$

Then, minimum fiber core diameter, $(d_F)$ min, is $$(d_F)\min = \sqrt{\frac{4P_O}{\pi I_O}} \quad (5)$$

where $P_o$ is laser beam nominal power. Assuming, as before, $P_o$=6.67·10⁶ W, we obtain $$(d_F)\min = 290 \text{ μm} \quad (6)$$

which is a multimode fiber. For a typical multi-mode fiber the numerical aperture is $N_A$=0.4. From this, its etendue is: (2)(290 μm)(0.4)=232 μm, which is much larger than a laser's single-mode Gaussian beam etendue, $\epsilon_L$, in the form:

$$\varepsilon_L = 4\theta w_O\left(\frac{\lambda}{\pi w_O}\right) = \frac{4\lambda}{\pi} \sim \lambda \quad (7)$$

i.e., about 1.6 μm

In other embodiments, the laser beam path comprises a single mode optics. In these embodiments, the laser beam may comprise a Gaussian beam with divergence, 2θ, and beam waist, $2w_o$. For 2θ=Δφ=0.38°, $w_o$=(1.6)(32)($10^{-4}$)/(0.033), =0.155 mm, and $2w_o$=310 μm>290 μm. The relation between the beam waist $2w_o$ and divergence angle, 2θ in degrees, is summarized in Table 2.

TABLE 2

Relation between Gaussian Beam Waist, $2w_o$, and its divergence, 2θ, for λ = 1.6 μm

| 2θ | 1° | 0.3° | 0.1° | 0.05° | 0.03° | 0.01° |
|---|---|---|---|---|---|---|
| θ [Rad] | 0.0087 | 0.0026 | 0.00087 | 0.0004 | 0.00026 | 0.000087 |
| $2w_o$ [mm] | 0.112 | 0.192 | 0.59 | 1.28 | 1.97 | 5.89 |

Figure 6:
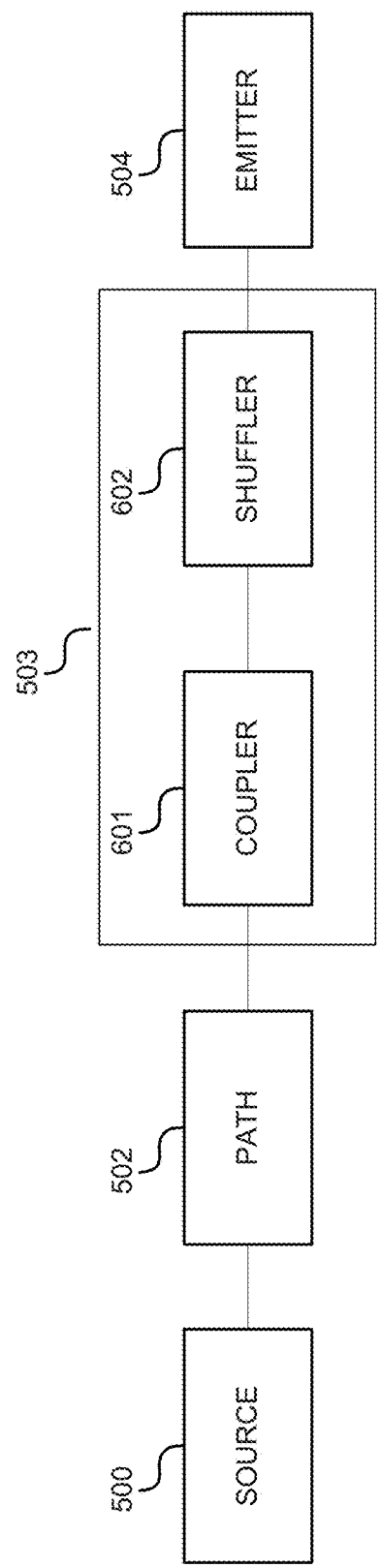
FIG. 6 illustrates an example laser delivery system.

The emitter housing 503 comprises a beam coupler that couples the laser path 502 to the laser emitter 504 and that conditions the beam 501 to be emitted 505. FIG. 6 illustrates the beam coupler 601 of the laser housing coupled to the optical fiber laser path 502. The coupler 601 conditions the beam by expanding the beam to obtain a desired beam profile.

Figure 7:
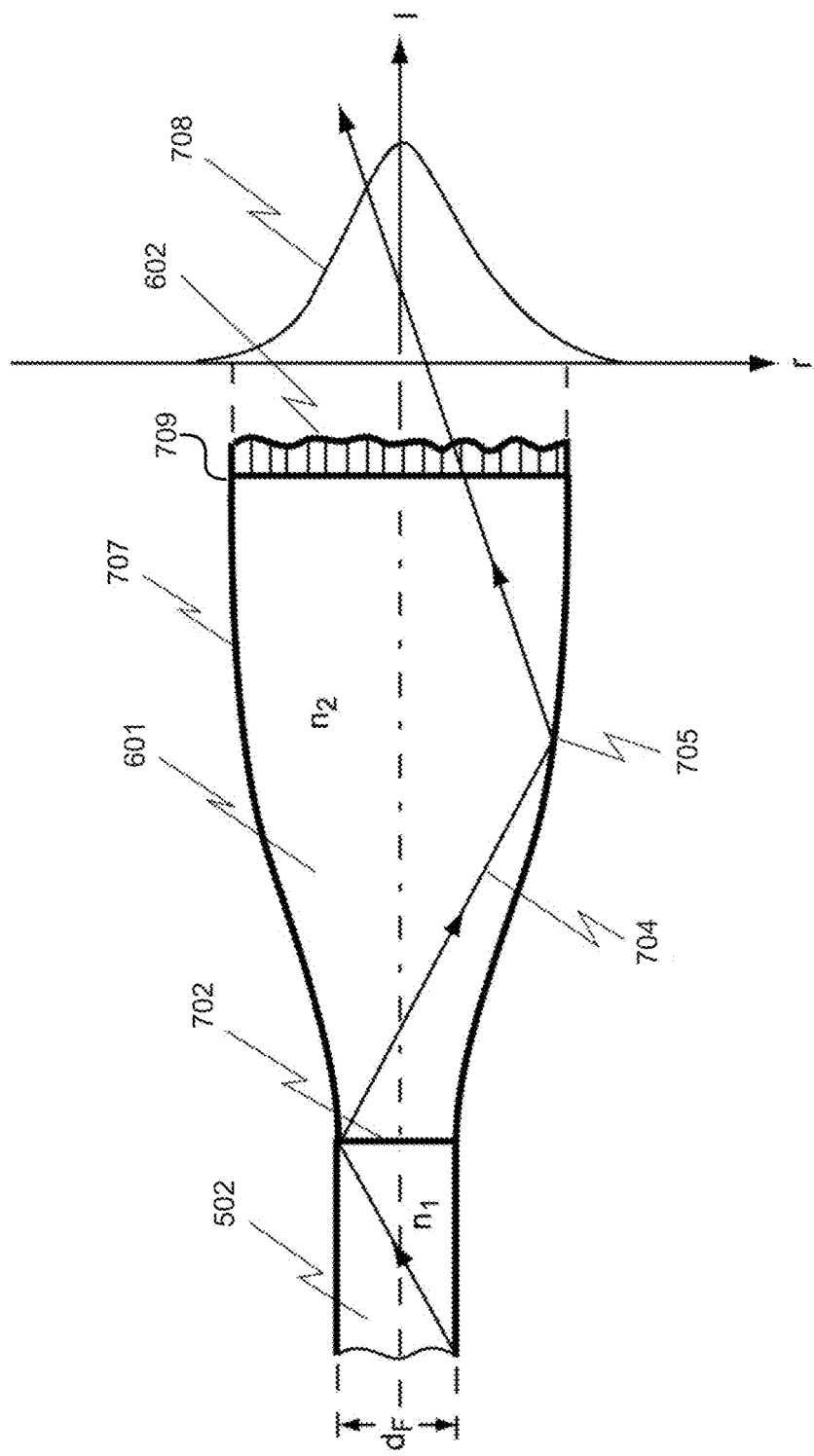
FIG. 7 illustrates an example beam expander.

FIG. 7 illustrates one embodiment of the coupler 601. Here, the coupler 601 comprises an entrance interface 702 in contact or coupled to an exit surface of the fiber 502. The expanded beam fiber coupler 601 comprises a material that has a similar refractive index, $n_2$, as the refractive index, $n_1$, of the fiber's 502 core. In some embodiments, the beam coupler 601 is made of the same material as the fiber's 502 core. In still further embodiments, the beam coupler 601 and fiber 502 core is a continuous volume of material. The similarity of refractive indexes between the fiber 502 core and the beam coupler 601 reduces Fresnel reflection losses at the interface 702.

The coupler 601 has a profile 707 configured to provide a desired intensity distribution 708 at the coupler exit 709. The desired intensity distribution 708 may be symmetrical or asymmetrical. Symmetrical intensity distributions 708 may include circularly symmetrical distributions, where intensity, I, is a function of radius, r. The intensity distribution 708 arises from total internal reflection (TIR) 705 of rays 704 within the beam coupler 601. In some embodiments, the intensity distribution 708 is Gaussian. In other embodiments, the intensity distribution 708 follows some other bell-shaped curve.

Figure 8:
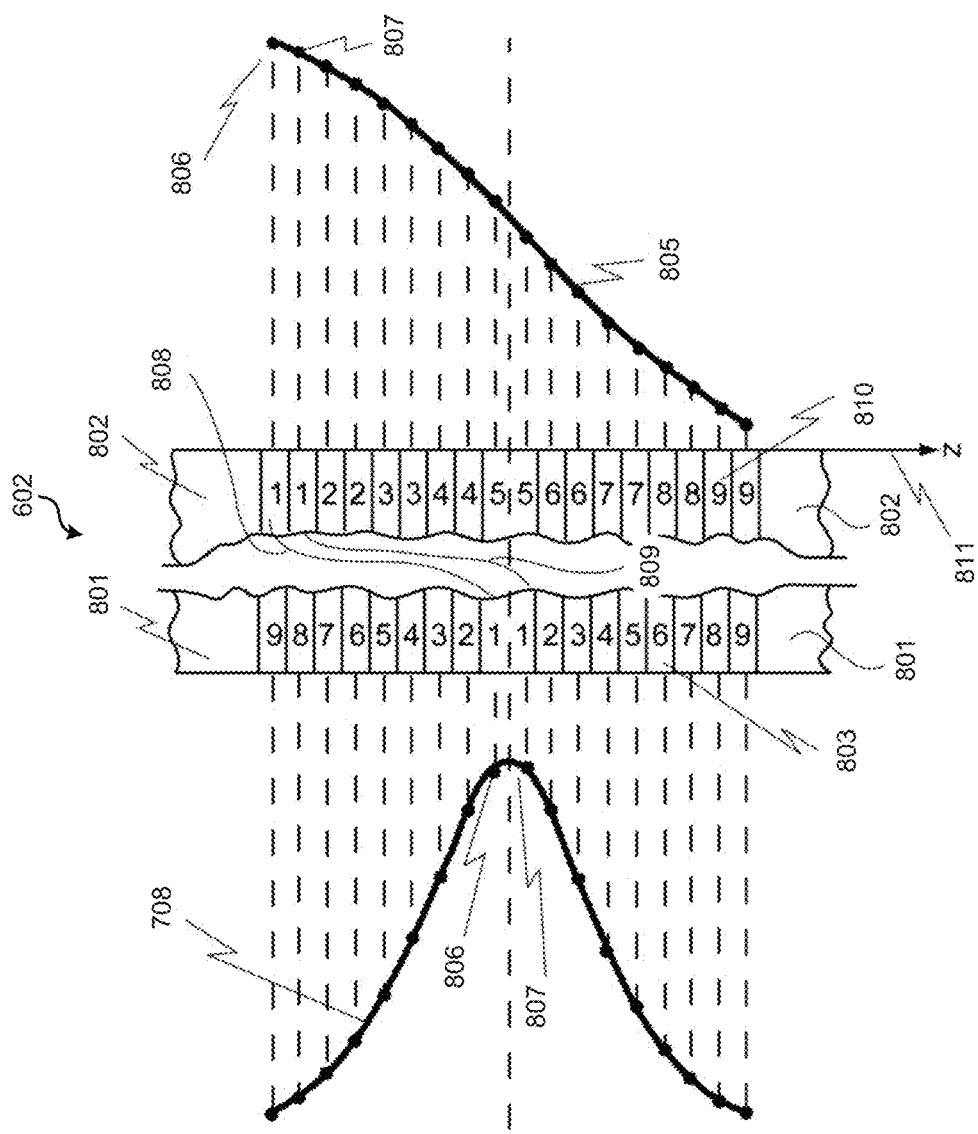
FIG. 8 illustrates an example beam reshuffler.

In some embodiments, the coupler exit 709 is optically coupled to the emitter optics directly. In other embodiments, the beam undergoes further conditioning prior to the emitter. In the illustrated embodiment, the coupler exit 709 is optically coupled to a beam shuffler 602. An embodiment of the beam shuffler 602 is illustrated in FIG. 8.

The beam shuffler 602 comprises a fiber bundle having an input arrangement 801 and an output arrangement 802. The fiber bundle comprises a plurality of optical fibers 803 having input surfaces optically coupled to the output surface 709 of the beam coupler 601. The optical fibers 803 may be made of the same material as the coupler 601, or other material having a similar index of refraction, $n_3$. In some embodiments, the optical fibers 803 lack claddings or have reduced claddings to reduce the space between fibers 803 and reduce light loss at the interface between output surface 709 and the input 801.

The output fiber bundle arrangement 802 differs from the input fiber bundle arrangement 801 in a manner adapted to provide an output intensity distribution 805. As discussed above, in some embodiments, each module FOV has an inner radius and an outer radius. In some cases, the inner radius and outer radius can differ by several kilometers. Accordingly, if the beam had isotropic intensity, the irradiance of the detection zone near the outer radius could be significantly less than the irradiance near the inner radius. Indeed, any symmetric distribution 708 provides an unequal irradiance throughout the detection zone. To reduce these effects, the output fiber bundle arrangement 802 is configured to provide an asymmetrical spatial intensity profile 805. The asymmetrical intensity profile is formed because fibers 808, 809 with an input near the peak input intensities 806, 807 have outputs at locations corresponding to farther detection distances. Any desired output intensity function 805 may be obtained by such reshuffling. For example, the output intensity function 805 may be a monotonically decreasing intensity function. Additionally, in some embodiments, the centers of the fibers 803 are not symmetrically distributed about the center of the input 708. Accordingly, the input intensity function 708 is sampled by the fiber bundle 801 asymmetrically. This allows the output intensity function 805 to more accurately approximate a desired profile. For example, in the illustrated embodiment, fiber 808 is closer to the peak intensity value than fiber 809. Accordingly, fiber 808 samples a higher intensity value 806 than intensity value 807 sampled by fiber 809. In other embodiments, shuffler 602 may include fiber optic couplers joining two input fibers 803 to form a single output fiber 810. In such embodiments, the exit intensity from the output fiber 810 may be the sum of the input intensities of the two input fibers 803.

Figure 9:
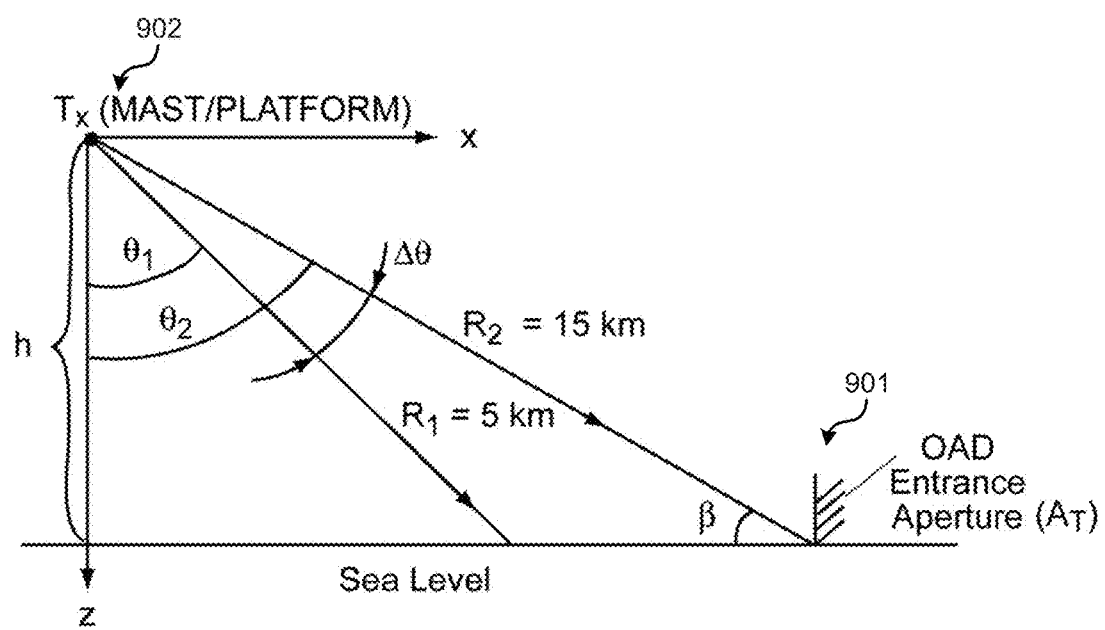
FIG. 9 illustrates an example of system geometry during operation.

After transmission through the emitter optics, the spatial intensity function 805 is transformed into a radiant intensity function. In particular embodiments, the radiant intensity function is or is an approximation of the radiant intensity function (measured in Watts per steradian, or W/sr):

$$J(\theta) \propto R^2; R = \frac{h}{\cos\theta}, \quad (8ab)$$

where h is the approximate height of the system and $\theta$ is the vertical beam angle with respect to the mast. FIG. 9 illustrates this geometry in the context of an example platform on a mast 902 with inner detection radius $R_1$ of 5 km and an outer detection radius, $R_2$ of 15 km. Here, h is the height in the z direction. The x coordinate illustrates distance from the transmitter $T_x$, where y would refer to the lateral coordinate. $\theta$ is the vertical angle measured from the mast. At $R_1$ the angle is $\theta_1$, at $R_2$ the angle is $\theta_2$ and the difference between the angles is $\Delta\theta$. Additionally, $\beta$ is the complement of $\theta$ and measures the angle from sea level to $T_x$. FIG. 9 further illustrates, an example target $A_T$ just within range of Tx.

In this geometry, the emittance as a function of R is (ignoring atmospheric effects):

$$E(R) = \frac{J(\theta)\cos\beta}{R^2}. \quad (9)$$

Accordingly, the radiant intensity given in Eq. (8ab) compensates for the dependence of E(R) on $R^{-2}$. For marine platforms: $\beta \ll 1$, so that $J(\theta)$ is as follows:

$$J(\theta) = \frac{P_O}{\Delta\phi} \frac{F(\theta_1, \theta_2)}{\cos^2\theta} \quad (10)$$

where $P_o$ is total beam power, $\Delta\phi$ is beam azimuthal range of a single facet, and F-factor, is $$F(\theta_1, \theta_2) = \frac{h}{R_2 - R_1} \quad (11)$$

including R-formula, as in Eq. (8b). Eq. (10) includes both $R^2$-profile as in Eq. (8a) and power normalization, while $$\Delta\varphi = \frac{w}{R} \quad (12)$$

where w is azimuthal range value. The azimuthal range may vary depending on embodiment, but remains less than a threshold, $w_T$, defined by the implementation. This can be done, at least, in two ways, either keeping $\Delta\phi$ constant, or w constant, where the first case can be preferable in order to keep well-controlled total FOV combined of a number of modules. In such a case, w-value will be variable, equal to $w_T$-value, for $R=R_2$:

In other implementations, the system may be mounted at other locations. For example, the system may be mounted on an aircraft or helicopter. In such an example, $\beta$ may be not be $\ll 1$. In these implementations, $J(\theta)$ will vary, but may be determined in a straightforward extension of the above analysis.

Additionally, although discussed in terms of a multimode fiber delivery path 502. A coupler 601 and shuffler 602 may likewise be applied in the case of a free space path 502. Additionally, in embodiments without large power requirements, the path 502 may comprise a single mode fiber. In these embodiments, the coupler 601 and shuffler 602 may or may not be applied, depending on implementation.

Figure 10:
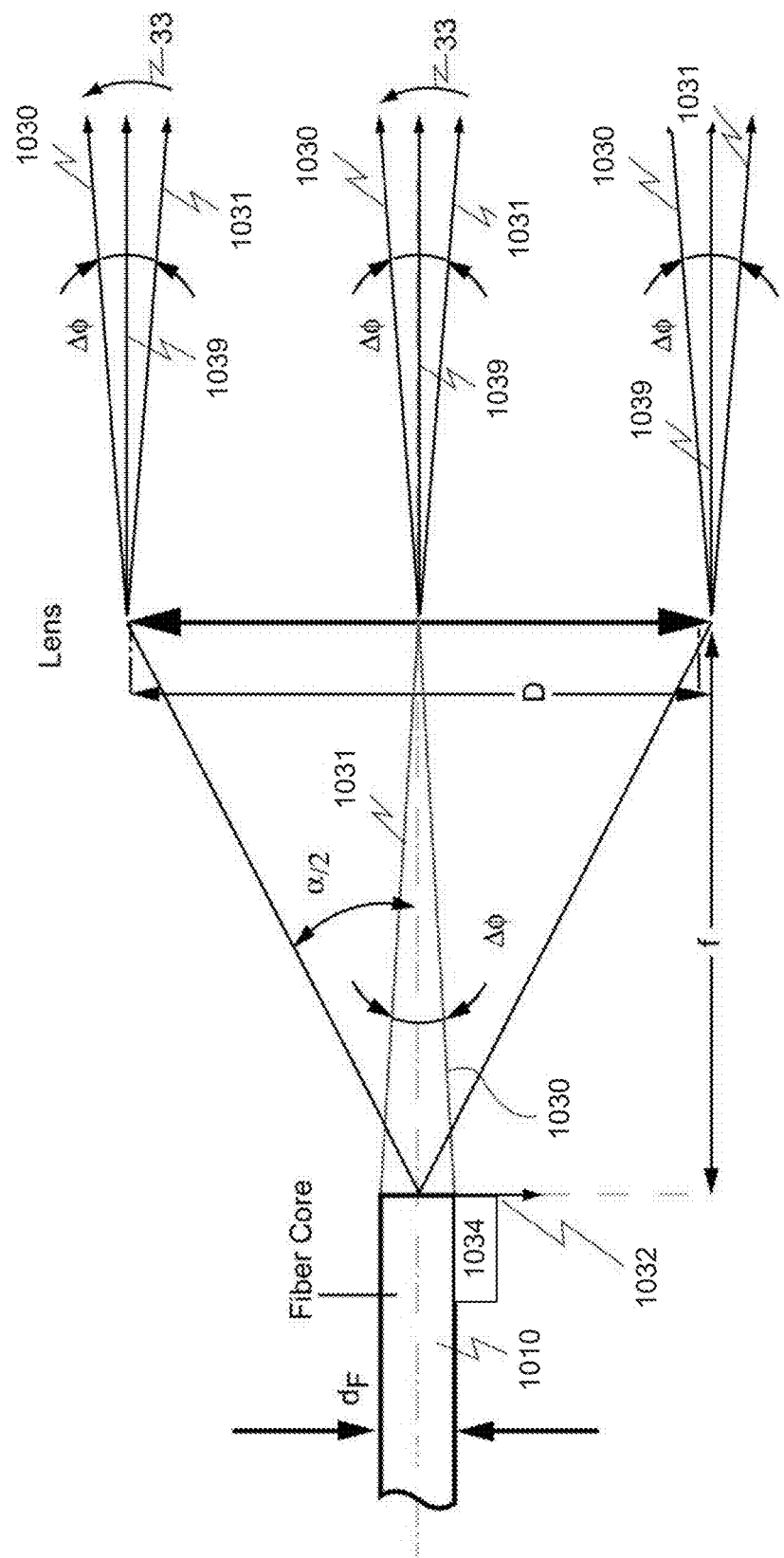
FIG. 10 illustrates an example fiber optic laser delivery component.

Returning to FIGS. 5 and 6, the output 811 of the beam shuffler is directed into emitter optics 504. In some embodiments, the emitter optics comprises a collimating lens system. FIG. 10 illustrates an example collimating lens system. In this figure, the fiber 1010 with core diameter, $d_F$, is illustrated. For example, the fiber 1010 may be the output fiber bundle of the shuffler 602, or if a shuffler 602 is not employed, the output of the beam expander 601. In still further embodiments, neither a beam expander 601 nor a shuffler 602 are employed, and the fiber 1010 is the output of the beam path 502. In one embodiment, $d_F=(d_F)_{min}=290$ μm=0.29 mm, with $(N_A)=0.4$; thus, f#=1.14, and, D/2f=0.44:

$$f = \frac{d_F}{\Delta\phi} = \frac{0.29 \text{ mm}}{0.0066} = 44 \text{ mm}; D = \frac{f}{f\#} = \frac{44 \text{ mm}}{1.14} = 38.6 \text{ mm} \quad (13)$$

The following general relation for multi-mode fiber optics applies:

$$4f\#^2 + 1 = \frac{1}{(N_A)^2} \quad (14)$$

From this relation: $(N_A)=0.447$ for f#=1, and f#=1.14 for $(N_A)=0.4$, while, the Ettendue theorem has the form:

$$2d_F(N_A) = (\Delta\phi) \cdot D \quad (15)$$

This is the optical version of the $2^{nd}$ principle of Thermodynamics, which is a consequence of the Liouville Theorem.

Bottom intensity value 1030, is transformed to the same upper (or, double-rescaled) exit angular intensity value 1030, as it is shown for the three upper exit values 1030; same with intensity values 1031. This occurs because the spatial intensity values 1032, for z-coordinated at the exit of fiber core 1010, are transformed to angular intensity values 1033 at the lens exit, and this relation is inverse (i.e., upside-down).

In some embodiments, an actuator 1034 may be coupled to the fiber 1010. For example, the actuator 1034 may comprise a piezoelectric actuator. This may be used to change the position of the beam axis 1039, for example, in the z direction. As a result, the scanning range $(R_1, R_2)$ may be modified. For example, the range might be modified from (5 km, 15 km) to (8 km, 18 km).

Returning to FIG. 9, an example of calculating radiant intensity at the far range of an embodiment is provided. Eq. (10) becomes:

$$J(\theta) = \frac{P_O}{\Delta\phi} \frac{1}{\frac{1}{\cos\theta_2} - \frac{1}{\cos\theta_1}} \left(\frac{1}{\cos^2\theta}\right) \quad (16)$$

To calculate the radiant intensity, $J(\theta)$, for R=15 km, assuming $R_1$=5 km, $R_2$=15 km, w=100 m, and $P_o$=6.667·10$^6$ W, and:

$$\Delta\phi = \frac{W}{R_2} = \frac{100 \text{ m}}{15 \text{ km}} = 0.00666 = 0.382° \quad (17)$$

And, equivalent pulse energy, $E_o$, is (for $\tau_L$=6 nsec)

$$E_o = \tau_L \cdot P_o = (6.667 \cdot 10^6 \text{ W})(6 \cdot 10^{-9} \text{ sec}) = 40 \text{ mJ} \quad (18)$$

Also, assuming nominal repetition frequency value of $n_o$=100 Hz, according to Eq. (3), the equivalent continuous-work (CW) power, $\bar{P}$, is $$\bar{P} = P_o n_o \tau_L = E_o \cdot n_o = (40 \cdot 10^{-3} \text{ J})(100 \text{ Hz}) = 4 \text{ W} \quad (19)$$

For R=$R_2$=15 km, Eq. (16) becomes $$J(\theta) = \frac{P_O}{\Delta\phi}\left(\frac{1}{\cos\theta_1 - \cos\theta_2}\right)\left(\frac{\cos\theta_2}{\cos\theta_1}\right) \quad (20)$$

where $\theta_1$=89.43° (5 km) and $\theta_2$=89.8° (15 km). Using Eq. (17), the value of radiant intensity at the front of the target 901 is:

$$J(\theta) = \left(\frac{6.67 \cdot 10^6 \text{ W}}{0.00666}\right)\left(\frac{1}{\cos 89.43° - \cos 89.8°}\right)\left(\frac{\cos 89.43°}{\cos 89.8°}\right) = \quad (21)$$
$$= (10^9 \text{ W})(155)(2.84) = 4.41 \cdot 10^{11} \text{ W}/sr$$

In some cases, the target 901 is a non-Lambertian reflecting optical system (such as a periscope). Such targets 901 may be called optical-augmented devices (OADs) herein.

FIGS. 11A-D illustrate various detection subsystems implemented in accordance with various embodiments. Each system's detection subsystem detects and processes laser pulses reflected from the module's FOV. In some implementations, a single detection subsystem is sufficient, while in other implementations multiple subsystems or subsystem branches may be employed.

The illumination and optical power at the detector relates to the illumination and optical power at the reflector as follows.

$$\eta_{DR} = \frac{P_5}{P_3} = \frac{A_L}{\pi R^2 \sin^2\alpha}; \quad A_L = \frac{\pi D^2}{4} \quad (22ab)$$

where D is the lens diameter, R the distance from reflector to detector, and $\alpha$ is the reflection divergence half-angle. $P_5$ is the power at the detector while $P_3$ is the power at the reflector surface. For (Lambertian) clutter reflectors (using prime to distinguish clutter objects):

$$\alpha' = 90° \quad (23)$$

while, for the target (non-Lambertian), $\alpha \ll 1$, such as:

$$\alpha = 0.25° = 0.0044 = 4.4 \cdot 10^{-3} \quad (24)$$

From well-known radiometric definitions:

$$P_5 = E_5 A_5; \quad P_3 = E_3 A_3 \quad (25ab)$$

where E is illumination or irradiance. Therefore, substituting Eq. (25b) into Eq. (22a), we obtain $$P_5 = \frac{E_3 \cdot A_3 \cdot A_L}{\pi R^2 \sin^2\alpha} \quad (26)$$

introducing focal length of the detection optics and system magnification results in:

$$P_5 = \frac{E_3 \cdot A_5 \cdot A_L}{\pi f^2 \sin^2\alpha} \quad (27)$$

or, $$\frac{P_5}{A_5} = E_5 = \frac{E_3 \cdot A_L}{\pi f^2 \sin^2\alpha} \quad (28)$$

Introducing brightness (or radiance), $B_3$, at the reflector then, the well-known basic radiometric formula results:

$$E_5 = \frac{B_3 \cdot A_L}{f^2} \quad (29)$$

This formula shows that the retro-reflectors, such as periscopes, which have high brightness, image very well. However, they image into a very small spot, which is typically much smaller than pixel size (linear), a.

An example is a periscope cross-section as a reflector object, with diameter, d=7 cm. Assuming typical: R=10 km, and f=30 cm, then the image size s is:

$$s = \frac{d}{m} = \frac{7 \text{ cm}}{3.33 \cdot 10^4} = 2.1 \cdot 10^{-4} \text{ cm} = 2.1 \text{ μm}, \quad (30)$$

where m is demagnification (m=R/f). If a 50 μm sensor (pixel) size is used (i.e., a=50 μm), then:

$$\frac{a}{s} = \frac{50}{2.1} = 23.8 \quad (31)$$

i.e., periscope cross-section cannot be imaged (in other words, the system is a pseudo-imaging system, where the target images do not satisfy the resolving criteria of having images extending across at least two sensors).

The ratio of clutter/target powers, may be written as $$\frac{P_5}{P_5'} = \frac{\frac{E_3 A_5 A_L}{\pi f^2 \sin^2\alpha}}{\frac{E_3' A_5' A_L}{\pi f^2 (1)}} \quad (32)$$

Additionally:

$$E_3 = rE_2;\ E_3' = r'E_2' \tag{33ab}$$

where subscript "3" denotes the exit plane of the reflector plane, while subscript "2" denotes the entrance plane of the reflector, and r and r' are Fresnel (energy) effective reflection coefficients for target and clutter, respectively. Thus:

$$\frac{P_5}{P_5'} = \frac{\frac{rE_2 A_5 A_L}{\pi f^2 \sin^2 \alpha}}{\frac{r'E_2' A_5' A_L}{\pi f^2 (1)}} = \left(\frac{A_5}{A_5'}\right)\left(\frac{1}{\sin\alpha}\right)\left(\frac{r}{r'}\right) \tag{34}$$

where, $E_2 = E_2'$ (e.g, the same laser illumination is incident on target and clutter), and clutter reflection beam is imaged, uniformly; i.e., filling up whole pixel area; thus, $$A_5' = a^2. \tag{35}$$

Accordingly:

$$\frac{P_5}{P_5'} = \left(\frac{A_3}{m^2}\right)\left(\frac{1}{a^2}\right)\left(\frac{1}{\sin^2\alpha}\right)\left(\frac{r}{r'}\right) \tag{36}$$

Introducing the resolving element, as described herein:

$$\frac{P_5}{P_5'} = \frac{A_3}{(\delta l)^2}\left(\frac{1}{\sin^2\alpha}\right)\left(\frac{r}{r'}\right), \tag{37}$$

where δl is the pixel resolving element (in other words δl is the size of an object that is imaged to the size of the pixel) (δl=m*a), and, for circular periscopic cross-section with diameter, d:

$$A_3 = \frac{\pi d^2}{4} \tag{38}$$

and, Eq. (37) becomes, $$\frac{P_5}{P_5'} = \left(\frac{\pi d^2}{4}\right)\left[\frac{1}{(\delta l)^2 \sin^2\alpha}\right]\left(\frac{r}{r'}\right). \tag{39}$$

As an example, the resolving element for δl, for a=50 μm, f=20 cm, and R=10 km is:

$$(\delta l) = ma = (50\ \mu m)(5 \cdot 10^4) = 25 \cdot 10^5 = 25 \cdot 10^2\ mm = 2.5\ m \tag{40}$$

To continue this example, the power ratio for (δl)=2.5 m, d=7 cm, and α=1°, assuming: r=r' is:

$$\frac{P_5}{P_5'} = \frac{(38.46\ cm^2)}{(2.5\ m)^2}(3{,}283) = \tag{41}$$

$$\frac{(38.46)(10^{-4})}{(2.5)^2}(3.28 \cdot 10^3) = (20.2)(10^{-1}) = 2.02$$

Accordingly, voxel inference (i.e., distinguishing a true target from a potential false target using the presence of a reference clutter signal) may be applied in this example because both powers have comparable values. In general, so long as the power ratio for the clutter signals and potential target signals are within the dynamic range of the detector, both signals may be read by a single detector.

As a contrary example, assume: f=30 cm, a=20 μm, α–0.25°, R=10 km, d=7 cm, and r=r'. Here the power ratio of retroreflected target signal to Lambertian clutter signal is $$\frac{P_5}{P_5'} = \frac{38.46\ cm^2}{(66\ cm)^2}(52{,}500) = 463.5 \gg 1 \tag{42}$$

This power ratio exceeds typical dynamic ranges of available photodetectors, and hence voxel inference cannot be applied using a single detection branch.

Accordingly, for small α-angles and small-δl, the target power is much higher than that for reference clutter; thus, the voxel inference cannot be applied within the single system; otherwise the voxel inference (within the same system) can be applied.

This reflects the general fact that minimizing both false negatives and false positives within a single detection system may be contradictory. In general, to minimize false negatives, the target signal is maximized by reducing sensor size, a. This also reduces the NEP (noise equivalent power) of the system.

In contrast, to minimize false positives, ability to perform voxel inference is maximized; e.g., both signal and clutter powers are brought within the system detector range.

An R* parameter may be defined as the distance, that:

$$P = P';\ r = r' \tag{43ab}$$

The use of equality for R* is for simplicity of explanation. In general, the relevant distance is where both powers are within the system detection range.

As an example, typical conditions might be d=7 cm, α=1°, f=20 cm, and a=50 μm. The R* value is obtained from $$(\delta l)^2 = \frac{\left(\frac{\pi d^2}{4}\right)}{\sin^2\alpha} =$$

$$(38.48\ cm^2)(3{,}283) = 126{,}330\ cm^2 = 126{,}330 \cdot 10^{-4}\ m^2 = 12.63\ m^2$$

Thus, $$(\delta l) = 3.55\ m \tag{44}$$

and, $$m = \left(\frac{\delta l}{a}\right) = \frac{3.55\ m}{50\ \mu m} = \frac{3.55 \cdot 10^6\ \mu m}{50\ \mu m} = 7.1 \cdot 10^4$$

thus, the R*-value, is $$R^* = fm = (20\ cm)(7.1 \cdot 10^4) = 142 \cdot 10^4\ cm = 142 \cdot 10^2\ m = 14.2\ km \tag{45}$$

Less than this distance, P>P', while greater than this distance, P'>P.

From Eq. 39:

$$R^* = \frac{\sqrt{A_3}}{\sin\alpha}\left(\frac{f}{a}\right) = \sqrt{\frac{\pi d^2}{4}}\left(\frac{1}{\sin\alpha}\right)\left(\frac{f}{a}\right) \tag{46}$$

and:

$$R^* = \frac{\sqrt{\pi}}{2}\left(\frac{d}{\sin\alpha}\right)\left(\frac{f}{a}\right) = (0.89)\left(\frac{d}{\sin\alpha}\right)\left(\frac{f}{a}\right) \qquad (47)$$

To increase the ability to perform voxel inference, the reference clutter signal must be reduced in respect to target signal by reducing the R* value. Therefore, according to Eq. (47), adjustment of following parameters in the following manner minimizes R* value:

$$d\searrow\,;\,\alpha\nearrow\,;\,f\searrow\,;\,a\nearrow.. \qquad (48abcd)$$

Conditions (48ab) are fixed for specific target (e.g., periscope) types, so system parameters determining Eq. (48cd) may be modified. Reducing f-value, is equivalent to reducing system sensitivity because reducing f value is equivalent to reducing D value in the f# (i.e., weakening light collection). Accordingly, preferably, the sensor (i.e., pixel) size a is increased to reduce R*. Additionally, a second system having a different a value will have a different R* value. Accordingly, in some implementations, two parallel detection systems are used for distances shorter than R<R*.

Minimizing both false negatives and false positives at the same time is a central challenge with the IOS. This is done by maximizing the strength of the laser beam reflected from the periscopic target, and, at the same time, providing voxel inference (i.e., to process information from clutter correlated to the target, which includes, for example, the body of periscope, wave disturbance by the submarine, etc.) The first task leading to minimization of false negatives [target misses] is detecting the signal from the target. This is performed, in one embodiment, for example, by elements 1103 and 1104 in the upper branch of the detection system of FIG. 11D. It can also be performed by the corresponding elements in the upper branch of FIGS. 11B and 11C.

The second task [signal from correlated clutter] leading to minimization of false positives [false alarms] relates to detecting a signal from correlative clutter. This task is performed, for example, by elements 1109, 1103' and 1104' in the lower branch of detection system in FIG. 11D (or in the corresponding elements of FIGS. 11B and 11C). In ideal case, the powers attained in both branches are the same or close to each other, which means that P=P' as in equation 43a. The equality is realized at a distance, R=R*, as in equation 47. For R>R*, we obtain P smaller than P', while for R<R* we obtain P>P'. Therefore and because P is typically larger than P', a goal of the system is to minimize the R* value to increase the range of operation of voxel inference. However, in circumstances where P' is larger than P, the system can be configured to provide the inverse operation.

According to equation 47, the only parameters that can be controlled or varied by modifying the system are f and a, where f is focal length, and a is the linear pixel size. In order to increase the value of P' in the lower branch of FIG. 11D, we need to increase the a value or reduce the f value, or both. This leads to increasing the pixel resolving element defined by equation 40. For too small a, which is pixel linear size, a larger pixel size is used in detector array PDA 1103' in the lower branch. In some embodiments, the pixel size used in PDA 1103' is chosen as greater than the pixel size in PDA 1103. Accordingly, various embodiments use two pixel sizes—a smaller pixel size in the upper branch, and a larger in the lower branch.

Depending on system configuration and constraints, component availabilities and other design considerations, it may not always be possible or practical to implement detectors 1103, 1103' with actual pixel sizes meeting this constraint. Accordingly, in some embodiments, a pixel cluster concept can be applied in the lower branch in which multiple adjacent pixels are clustered together to yield a larger effective pixel size. For example, four (2×2), nine (3×3), (they need not be in a 'square' array) or more pixels can be configured to work in coordination as one single pixel. This electronically increases pixel size in the lower branch.

Figure 11A:
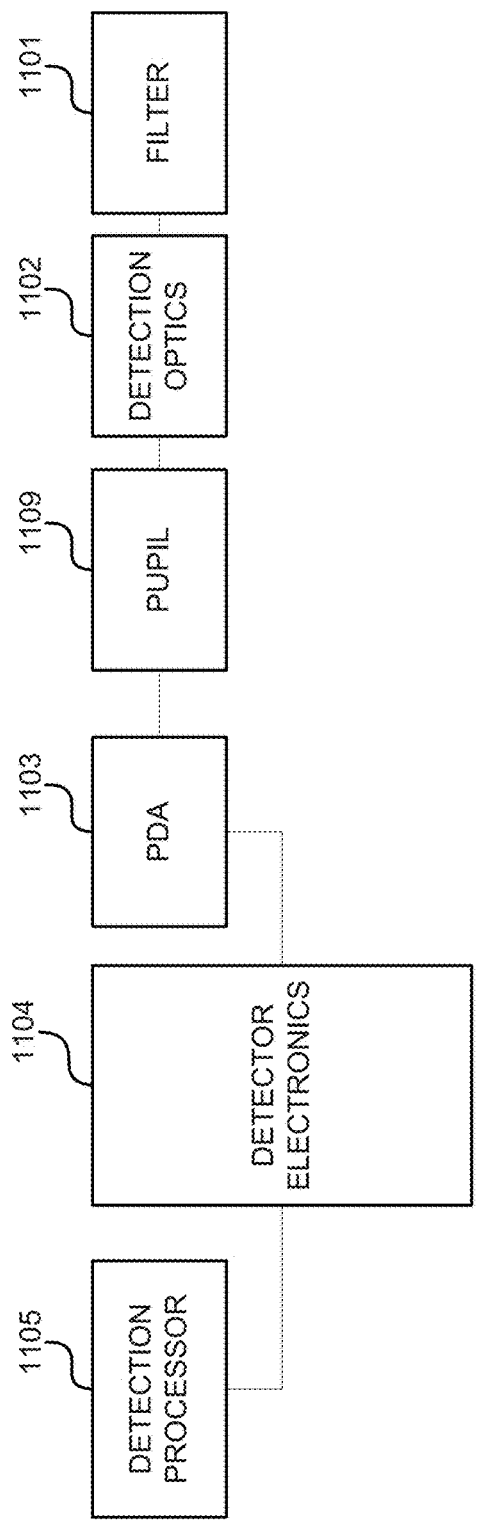
Figure 11B:
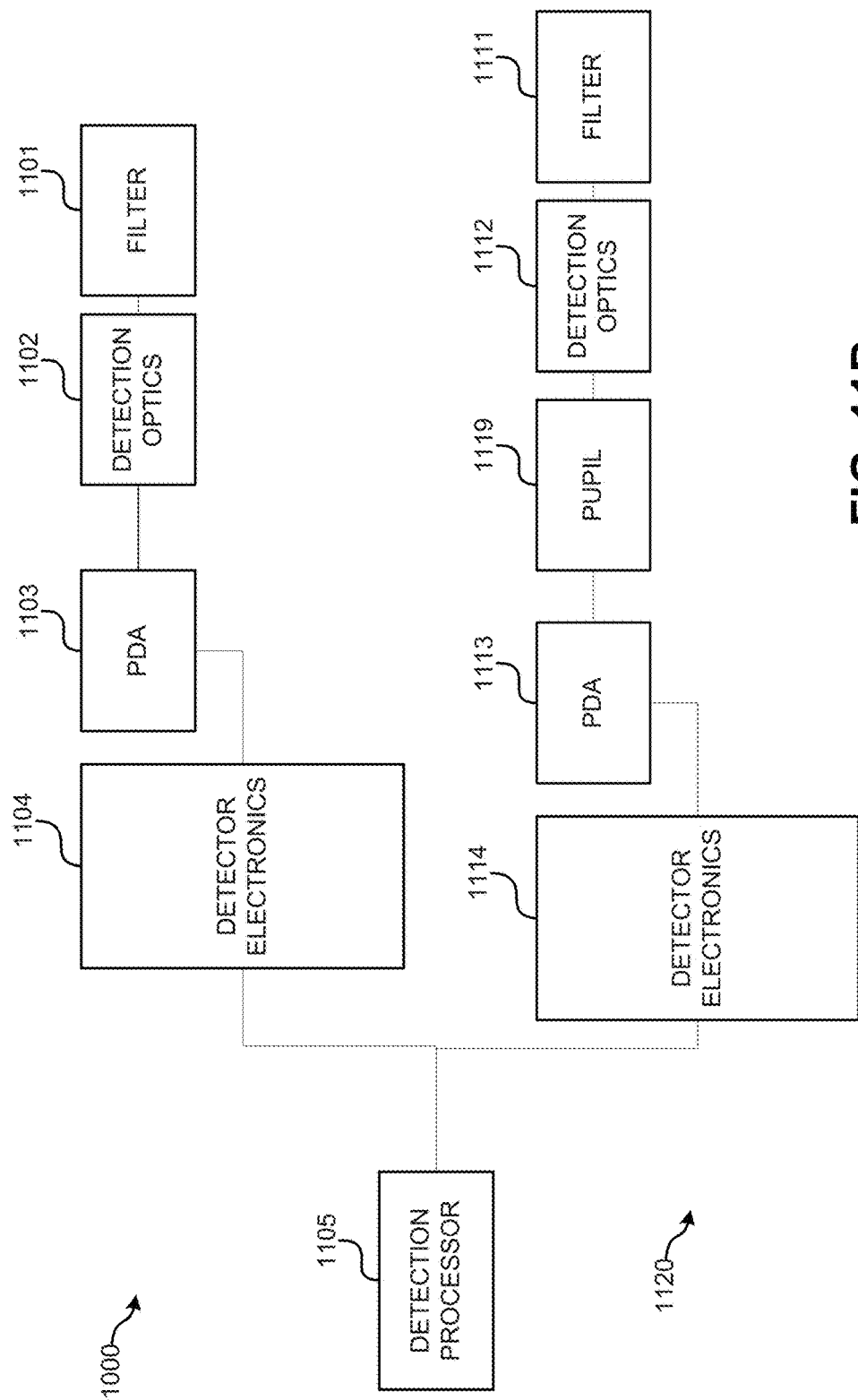
Figure 11D:
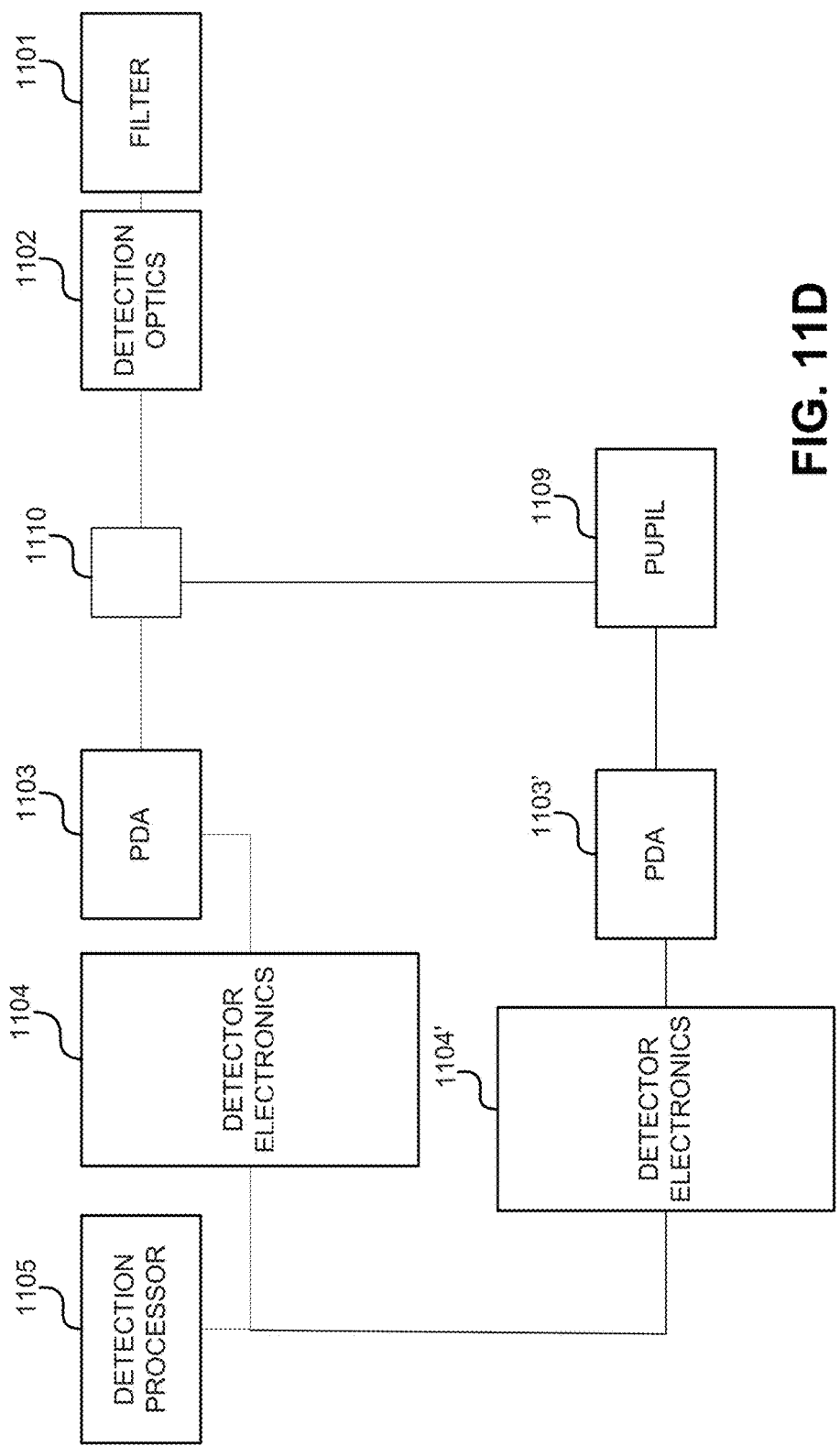

The pupil 1109 in the lower branch of FIG. 11D may be included to provide an equivalent decrease of diameter, D, of the collection lens. Then, keeping as typically fixed f#=f/D can allow a decrease in the f value of the same amount, or approximately the same. For example, if D is decreased 1.5 times, then the f value can also be decreased 1.5 times. Thus, we obtain cumulating effect of decreasing R* value, thus minimizing both false negatives and false positives. This is because there could be a lot of strong reflective signals, but by using the second parallel branch with a regulated pupil 1109, false signals that do not have properly correlative clutter can be reduced or eliminated. This means reducing or even eliminating false alarms.

The detection subsystem may comprise a filter 1101. The filter 1101 passes the laser wavelength while blocking other light. This reduces, minimizes, or eliminates optical noise. For example, such optical noise might arise from unwanted solar reflections, or other light sources. Because the laser beam is practically monochromatic, the filter 1101 may be a narrow wavelength filter. For example, the filter 1101 may comprise an interference passband filter, such as a Bragg filter. These filters demonstrate a "blue-shift" effect for slanted beams, the form: $\lambda=\lambda_o\sqrt{1-\sin^2\alpha/n^2}$, where $\alpha$ is the slant angle $\lambda_o$ is interference wavelength under normal incidence ($\alpha$=0). This blue-shift effect can be quite significant for narrow passband filters and moderate incidence angles. However, as discussed above, in some embodiments, each flash FOV may be less than 1°, for example 0.36°. The blue shift effect in these cases is small enough that the interference filter performance is not compromised. For example, for $\alpha$=0.36°, $\Delta\lambda$=0.012 nm.

In further embodiments, the filter 1101 may comprise a polarizing filter. As discussed above, in some embodiments, the emitted light beam may have a polarization signature. The filter 1101 may be configured to allow only light having that polarization signature to pass. For example, if the emitted beam is TH-polarized, the filter 1101 may comprise a TH-polarization filter. Man-made targets may be more likely to reflect light without change in polarization when compared to natural clutter, such as waves and plant matter. Accordingly, filter 1101 may increase the likelihood of target detection by reducing clutter signatures.

In still further embodiments, the filter 1101 may comprise a non-uniform neutral density filter. A non-uniform neutral density filter 1101 may be used instead of or to augment the normalizing system of the emitter. For example, the non-uniform neutral density filter 1101 may reduce the optical signal from close objects to normalize the received signal.

In the illustrated embodiment, the detection optics 1102 is optically coupled to the filter 1101. In some embodiments, the detection optics 1102 is disposed behind the filter 1101 in the optical path. In other embodiments, the detection optics 1102 may be in front of the filter 1101. The detection optics 1102 is configured to transfer received light to the detector 1103 in a pseudo-imaging manner. In still further embodiments, a filter 1101 is not employed.

In some embodiments, the detection system comprises a pupil 1109 coupled to, or integrated with, the optics 1102. In the optical path, the pupil 1109 may be behind or in front of optics 1102. The pupil 1109 may be used in the system to control the effective aperture, and thus, f#, of the optics system 1102. In embodiments having a pupil 1109, the pupil 1109 may be used to control the instantaneous dynamic range of the detection system. In some instances, reflected signals may exceed the system dynamic range—for example, if an object with a strong reflected (e.g., a non-Lambertian reflector) signal is near clutter with weaker reflected signal (e.g. a painted marine vessel). In such a case, the pupil may be used to reduce the light gathering ability of the optics system 1102, to bring the reflected signals within the dynamic range of the detector 1103.

In some embodiments, the pupil 1109 is adjustable, and to control the f# of the system, the detection optics 1102 has an adjustable focal length, f. For example, in some embodiments, the f# may be between 1 and 5. In systems without a pupil 1109 or with a fixed pupil 1109, the focal length f of the detection optics 1102 may also be fixed to set the desired f#.

Figures 12A, 12B:
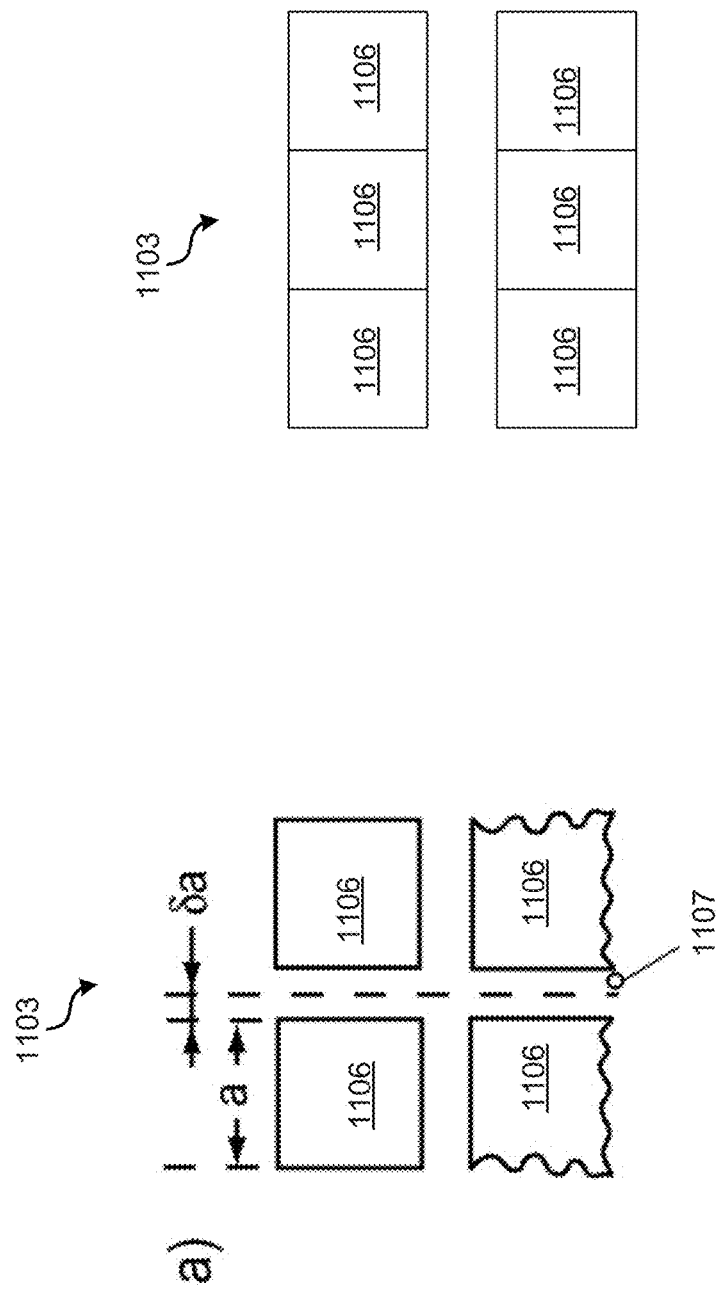
FIGS. 12A-B illustrate example sensor layouts.

As discussed below, the detector 1103 may comprise a one or two dimensional array of individual sensors 1106 separated by gaps (FIG. 12A). Alternatively, the detector 1103 may comprise an array of rows of gapless one dimensional sensor 1106 arrays (FIG. 12B). The detection optics 1102 is configured to transmit light to the detector 1106 in a manner that avoids a possible detection signal falling into the gaps between sensors 1106.

In the case of long distance detection, such as optical periscope detection (OPD), the photodetector array 1103 creates potential problem with missing periscope target during pseudo-imaging operation. This is because, the periscopic target is very small, with 10 cm-diameter, for example. In such a case, its image, at very long distances (e.g., R=10 km), is very small, down to even 0.1 μm size. Then, if photodetector array 1103 filling factor, F (i.e., the ratio between sensor area to total array area), is not perfect (i.e., F=100%), this target image can be missed in the space between sensors 1106. This is illustrated in FIG. 12A, where a is the sensor 1106 size, and δa is the half-pitch between sensors. Thus, the filling factor, is:

$$F = \frac{a}{a + \delta a} = \frac{1}{1 + \frac{\delta a}{a}} \quad (49)$$

In FIG. 12A, a photodetector 2D geometry is shown with a less than 100% filling factor (F<1). In such, if imaging optics with high resolution were used, the periscopic target image 1107 can be missed in the gap between sensors 1106. Assuming, for example, a=20 μm, and δa=0.1 μm, e relative pixel space is: (δa/a)=0.01/20=0.005, and F=0.995=99.5%; i.e., even for such high filling factor, a small target can be missed.

In one embodiment, this problem is solved by increasing the size of the target signal at the detector 1103. FIGS. 13A-D illustrate an embodiment of detector optics 1103 that increases the size of the target signal. The optics system 1103 comprises a lens, lens system, catoptric system, or catadioptric system the aberrates the image by de-focusing of image plane; i.e., providing that the image, equation is not well satisfied. Then, by artificially increasing target signal sizes to 1 μm, for example, F=0.95=95%, and the previous filling factor (F=99.5%) may be satisfactory. Imaging optics in this highly-aberrated mode satisfy both the etendue theorem (or, Liouville theorem) for concentrator optics, and, at the same time, optimize detector optics for maximum power collection (and maximum electrical SNR). For example, in the illustrated embodiment, the detector 1102 may be positioned closer to or farther from the optics system 1103 than the focal length of the optics system 1103. In other embodiments, the optics system 1103 may have a predetermined type and magnitude of aberration to produce the desired target signal sizes. In one embodiment, the detection optics 1102 produces an image with a circle of confusion having a diameter as large or larger than a distance between adjacent photodetectors 1106 of the photodetector array 1103 (i.e., a radius greater than or equal to δa). For example, the radius of the circle of confusion may be one, two, or three times larger than δa. In other embodiments, the circle of confusion is determined according to the photodetector 1106 size a. For example, the diameter of the circle of confusion may be equal to a. In one embodiment, each sensor 1106 comprises an avalanche photo diode (APD), with a being about 25 μm. In a further embodiment, the point spread function (PSF) exceeds the Airy ring by a factor of 5-10 (turning a 2 μm target image into a 10 20 μm-spot). In addition to reducing the risk that a target signal will fall on dead space between pixels, the aberrated imaging system may disperse the signal across multiple pixels, reducing overload when a strong target signal is present.

According to the Nyquist resolution criteria, the smallest resolving object should produce an image across at least two pixels 1106 of the array 1103. If, for example, this object is a periscope cross-section, with 10 cm diameter, then for detection optics 1102, with focal length f=30 cm and distance, R=10 km, the system demagnification, m=R/f=10 km/30 cm=3.33*10$^4$. Then, the Nyquist-satisfying pixel size is equal to 5 cm/3.33*10$^4$=1.5 microns, i.e, smaller than the Raleigh resolution (1.22*λ*f#=1.59 microns, for f#=1 and λ=1.3 microns), and which is comparable with speckle size for this system. Thus, in typical conditions, such small objects cannot be imaged without significant speckle-sized distortion. Therefore, the integrative optics system is "pseudo-imaging" rather than an imaging system. In other words, the optics 1102 produces images of targets that do not satisfy the Nyquist criteria for imaging a target.

In various embodiments, the f# of the optics system is as small as possible. For example, the f# may be between 1 and 0.5. However, in other embodiments, f#s between 1 and 5, or even higher may be employed.

The size of the detector 1103 may depend on considerations such as the sensor 1106 size, the effective diameter of the optics system and the distance from the detector 1103 to the optics (which may differ from the focal length for de-focusing embodiments). For a lens system with an effective diameter of D=30 cm, for example, f=30 cm, while Δφ=0.38°=0.0066; thus, Δφ/2=0.0033, and $$d = \Delta\phi \times f = (0.0066)(30 \text{ cm}) = 1.98 \text{ mm} \quad (50)$$

and, for vertical FOV (Δφ=0.37°), d=1.94 mm for 50 μm APD sensors (e.g., 1106, FIGS. 12A&B). Then, 1.98 mm=1980 μm; thus, the number of horizontal APD sensors is $$2N_x = \frac{1980}{50} = 40 \quad (51$$

and, the number of vertical APD sensors is (e.g, in a APD detector array 1103 (FIG. 12A)

$$2N_y = \frac{1940}{50} = 39. \tag{52}$$

In some embodiments, the ratio of the sensed energy from a potential target to the sensed energy from the surrounding clutter is used a parameter for target detection. The sensed area per image sensor 1106 (i.e., the area illuminated by a flash whose reflection impinges on a sensor 1106) is correlated to the sensed energy from the surrounding clutter. This parameter is dependent on factors such as de-magnification, FOV, sensor size, and distance from the sensed area to the system.

Figure 13B:
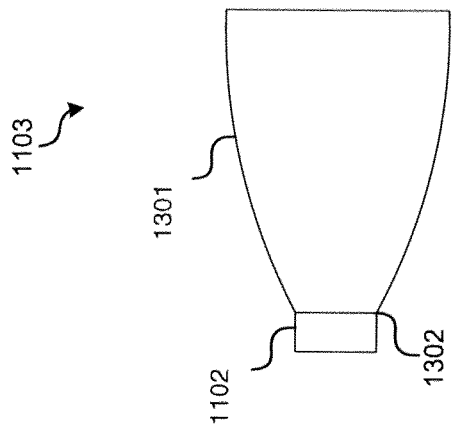
FIGS. 13A-D illustrate example reception optics.
Figure 13D:
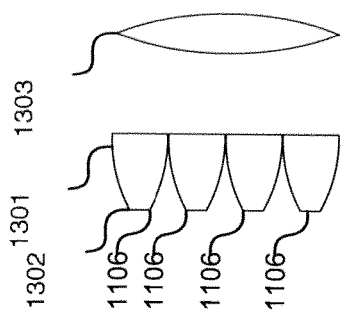
Figure 13A:
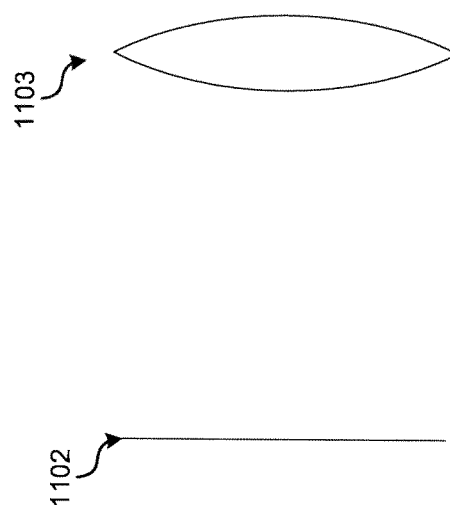
Figure 13C:
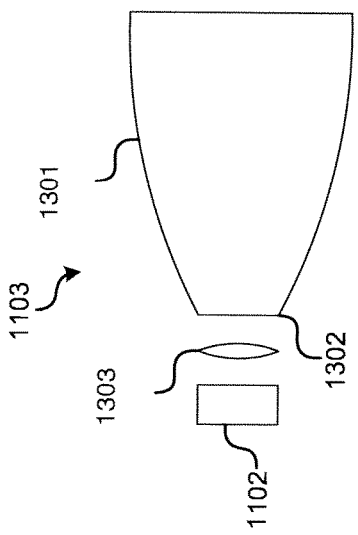

In FIG. 13B, the detection optics system 1103 comprise a compound parabolic concentrator 1301. In the illustrated embodiment, the detector 1102 is coupled to the absorber plane 1302 of the concentrator 1301. In other embodiments, the detection optics system 1103 may further comprise one or more lenses 1303 disposed between the concentrator 1301 and the detector 1102 (FIG. 3C). In still further embodiments, the detection optics system 1103 may comprise an array of concentrators 1301 disposed behind a lens or other optics system 1303. Individual sensors 1106 of the detector 1102 may be disposed at corresponding absorber planes 1302 of the array of concentrators 1301 (FIG. 13D).

Figures 14A, 14B:
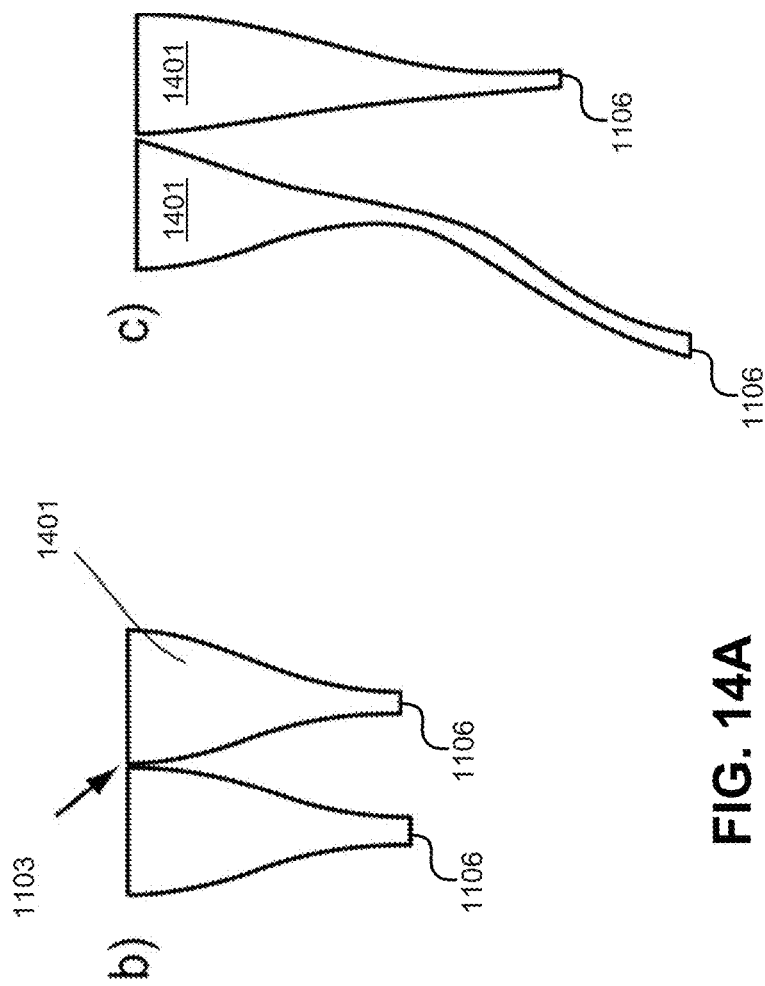
FIGS. 14A-B illustrate tapered fiber optics for laser receivers.

As illustrated in FIGS. 14A and 14B, in a further embodiment, the detection optics system 1103 comprises one or more tapered optical fibers 1401. For example, the optics system 1103 may comprise an array of tapered optical fibers 1401, each tapered fiber 1401 having an output at a sensor 1106. This system directs more light onto the sensors 1106, avoiding signal falling in the dead space between sensors. In some embodiments, the tapered optical fibers 1401 may be utilized in conjunction with or in replacement to, the concentrators 1301 and the lens system 1103.

As discussed above, the detector 1103 may comprise a plurality of individual sensors 1106 arranged in various one or two dimensional pixel arrays. The sensors 1106 are selected to have a sufficient specific detectivity. Typically, in semiconductor detectors 1106, the NEP (noise equivalent power) is defined by so-called specific detectivity, $D^*$, in $W^{-1}$ cm $Hz^{1/2}$, by the following formula:

$$(NEP) = \frac{\sqrt{A \cdot B}}{D^*} \tag{53}$$

where A is the photodetection area in $cm^2$ and B is the bandwidth in Hz. For semiconductor detectors, $D^*$ is, approximately, proportional to wavelength, up to cutoff wavelength, $\lambda$ cutoff, defined by energy gap, Eg, as: $\lambda$ cutoff=hc/Eg, where h is the Planck constant and c is the speed of light. For Avalanche Photodiodes (APD), the speed is very high (even in picoseconds), but (NEP) is limited by Johnson (thermal) noise, where $$r.m.s = \langle i_n^2 \rangle = \frac{4kTB}{R}, \tag{54}$$

where < > is the statistical ensemble average, $i_n$ is the noise current, k is the Boltzmann constant, T is the temperature in Kelvins (K°) and R is the resistance (typically, R~20Ω).

Then for typical applications, $D^* \sim 1.9 \cdot 10^{11}$ $Hz^{1/2}$ cm $W^{-1}$, and, for pulse laser with pulse length: $\delta t = 6$ ns, the bandwidth $B=1/\delta t = 1.67 \cdot 10^8$ Hz; and for APD pixel size: $\sqrt{A}=25$ μm$=25 \cdot 10^{-4}$ cm and $\sqrt{B}=1.3 \cdot 10^4$ $Hz^{1/2}$, from Eq. (35):

$$(NEP)_o = \frac{\sqrt{A \cdot B}}{D^*} = \frac{(25 \cdot 10^{-4} \text{ cm})(1.3 \cdot 10^4 \text{ Hz}^{1/2})}{1.9 \cdot 10^{19} \text{ Hz}^{1/2} \text{ cm W}^{-1}} = 1.68 \cdot 10^{-10} W \tag{55}$$

In other embodiments, the sensors 1106 may comprise photomultipliers. With photomultipliers with very high gain $\sim 10^7$, the dark current noise dominates, and:

$$(NEP)_{DARK\ CURRENT(DC)} = \frac{4 \cdot 10^{-17}}{\eta} \sqrt{B} W \tag{56}$$

where $\eta$-quantum efficiency. Then, for $\eta=0.8$ and $\sqrt{B}=1.3 \cdot 10^4$ $Hz^{1/2}$:

$$(NEP)_{DC} \cong \frac{4 \cdot 10^{-17} \cdot 1.3 \cdot 10^4 W}{0.8} = 6.5 \cdot 10^{-13} W = 0.65 \text{ pW} \tag{57}$$

Accordingly, for typical embodiments, the NEP is assumed to be approximately:

$(NEP)_o = 0.5$ pW$=0.5 \cdot 10^{-12}$ W$=0.5 \cdot 10^{-18}$ MW$=-$183.01 dBM (58)

In further embodiments, the detector 1103 may comprise a CCD array. CCDs have slower responses than APDs but NEP is lower and CCD pixel sizes are smaller. For example, for KODAK KAF-50100 Image Sensor, pixel sizes are 6 μm×6 μm, and Maximum Data Rate, B=18 MHz; i.e., (100)/(18)=5.5 slower than required for some implementations. In particular, implementations using laser pulses with approximately 10 nsec length are equivalent to B=100 MHz. By comparison, CCD speed limitation allows to measure only laser pulses 5.5-times longer; i.e., 16.5 m vs. 3 m for APD devices (since, c$\delta$t=(3*$10^8$ m/s)($10^{-8}$ m)=3 m). On the other hand, the SNR-value is much better. This is, because, the CCDs are limited by dark current noise rather than by Johnson noise as the APDs are. As a result, their $D^*$-values are much higher: about $10^{12}$ $W^{-1}$ cm $Hz^{1/2}$ vs. $10^9$ $W^{-1}$ cm $Hz^{1/2}$ for APDs.

In still further embodiments, the detector 1103 may comprise a solid state photomultiplier array.

The detection system further comprises detector electronics 1104 coupled to the detector 1103. In some embodiments, the detector electronics 1104 may comprise normalizing electronics. For example, the normalizing electronics may be used to normalize the gain settings across the detector to supplement or replace the normalizing system of the emitter. For example, a non-linear detector response, following a general square-root function or sigmoid function curve may be applied so that detector elements receiving light from closer objects have lower gain than detector elements receiving light from farther objects.

In some embodiments, the detector electronics further comprise RISC processor arrays 1104. Each RISC processor 1108 of array 1104 is coupled to a plurality of sensors 1106 of detector 1103. In some embodiments, each RISC processor 1108 of array 1104 is coupled to a 3×2 grid of six sensors 1106. In embodiments employing a 39×40 array of 50 μm APD sensors, an array of 256 RISC processors allows 255 RISC processors to be coupled to 6 APDs each, and one RISC processor 1108 to be coupled to 7 APDs. Each RISC processor 1108 receives a set of readouts from its connected APDs and performs a set number of operations on the set of readouts. In other embodiments, the detector electronics 1104 may comprise any other combination of analog or digital electronics systems.

In one embodiment, the RISC processors 1108 perform novelty filtering on their readouts. During the novelty filtering operation, each readout $x_i$ is translated by some predetermined amount $\Delta x$ to form a set of translated readouts $x_{io} = x_j + \Delta x$. In other words, the $x_{io}$ has the same coordinates as $x_i$, but its value is the value of $x_j$ at $\Delta x$ away. In some embodiments, the translation is performed using shift registers or other memory devices coupled to the processors 1108. When the translated readouts are formed, the RISC processors 1108 send the translated readout values to the appropriate RISC processors. For example, if $\Delta x$ is one unit down, then the RISC processor connected to the APD at (1,1) would send the readout from (1,1) to the RISC processor connected to the APD at (1,2).

Next, during the novelty filtering operation, each RISC processor subtracts $x_i - x_{io}$. If each readout is a binary value (for example, if the APD readout is treated as 1 if the APD detects more than a threshold amount of light and 0 if the detected amount of light is less than the threshold), this value will be 1 at edges of objects and 0 within and outside objects. In some embodiments, the RISC processor array 1104 outputs the subtracted readouts as a set of detected edges. In further embodiments, the RISC processor array 1104 performs further calculations.

In one embodiment, the RISC processor array 1104 calculates the squared Euclidean distance $d_E^2$, in the form; shown in N-space:

$$d_E^2 = \sum_{i=1}^{N}(x_i - x_{io})^2. \qquad (59)$$

This value $d_E^2$ may be output by the RISC processor array 1104. In various implementations, the squared Euclidean distance may be calculated for an entire sensor readout, for a row of sensors, for a column of sensors, or for a block of sensors connected by detected edges.

These examples are intra-frame calculations (i.e., calculations performed on a single readout of the detector 1103). In further embodiments, the RISC processor array 1104 may perform inter-frame calculations (i.e., calculations performed on multiple readouts of the detector 1103). Examples of such inter-frame calculations are described in further detail below.

The RISC processor array 1104 is coupled to a detection processor 1105. The detection processor 1105 receives data from the RISC processor array 1104 and performs various detection algorithms to determine if a target is detected. Examples of such detection algorithms are described in further detail below.

In further embodiments, parallel detection systems may be used to measure return flashes. FIG. 11B illustrates such an embodiment. In this embodiment, a first detection subsystem 1000 is configured to detect possible target signals, while a second detection subsystem 1120 is configured to detect possible reference clutter signals. In some implementations, the possible target signals are signals with high power reflections from non-Lambertian reflectors. For example, possible target signals may arise from ocular retroreflectors, such as binoculars or periscopes, or from other environmental features, such as caustics caused by waves. Reference clutter signals may comprise clutter signals that characteristically occur in proximity to true target signals. For example, for a periscope target, the reference clutter signals may comprise characteristic reflections from the periscope body or the submarine body. The reference clutter signals may be used by the signals to determine which of the possible target signals are true target signals. Such an implementation may be employed, for example, if the reflection signal strength from clutter objects, and in particular, reference clutter objects, is significantly different than the reflection signal strength from possible target objects. For example, if the reflection coefficient from a potential target object is much greater than the reflection coefficient from the surrounding reference clutter, a single detector 1103 may not be able to detect both signals.

In this embodiment, if filters 1101 and 1111 are employed, they may have similar filter characteristics. Subsystem 1000 is configured to have less greater light gathering ability, in order to detect the weaker of the potential target signals and clutter signals. Accordingly, the system 1000 lacks a pupil. Additionally, the detector 1103 may have larger sensor sizes than detector 1113, such as 50 µm compared to 25 µm (linear size). The detection optics 1112 may vary from detection optics 1102 to accommodate the pupil 1119. For example, the focal length of detection optics 1112 may be longer than the focal length of detection optics 1102 to accommodate the reduced diameter caused by pupil 1119.

The detector electronics 1104, 1114 may be any combination of digital or analog circuitry, including RISC processors, sufficient to provide the voxel readouts to the detection processor 1105. Additionally, in some embodiments, detectors 1103 and 1113 may share some detector electronics 1104, 1114, components, for example, to combine the signals prior to providing the signals to detection processor 1105.

Figure 15:
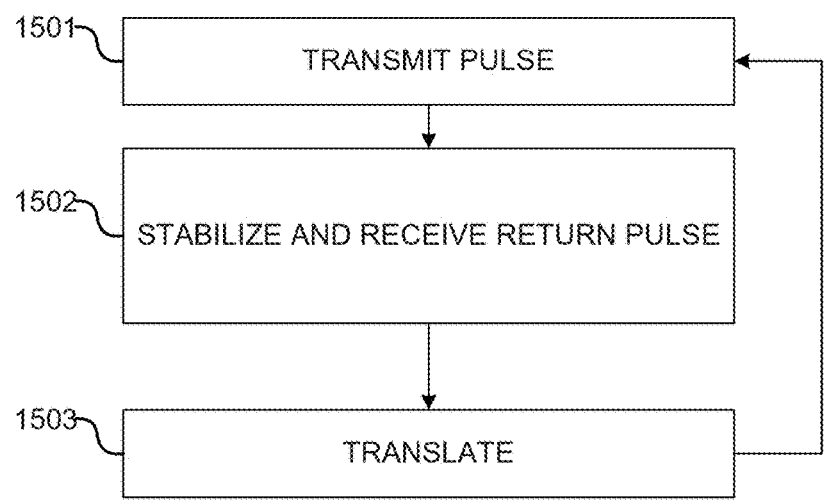
FIG. 15 illustrates an example of system operation during scanning.

FIG. 15 illustrates a method of operation of a system module, such as module 206, 207. In step 1501, the system emits a first pulse to illuminate a first facet of the module's field of view. As discussed above, field of view of the module is divided into facets, with each facet illuminated by a single laser flash. For example, a system providing a 360° field of view may comprise 10 modules, each with a 36° field of view. Additionally, each module may use 100 facet flashes to cover the 36° field of view, so that each facet flash illuminates at least 0.36°. In some embodiments, the laser has an energy of about 40 mJ per pulse and an effective pulse length of $\tau_L = 6$ ns, providing a pulse power of about $6.667 \times 10^6$ W. In embodiments employing eye-safe lasers, the laser wavelength may be greater than 1 µm, and in particular, greater than 1.3 µm, or greater than 1.6 µm. In some embodiments, the module emits multiple pulses per facet. In these cases, step 1501 may be repeated multiple times.

In step 1502, the system stabilizes the emitter and detector while detecting return pulses from objects within the facet field of view. As discussed above (for example, see FIG. 9) the area of detection is often an annular section, for example, with an inner radius around 5 km and an outer radius around 15 km. Accordingly, in this example, return pulses from objects within the detection zone may take between 10 km/c≈0.033 ms and 30 km/c≈1 ms. The module is stabilized for the total time of possible return pulses so that sensors within the detector do not receive signals from objects at multiple locations within the detection zone.

The step 1502 of receiving return pulses further comprises time-gating the sensor readouts. Time gating the sensor readouts allows the system to determine the distance from the module to the object or clutter that reflected the laser pulse. Then, the minimum quantum of distance, $\delta z$, resolved by each laser pulse, is: $\delta z=(0.5)c\delta t$, where $c=3\cdot 10^8$ m/sec is speed of light in air (vacuum) and $\delta t$ is the pulse width (for example, full width at half maximum). For example, for $\delta t=10$ nsec$=10^{-8}$ sec: $\delta z=1.5$ m, while for $\delta t=1$ nsec, $\delta z=15$ cm. The step of gating 1502 may comprise gating the detector at any rate up to the pulse repetition rate to obtain a desired distance resolution. The set of time gated sensor readouts, indexed by time, will be termed a set of voxels. Each pixel (i.e., sensor) has its voxel derivatives; each voxel with sizes: $a_x$, $a_y$, $\delta z$, where $a_x$, $a_y$ are pixel sizes, while $\delta z$ is the temporal (i.e., distance) resolution. It should be noted that this is an approximation based on a system mounted at height h that is small compared to the distance R between the system and the target. Systems, such as aircraft or helicopter mounted systems, where the height h is large or on the order of R. $\delta z$ may be replaced with $\delta R$, which provides non-orthogonal voxels, with sizes $a_x$, $a_y$, $\delta R$. Alternatively, such systems may translate the $\delta R$ values to $\delta z$ values. In these systems $\beta$ (FIG. 9) may be large, requiring an appropriate modification to the energy detection normalization set-up.

The module waits for at least the maximum return time for pulses to return from the farthest range of the detection zone. Then, in step 1503, the module translate the next facet and repeats the method. For ranges on the order of 15 km, the maximum return times will be around 0.1 msec. Accordingly, the maximum repetition rate is about 10 kHz for one laser pulse per facet. However, lasers meeting the requisite power parameters typically have maximum repetition rates of about 100-200 Hz. Additionally, in some embodiments, multiple pulses are emitted per facet. A 100 Hz laser frequency allows emission of one pulse per facet and a scan rate of 100 facets per second. Allowing a module with a 38° field of view and 100 facets to have a scan rate of 1 scan/sec.

In this example, with one module FOV per second, (f=1 Hz) assuming horizontal mechanical tracking with N=100 channels, there are $n^{-1}=10$ msec between facets, which is achievable by current mechanical systems. Total return time, $\Delta t$, is much smaller than tracking-step-time (TST):

$$(\Delta t) \ll (\text{TST}) = n^{-1} \quad (60)$$

since $\Delta t=10^{-4}$ sec, while (TST)$=10^{-2}$ sec. Therefore, the mechanical tracking system can be relatively stable, since, there is a lot of time for stabilization. In this example, 99% of the time, the laser is not operating; so, this time can be used for stabilization purposes.

Figure 16:
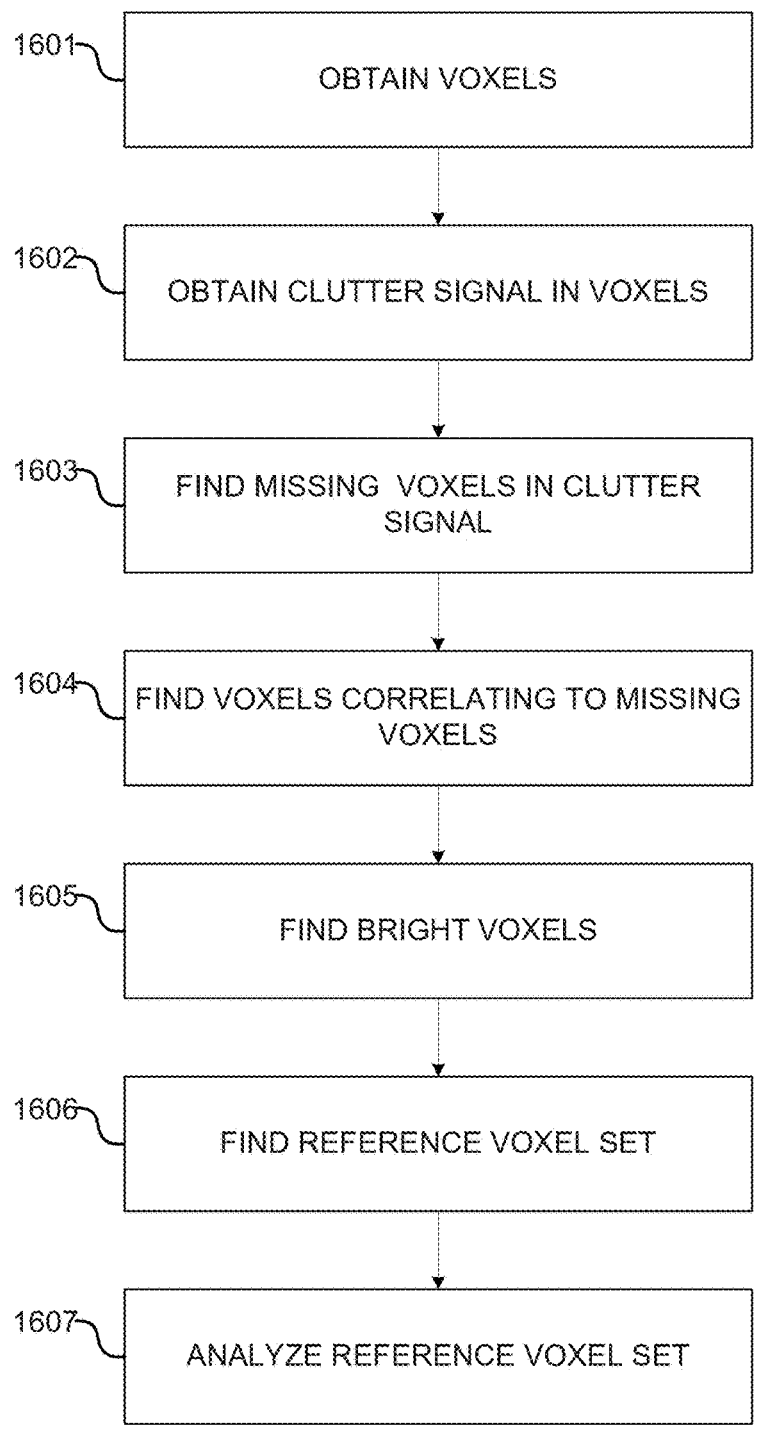
FIG. 16 illustrates an example of target detection.

FIG. 16 illustrates a method of target detection implemented by a system module. For example, this method may be performed by a detection processor 1105, RISC array 1104, or detection processor 1105 in combination with RISC array 1104. In step 1601, a set of voxels are obtained for processing. In some implementations, the set of voxels are a set of voxels from one facet of the module. In other implementations, the set of voxels may be obtained from some or all of the facets of the module. In some embodiments, the set of voxels may have been previously novelty filtered or otherwise processed by RISC array 1104.

In some cases, the set of voxels obtained in step 1601 depends on the environmental visibility. The atmospheric attenuation, $T_A$, may impact the detection range or the total detection space. $T_A$ is the atmospheric attenuation in the form:

$$T_A = e^{-\sigma R} \quad (61)$$

where R-distance from laser delivery sub-system to the target, and $\sigma$ is atmospheric attenuation coefficient, based on the following well-known phenomenological formula (defined as distance, V, where image contrast is reduced to 1%):

$$\sigma = \frac{3.912}{V}\left(\frac{\lambda_{550}}{\lambda}\right)^q \quad (62)$$

where V is called visibility, $\lambda_{550}$, is the reference wavelength at $\lambda=550$, $\lambda$ is the system laser wavelength, and $q=q(V)$ is a power factor. (It should be noted that function: $y=a^x$, where $a<1$, is a monotonically-decreasing function of x. Therefore, the $\lambda$-power factor in Eq. (35) is monotonically-decreasing function of q.) Since, q-factor is monotonically-decreasing function of V, therefore, the attenuation coefficient, $\sigma$, is a faster decreasing function of V, than $V^{-1}$.

As an example, in a system where $\lambda=1.6$ μm:

$$\lambda > 550 \text{ nm} \quad (63)$$

The well-known phenomenological formula of dependence: $q=q(V)$ has the form $$q = \begin{cases} 1.6, & \text{for } V > 50 \text{ km} \\ 1.3, & \text{for } 6 \text{ km} < V < 50 \text{ km} \\ 0.16\,V + 0.34, & \text{for } 1 \text{ km} < V < 6 \text{ km} \\ V - 0.5, & \text{for } 0.5 \text{ km} < V < 1 \text{ km} \\ 0, & \text{for } V < 0.5 \text{ km} \end{cases}$$

The visibilities of equivalent atmospheric conditions are summarized in Table 3.

TABLE 3

Visibilities and Equivalent Atmospheric Conditions

| # | Atmospheric Conditions | Visibilities |
|---|---|---|
| 1. | Exceptionally Clear | V > 50 km |
| 2. | Very Clear | 20 km ≤ V ≤ 50 km |
| 3. | Clear | 10 km ≤ V ≤ 20 km |
| 4. | Light Haze | 4 km ≤ V ≤ 10 km |
| 5. | Haze | 2 km ≤ V ≤ 4 km |
| 6. | Thin Fog | 1 km ≤ V ≤ 2 km |
| 7. | Light Fog | 0.5 km ≤ V ≤ 1 km |
| 8. | Moderate Fog | 0.1 km ≤ V ≤ 0.5 km |

According to simulations, the atmospheric attenuation coefficient relation:

$$\sigma = \sigma(V, \lambda) \quad (65)$$

includes both atmospheric absorption and atmospheric scattering, mostly represented by so-called Mie scattering. This modeling should be understood in such a sense that only "ballistic" photons reach photodetector array while both absorbed and scattered photons do not reach the receiver sub-system.

The attenuation coefficient value, $2\sigma$, can be presented as a function of visibility, V, for specific wavelength, $\lambda$, in the look-up table form, as shown in Table 4, for $\lambda=1.6$ μm, in the visibility range; V=1 km-6 km. According to Table 3, it is equivalent to thin fog (1 km≤V≤2 km), through haze (2 km≤V≤4 km), and part of light haze (4 km≤V≤10 km).

TABLE 4a

Look-Up Table for 2σ, Versus Visibility Range: 1-2 km

| V [km] | 1.1 | 1.2 | 1.3 | 1.4 | 1.5 | 1.6 | 1.7 | 1.8 | 1.9 | 2.0 |
|---|---|---|---|---|---|---|---|---|---|---|
| q | 0.52 | 0.53 | 0.55 | 0.56 | 0.58 | 0.60 | 0.61 | 0.63 | 0.64 | 0.66 |
| 2σ [km$^{-1}$] | 4.08 | 3.70 | 3.35 | 3.07 | 2.81 | 2.58 | 2.40 | 2.22 | 2.08 | 1.93 |

TABLE 4b

Same as 2a, for V = 2-3 km

| V [km] | 2.1 | 2.2 | 2.3 | 2.4 | 2.5 | 2.6 | 2.7 | 2.8 | 2.9 | 3.0 |
|---|---|---|---|---|---|---|---|---|---|---|
| q | 0.68 | 0.69 | 0.71 | 0.72 | 0.74 | 0.76 | 0.77 | 0.79 | 0.80 | 0.82 |
| 2σ | 1.80 | 1.70 | 1.59 | 1.51 | 1.42 | 1.34 | 1.27 | 1.20 | 1.15 | 1.09 |

TABLE 4c

Same as 2a, for V = 3-4 km

| V [km] | 3.1 | 3.2 | 3.3 | 3.4 | 3.5 | 3.6 | 3.7 | 3.8 | 3.9 | 4.0 |
|---|---|---|---|---|---|---|---|---|---|---|
| q | 0.84 | 0.85 | 0.87 | 0.88 | 0.90 | 0.92 | 0.93 | 0.95 | 0.96 | 0.98 |
| 2σ [km$^{-1}$] | 1.02 | 0.98 | 0.93 | 0.89 | 0.85 | 0.81 | 0.77 | 0.74 | 0.71 | 0.68 |

TABLE 4d

Same as 2a, for V = 4-5 km

| V [km] | 4.1 | 4.2 | 4.3 | 4.4 | 4.5 | 4.6 | 4.7 | 4.8 | 4.9 | 5.0 |
|---|---|---|---|---|---|---|---|---|---|---|
| q | 1.00 | 1.01 | 1.03 | 1.04 | 1.06 | 1.08 | 1.09 | 1.11 | 1.12 | 1.14 |
| 2σ [km$^{-1}$] | 0.65 | 0.63 | 0.60 | 0.58 | 0.55 | 0.53 | 0.51 | 0.49 | 0.48 | 0.46 |

TABLE 4e

Same as 2a, for V = 5-6 km

| V [km] | 5.1 | 5.2 | 5.3 | 5.4 | 5.5 | 5.6 | 5.7 | 5.8 | 5.9 | 6.0 |
|---|---|---|---|---|---|---|---|---|---|---|
| q | 1.16 | 1.17 | 1.19 | 1.20 | 1.22 | 1.24 | 1.25 | 1.27 | 1.28 | 1.30 |
| 2σ [km$^{-1}$] | 0.44 | 0.43 | 0.41 | 0.40 | 0.38 | 0.37 | 0.36 | 0.34 | 0.33 | 0.32 |

The system may handle the impact of visibility in various ways. For example, the step of obtaining voxels 1601 may comprise obtaining a reduced set of voxels in lower visibilities. As another example, the step of obtaining voxels 1601 may comprise angling the system to provide a detection range (e.g. 402, FIG. 4B) that is closer to the system, so that the entire available detection range (402) is visible.

Step 1601 may also include an automatic dynamic range adjustment procedure. For example, the system may adjust the pupil 1109 (if present), activate a second detection system having a different dynamic range, or activate a splitter 1110 (if present). If a second detector (from a second detection system or from a second detector 1103') is used, the system builds the voxel space from the combined signals of the two detectors.

In step 1602, a clutter signal is obtained from the set of voxels. For example, in a system deployed on a ship mast, a clutter signal will occur at the voxels corresponding to sea level. As described above, measured distance is a function of laser pulse return time and gating speed. FIG. 17B illustrates a "light line" of sea level clutter measured because of this relationship. FIG. 17A illustrates the corresponding system geometry. The system 1748 is at a height h above sea level. The system emits a laser pulse (including optical ray 1479) that reflects off of sea level clutter creating "light line" 1753, which manifests a plane of clutter signals in the three-dimensional set of voxels.

In step 1603, voxels are missing from the expected clutter signal are detected. For example, in a clutter plane created by sea level, missing voxels are created by objects (such as targets or other clutter objects) blocking the laser pulse and causing an early return pulse or by absorbing the laser pulse, causing a late or non-existent return pulse. For example, in FIGS. 17A and B, the optical ray 1749 is not reflected at sea level 1751, but rather at the sea clutter (sea wave) at point 1750. At FIG. 17B, expected clutter at light line 1753 is broken in point 1754. As illustrated in FIG. 17B, all reflection points at the sea level are located on light line with their z-coordinate on z-axis. However, because of light line symmetry breaking, the reflection point "moves" from point 1754 to point 1755, with $z_1$, $z_2$-coordinates shown both in FIGS. 17 A and B, where (arrows 1756 and 1757 have equivalent interpretation):

$$\Delta z = z_2 - z_1 \qquad (66)$$

In FIG. 17B, projection of points 1754 and 1755 (or, their equivalents 1750 and 1751 shown in FIG. 17A) on ct-axis is such that their distance, at ct-axis is $2\Delta z$, while their distance at z-axis is only $\Delta z$, which explains 26.56°-angle value of line 1753, since tan 26.56°=0.5.

Figure 18A:
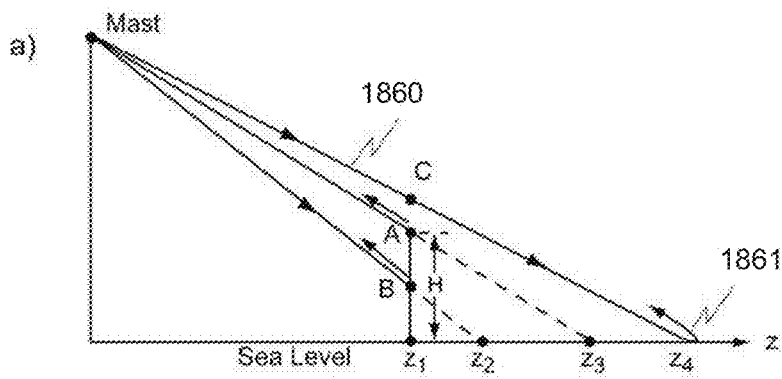
FIGS. 18A-C illustrate example steps of target detection methods.
Figure 18B:
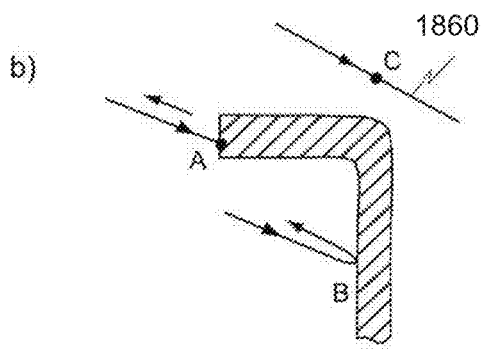
Figure 18C:
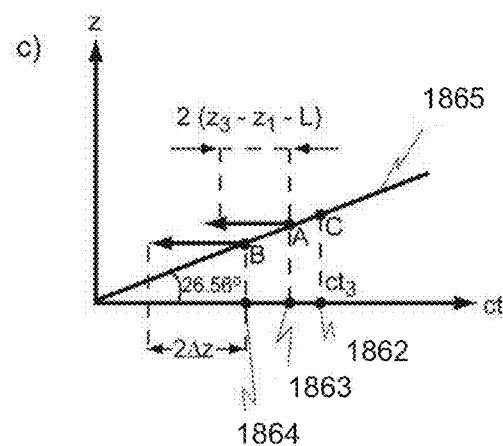

The light line symmetry breaking situation becomes more complex in the case of other targets. For example, FIGS. 18A-C illustrate the situation of light line symmetry breaking in periscope detection. In FIG. 18A, three points A, B, C are shown, including the periscopic entrance/exit A; a low-brightness target at the periscopic surface B, (which acts as a reference clutter reflecting object) and a clutter point C. Clutter point C is illustrated in FIG. 18B where optical ray 1860 passes point C, reflecting at distant point 1861 ($z_4$-coordinate). Therefore, this clutter object has the largest coordinate: $ct_3$, as 1862, with smaller ct-coordinate 1863 for A-point, and smallest one 1864, for B-point.

For clutter point, C, the symmetry is not broken, because C-point is located at light line 1865. The most broken light line symmetry is for low-brightness point B, since, this breaking value is: $2\Delta z$, where $\Delta z = z_2 - z_1$. High-brightness A-point has symmetry breaking less than $2(z_3 - z_1)$, because there is pulse time delay due to optical ray penetrating the periscope's interior. Assuming that the optical ray is reflected at the periscope and at its eye piece, this extra time delay is $2L$, in ct-coordinates, where L is the periscope length. However, in the case of reflection from intermediate retro-surface, with distance, $L'$, from periscope point A, this extra time delay will be $2L'$, in ct-coordinates, where $L' < L$, where L-periscope length.

The number of t-cell units: $\delta z = (c\delta t)/2$, this extra time-delay provides is as follows. For typical marine (mast) platforms (h=50 m), and typical R-distances, (R=10 km), and for typical A-point height (H=3 m), the $|z_3-z_1|$-distance is about 600 m, and $\delta z = 1.5$ m, for $\delta t = 10$ nsec. Therefore, for periscope length; L=12 m:

$$\left(\frac{z_3 - z_1}{\delta z}\right) = \frac{600 \text{ m}}{1.5 \text{ m}} = 400; \frac{L}{\delta z} = \frac{12 \text{ m}}{1.5 \text{ m}} = 8; \frac{(z_3 - z_1 - L)}{\delta z} = 392 \quad (67abc)$$

Therefore, the value of periscope length in t-cell units is 8; i.e., location of point A is separated by 8-number of t-cells (or, 8-number of voxels) from point, B. This is a significant value, which can be used as an extra temporal signature of periscopic target, even for single-pulse reflection.

The clutter point C is separated far from points A and B, in t-cell units, since, according to Eq. (67a), for $|z_4-z_1| \cong |z_3-z_1|$, we have about 400-units separation. Therefore, the related clutter is separated quite far from periscopic points' location, in t-cell units; thus, providing significant t-cell or, voxel $\delta r$-units, separation. Accordingly, if target point, A, is located at (m+8)th voxel, for example, by using Eq. (39), the low-brightness periscopic point, B, is located at mth voxel, while C-point is located at (m+392)th voxel, according to Eq. (67). Therefore, the noise signals from reflective points, B and C, do not bias target signal from high-brightness point, A. In various embodiments, targets may be detected using the t-cell separation of signals from background clutter signals as determined from the voxel readouts.

Returning to FIG. 16, in step 1604, the voxel set is evaluated to determine the location in voxel space of reflections causing the missing voxels in the clutter signal. These voxels are identified as potential target signals. The potential target signals may be located in front of or behind their corresponding clutter signal (i.e., the target may reflect rays that return prior to rays striking surrounding clutter or the target may reflect rays that return after rays striking surrounding clutter). In some embodiments, this may comprise searching for the nearest voxel in $\delta r$-units to a voxel missing from the clutter signal.

Figure 19:
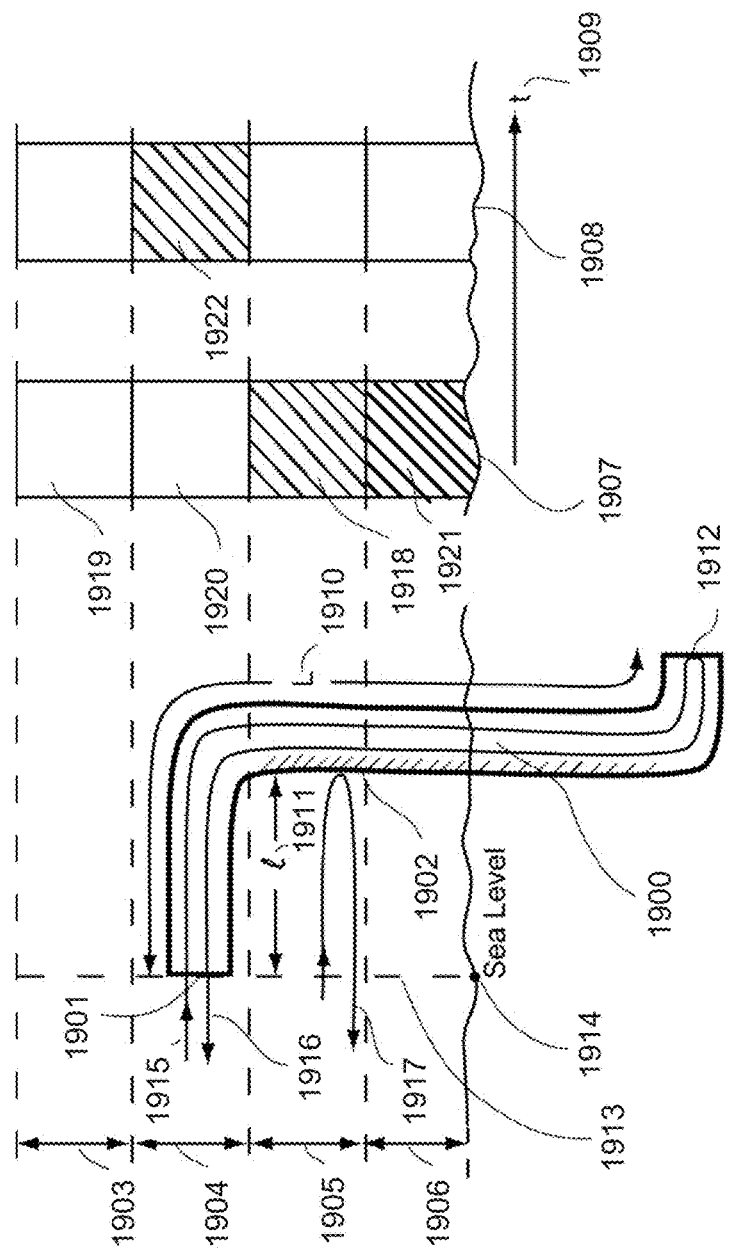
FIG. 19 illustrates voxel coherence in a vertical line of voxels.

In other embodiments, step 1604 may comprise detect voxel coherency signals. FIG. 19 illustrates voxel coherence in a vertical line of voxels. Typically, the pixel optical power of an image of integrated clutter, such as that of sea level, or Lambertian solid state (false) target such as a boat, a ship, a rock, is comparable with the optical power from strong non-Lambertian target such as retro-reflection from a periscope. Such integrated clutter can be used as temporal reference for establishing IOS voxel coherency, as shown in FIG. 19. This integrated clutter may be used as a temporal reference because the location of Lambertian objects and non-Lambertian target in voxel space are usually located in different time-resolution voxel coordinates.

Vertical voxel coherency is illustrated in FIG. 19. A target comprises periscope 1900, with its entrance 1901, and its side 1902. The side 1902 represents integrated Lambertian solid-state clutter working here as a voxel reference. Four (4) vertical pixels are considered for the sake of explanation, their object-inverse areas are 1903, 1904, 1905, and 1906 (i.e., each pixel's vertical field of view (inverted)), respectively. Their voxel sets (derivatives) are represented by two exemplary columns 1907 and 1908. Time coordinate 1909 illustrates that voxel column 1908 occurs later on the time scale than column 1907 (i.e., voxels in column 1908 measure signals that are farther than voxels in column 1907). Periscope 1900 total length is L 1910, while its frontal horizontal length is l 1911. For sake of simplicity, only one retro-reflection is assumed to occur from retroreflective surface 1912. Therefore, using vertical line 1913, with its bottom point 1914, at sea level, the extra time delay for incident ray 1915 and its retroreflected ray 1916, is: $2L=c\Delta t_1$, where $\Delta t_1$ is total extra return-time for ray passing whole periscope interior, reflected from retro-surface 1912 and passing backward through periscope interior. For laser pulse, with temporal length, $\delta t$, representing voxel length in light units, $\delta z$ (where: $\delta z=(0.5)c\delta t$), this extra time delay $\Delta t_1$, is equal to the following number of light units: $N_1=L/\delta z$. For example, for $\delta z=1.5$ m and L=12 m, we obtain: $N_1=12/1.5=8$. Using the same reasoning, the extra time delay for Lambertian clutter 1902, is: $N_2=l/\delta z$. For example, for l=30 cm: $N_2=0.3/1.5=0.2$; i.e., practically the same time cell as without any extra delay. Therefore, the retroreflected signal 1916 comes 8-light units (or 8 voxels columns in the $\delta z$ direction) later than reflected signal 1917, while the general formula; is: $\Delta N=N_1-N_2=8-0.2 \cong 8$. The voxel column 1907 represents extra-time delay for reflected ray 1917, while the voxel column 1908 represents extra-time delay for reflected ray 1916. Thus, voxels 1918 and 1921 have signals, while voxels 1919, and 1920 are empty. Similarly, for column 1908, only voxel 1922 has a signal.

The temporal relation between voxel columns 1907 and 1908 represents an example of voxel coherency. By retrieving and analyzing all voxels from these columns, the system can identify two meaningful voxels 1918 and 1922, representing the information about mutual location of two reflected signals 1916 and 1917. In turn, the system can perform reasoning about presence of periscope 1900, in respect to reference clutter 1902. We see that this specific periscopic information can be obtained without using distinctive periscope optical signals, due to reference clutter 1902 which has comparable pixel signal power with high-brightness retro-reflected signal 1916.

Figure 20:
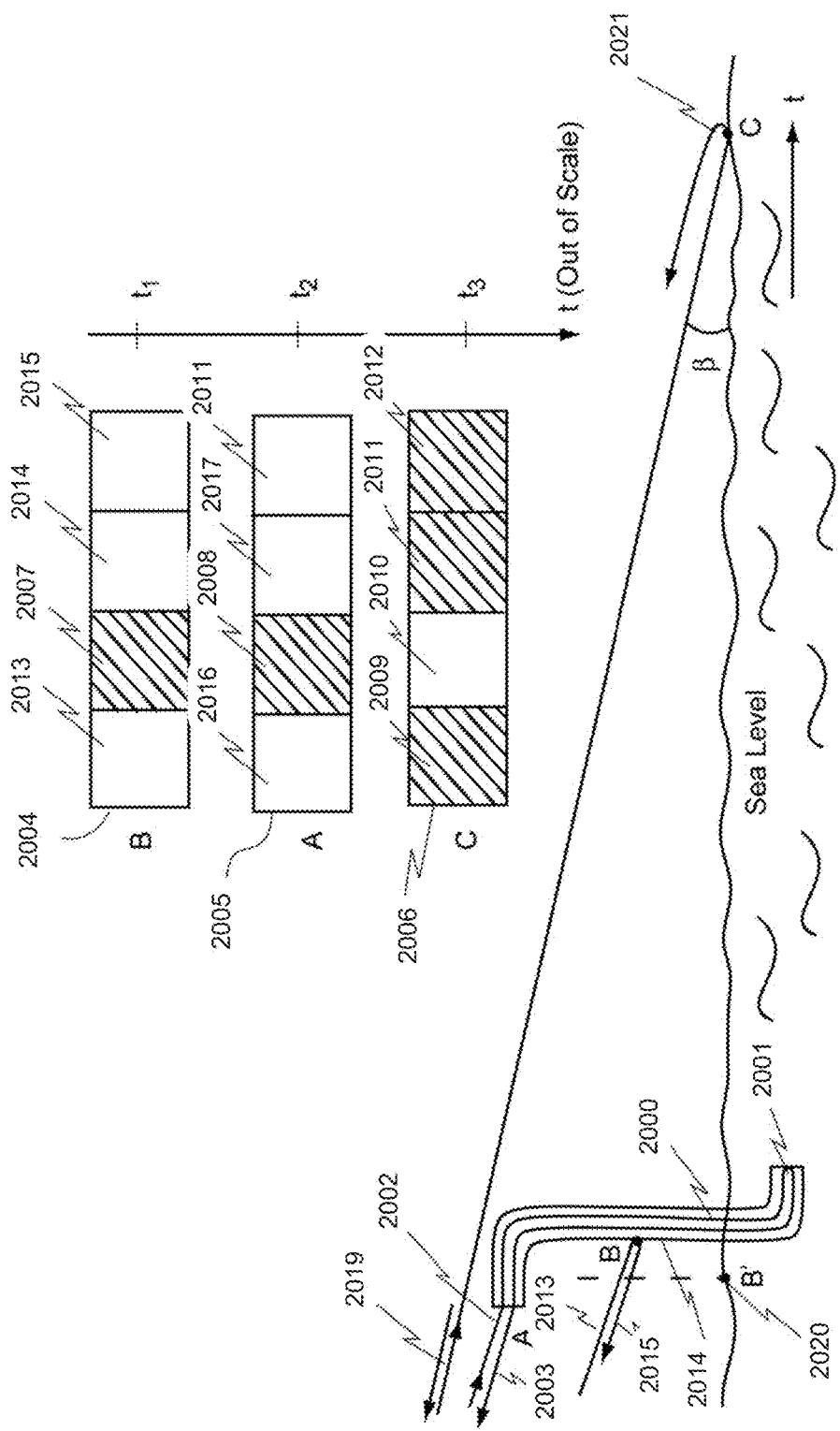
FIG. 20 illustrates an example of horizontal voxel coherency.

Voxel coherency analysis may also be applied using all available dimensions of the voxel space. FIG. 20 illustrates an example of horizontal voxel coherency. Indeed, in some embodiments, rather than a two dimensional sensor array, a one dimensional sensor array is used. The one dimensional sensor array is arranged horizontally, in which case, only horizontal voxel coherency analysis is available.

FIG. 20 presents a case of horizontal voxel coherency involving a periscope 2000, and retro-reflected beam from only one retroreflective surface 2001. Point A is at the periscope entrance with incident ray 2002 and retroreflected ray 2003. In this figure, we consider three reflective objects A, B, C, representing: high brightness retro-reflective object, A, reference solid clutter B, and the 2nd reference sea clutter C, respectively. The slant of ray 2019, 2003, 2015 has slant angle, β. β is shown, out of scale, because, in practice, for the marine (mast) platforms, this slant is very small (β<<1). Three exemplary voxel horizontal arrays, 2004, 2005, and 2006, are shown, representing the same horizontal pixel array, but different arrival times: $t_1$, $t_2$, $t_3$ out of scale (i.e., difference between them is not the same). Signal-filled voxels are 2007, 2008, 2009, 2011, and 2012, while empty voxels are 2013, 2014, 2015, 2016, 2017, 2018, and 2010.

The incident ray 2013 strikes solid reference clutter 2014, and its reflected ray is 2015. This reflected ray 2015 has the earliest arrival time, $t_1$, represented by voxel array 2004. The retro-reflected ray 2003 has the second arrival time, $t_2$, represented by voxel array 2005. The 3rd incident ray 2019 is reflected at sea point C, denoted as 2021, and incoming as reflected ray 2019, much later than other reflected rays 2003 and 2015, at arrival time, $t_3$, represented as voxel array 2006. The distance between bottom point, B', denoted as 2020 and C-reflection point, 2021, is very large, say 600 m, for example. Therefore, from general formula: $(t_3-t_2)=(2\times 600 \text{ m})/(3\cdot 10^8 \text{ msec})=4\cdot 10^{-6}$ sec, while for spatial voxel quant of δz=1.5 m, this distance, in light units, is: $(N_3-N_2)=(600 \text{ m})/(1.5 \text{ m})=400$; i.e., very large, in comparison with periscope return time for example (eight (8) light units); thus, $(N_2-N_1)=8$. Therefore, voxel arrays 2004 and 2005 are relatively close to each other ($N_2-N_1=8$), while voxel arrays 2005 and 2006 are far away ($N_3-N_2$)=400.

The horizontal voxel coherency signature is represented by graphical voxel pattern of three horizontal voxel arrays 2004, 2005, and 2006, in respect to signal-filled voxels and empty voxels. In particular, horizontal voxel array 2006 demonstrates a characteristic missing-tooth pattern, with "missing" voxel (or "hole") 2010, while this missing voxel is located at other voxel array 2005, at voxel 2008. The second reference voxel is 2007, represents solid (hard) reference clutter B. This clutter plays a dual role, not only as regular clutter (a noise) but also as reference object, allowing the system to identify (ID) periscopic target 2000 as well us to find its location, with single time cell accuracy (~1.5 m). This is done even without two-pulse operation. In further embodiments, the reference clutter may additionally or alternatively comprise the ground, clouds, or distant background objects.

Figure 21:
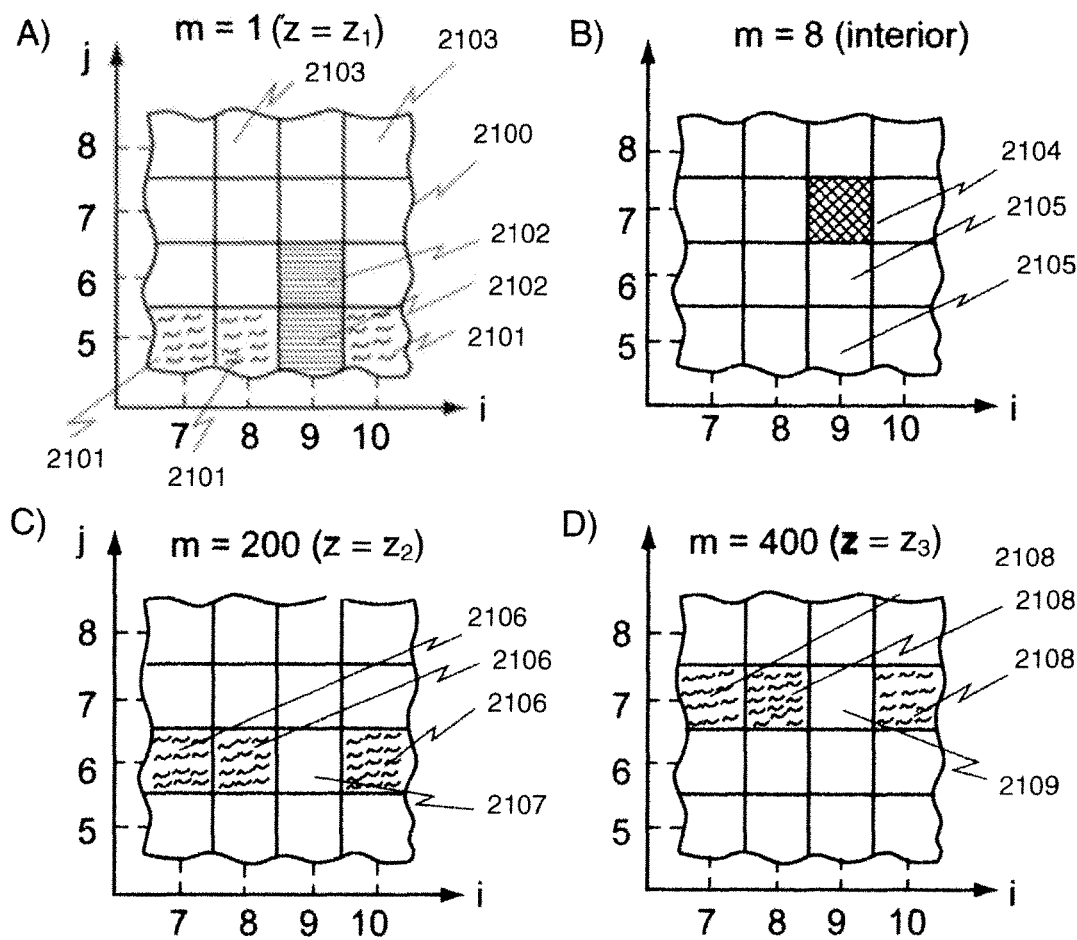
FIG. 21A-D illustrate space-time correlation between voxels.

In general, detectable targets will show significant space time voxel coherency. FIGS. 21 A-D illustrate some general space-time voxel coherency. All these clutter/target objects are represented by related voxel intensity values:

$$I=I(i,j,m) \quad (68)$$

where; i, j, m—are integers, defining given voxel index; e.g., $$I_{i,j,m}=I_{2,5,151}=I(2,5,151)=2.5\cdot 10^{-5} \text{ W/cm}^2 \quad (69)$$

where: i-index defines voxel's x-coordinate (horizontal); j-index defines voxel's y-coordinate (vertical); and, m-index defines voxel's ct-coordinate (in light units).

In FIGS. 21A-D, illustrations of space-time correlation between voxels' intensities, as defined by Eqs. (40-41), are shown. The location of reflective point, B, has longitudinal coordinate, $z=z_1$, indexed by m=1, in FIG. 21A, where pixel fragment of 16-number of voxels, 2080, is shown, with exemplary ith-indexes: 7, 8, 9, 10, and jth-indexes: 5, 6, 7, 8. In FIGS. 21B, 21C, and 21D, the voxels with the same i, j-indexes, but different m-indexes, are shown.

Returning to FIG. 21A, the lowest jth index: 5 represents sea level, at $z=z_1$, illustrated by three (3) wavy voxels 2101, including also low-brightness periscopic reference clutter (ie., the body of the periscope), B, denoted as 2102, which covers two y-levels (~5 m height). This is a kind of integrated clutter filling all pixel size, (for example, for f=20 cm, R=10 km, the resolving element is about 2.5 m×2.5 m), however, its optical power/intensity is medium-range, comparable with integrated sea clutter intensity range. Therefore, both "wavy" and "horizontal" lines' voxel marks represent comparable medium-range intensity. In contrast, "empty" voxels, as 2103, represent low intensity levels.

In FIG. 21B, the optical beam reflected from periscopic interior, represented by high-brightness target, A, is shown 2104, detected by voxel with coordinates: (9, 7, 8). The voxel 2104, as representing high-brightness target, is marked by crossed double-diagonal lines. Now, voxels 2105 are empty, with low intensity levels (from only stray light); because, the beam was reflected earlier, detected by 2102 voxels.

In FIG. 21C, $z=z_2$ longitudinal coordinate is represented. Therefore, the beam is reflected from integrated sea clutter (if, it is located at sea level), represented by "wavy" voxels, 2106, while voxel, 2107, is empty, because the related beam has been detected by upper voxel, 2102 (with coordinates: 9, 6, 1. Its m=200, assuming that target B's height is half distance of that of target A (i.e., equal to H/2).

In FIG. 21D, the integrated sea clutter at sea level, is reflected, represented by "wavy" voxels 2108, while voxel, 2109, is empty, because the related beam has been detected by pixel, 2104, in FIG. 21B.

In summary of FIGS. 21A-D, voxels such as 2101, 2102, 2104, 2105, 2106, 2107, 2108, and 2109, are correlated by some space-time relation, representing certain anomalous event, namely, laser reflection off a target (such as a periscope). Otherwise, all voxels with the following j-coordinates:

$$j=5, \text{ in FIG. 21A}; j=6, \text{ in FIG. 21C}, j=7, \text{ in FIG. 21D} \quad (70)$$

will be filled by light reflected from sea level, assuming sea clutter at sea level. The exception would be sea waves with amplitudes exceeding 2.5 m (assuming exemplary conditions). These waves start to occupy some voxel, with jth coordinates, higher than those in Eq. (42), such as j=6, in FIG. 21A; or j=7, in FIG. 21C, for example. However, such waves would typically not provide the voxel coherency signals associated with targets.

In some implementations, the signal from high-brightness targets (such as non-Lambertian reflectors) will tend to be smaller than the signal from surrounding clutter. This is because, although high-brightness targets reflect a greater amount of light per unit area back to the system, the clutter signal will be integrated over a much larger area. The system parameters may be set so that the upper range of the dynamic range of the detector 1103 encompasses the expected signal from large area clutter. In some embodiments, for example where some target signals may be greater than their reference clutter signals (for example, an ocular target on a vessel with light absorbing paint), some system parameters may be adjusted. For example, a pupil 1109 may be used to reduce the light gathering ability of the system to bring the target signal within the dynamic range of the detector.

In some embodiments, a second detection system may be employed in parallel. FIG. 11C illustrates such an embodiment. For example, a first detection system with a high light gathering ability may be used to detect low brightness signals while a second detection system may have a reduced light gathering ability to detect high brightness signals.

Alternatively, a splitter 1110 may allow two detectors 1103, 1103' and detector electronics 1104, 1104' to operate in parallel. One detector 1103' may be configured to detect higher brightness signals than the other 1103, for example by having larger sensor sizes or by having more sensitive sensors. In this case, each RISC 1108, 1108' array 1104, 1104' provides its output to the detection processor 1105 and the detection processor 1105 builds a combined voxel space from the two outputs.

In a further embodiment, the pupil 1109 is on only one branch of the detection subsystem. FIG. 11D illustrates such an embodiment. Here, compared to FIG. 11C, the pupil 1109 is after the splitter 1110.

In these embodiments, detectors 1103 and 1103' may have different sensor sizes to accommodate the changes in light gathering ability introduced by the pupil 1109. As discussed herein, photodetectors 1103 and 1103' may be various types of detectors. For example, they may be APDs or solid-state photomultipliers, satisfying performance conditions such as sufficiently low NEP (preferably on the picowatt order), sufficiently high speed (for example, greater than 100 MHz), and availability in an array configuration (either one-dimensional or two-dimensional).

In still further embodiments, further photo detection branches may be employed. For example, three or four photo detection branches may be employed.

In other embodiments, for example, those using binary detection signals instead of multi-valued detection signals, high brightness signals are allowed to saturate the detector. Accordingly, the gain of the detector is set for expected low signal levels, such as signals expected from low reflective reference clutter objects, such as absorptive vessel bodies.

Returning to FIG. 16, in step 1605, bright voxels are detected. Bright voxels are those voxels having a signal greater than clutter signal. For example, bright voxels may be defined as voxels having a signal some predetermined amount more than a clutter signal. The clutter signal threshold may be determined by averaging the clutter signals received during the current voxel readout, or over some period of operating time. Bright voxels may be created by reflections from various targets. For example, bright voxels may be created by reflections off of one or more retroreflective surfaces. For example, voxels 2104 from FIG. 21B, 2008 from FIG. 20, and 1922 from FIG. 19 may be bright voxels.

In step 1606, a reference voxel set (RVS) corresponding to the bright voxel is detected from the voxel readout. The reference voxel set comprises clutter signals from clutter surrounding the target (for example, the clutter signals surrounding the missing voxels detected in step 1603). The reference voxel set may further comprise voxels nearby the bright voxel that may be reflected by other parts of the target. Such other voxels will have signal levels commensurate with clutter signals, but will be within some predetermined distance of the bright voxels.

In step 1607, the reference voxel set and its relationship to the bright voxel is analyzed for target detection. For example, in one embodiment the distance between the bright voxel and all or a portion of the reference voxel set is determined. For example, in FIGS. 21A-D the distance between missing voxel 2102 and its gap 2107, is significant and equal to Δm=200−1=199, while, in the case of typical sea waves, such distances will be rather small (because, their heights are rather smaller). Based on the analysis, targets may be detected and identified. For example, periscopes or other ocular devices may be detected.

In some implementations, various truthing experiments may be performed to determine a figure of merit (FoM) necessary for step 1607 to detect and identify a target. An example of such an analysis would be optical periscope detection, against sea clutter and other false targets. The FoM may be developed pursuant to probability of false alarm (PFA), false alarm rate (FAR), false positives, false negatives, and other considerations. The FoM may be developed using a statistical analysis, based on Bayesian inference (BI). For example, various mock-ups of different target types and different reference clutter types (such as different periscopes on different submarines) may be used to determine appropriate reference clutter and target signals. In particular, these truthing experiments may be used to maximize the PPV of the system.

For the sake of explanation and to simplify Bayesian inference (BI), two binary events are considered: signal, or true target; and, noise (clutter), or false target. The event of detection of a signal is denoted S; and, the sensor readout corresponding to the event as S'. Similarly N (event) and N' (sensor readout) will denote noise. Then, two absolute probabilities: p(S), and p(N), mean probability of signal and noise, respectively, with conservation relation:

$$p(S)+p(N)=1 \tag{71}$$

because there are only two exclusive events. There are four conditional (direct) probabilities:

$$p(S'|S)\text{—probability of detection (PoD)} \tag{72a}$$

$$p(N'|N)\text{—probability of rejection (PoR)} \tag{72b}$$

$$p(S'|N)\text{—probability of false positives} \tag{77c}$$

$$p(N'|S)\text{—probability of false negatives} \tag{77d}$$

For example, p(S'|S) means the probability, that, under signal event, sensor readout will also show signal. Also, p(S'|N) is probability that positive readout (S) is false (since event is noise). Therefore, it can be also called probability of false alarm (PFA); or, the false alarm rate (FAR).

In the case of the BI, inverse conditional probabilities can be mathematically derived from the absolute and direct conditional probabilities. For example, positive predictive value (PPV) is: p(S|S'); i.e., probability of signal event, assuming, that signal readout did occur. According to the Bayesian paradox:

$$(PPV)=p(S|S') \tag{78a}$$

$$(PPV)<(PoD) \tag{78b}$$

The PPV figure is defined as (assuming large number of samples):

$$PPV = \frac{\text{Number of True Alarms}}{\text{Number of All Alarms}} \tag{79}$$

Therefore, the PPV may be utilized as a FoM for periscopic target truthing (or experimental validation) experiments; i.e., for testing a system while simulating (or, real) true targets (periscopes) and false targets (oculars, small boats, sea clutter, etc.) and with possible increasing P(S) to higher values than in likely real-world scenarios (for training purposes).

In general, it is desirable to minimize p(S'|N) and p(N'|S) while maximizing PPV. Additionally, as false negatives represent missed targets, it is desirable to obtain a very low amount of false negatives. This can be done independently of PoD by minimizing false positive with respect to p(S): p(S'|N)<p(S).

Figure 22:
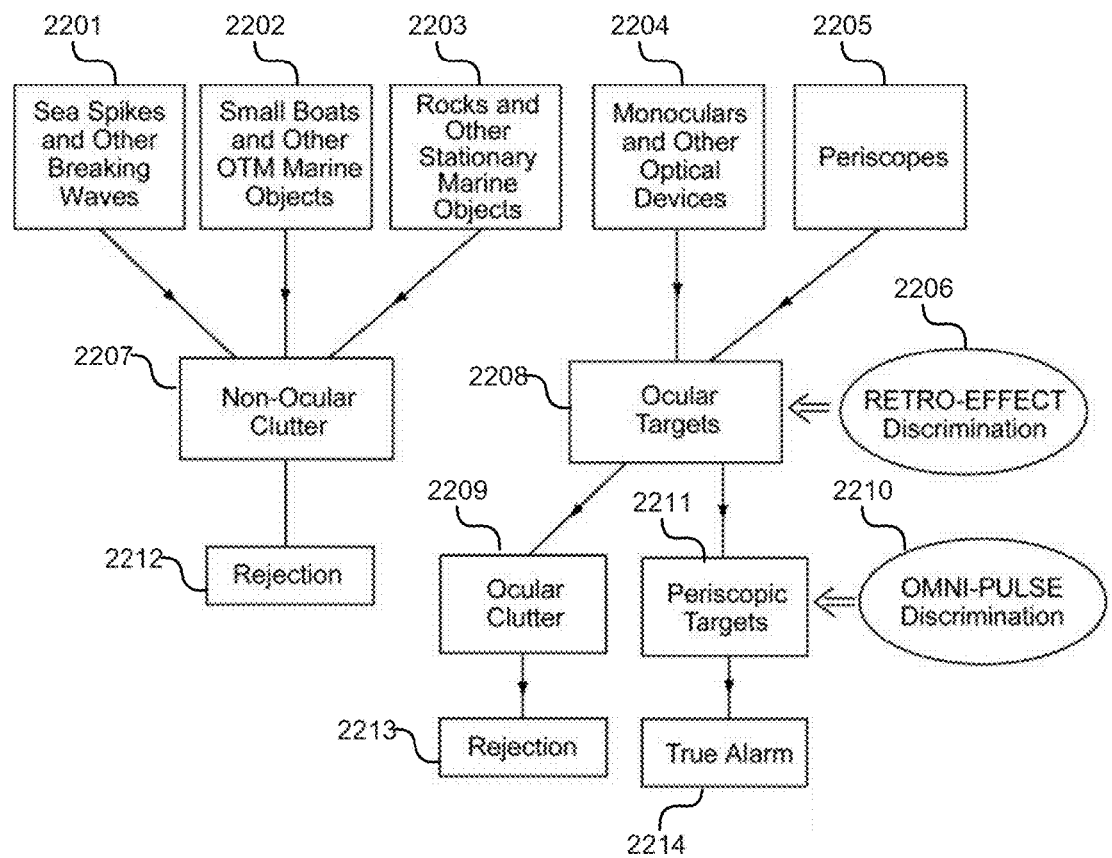
FIG. 22 illustrates a inference method of target detection discrimination for periscopes.

FIG. 22 illustrates a method of target detection discrimination for periscopes through inference. In typical environments where periscopes 2205 are present, various clutter objects may also be present. For example, sea spikes, breaking waves, and other natural water formations 2201, and small boats and other moving objects 2202, rocks and other stationary objects 2203 may be present in the environment. Additionally, objects such as monoculars or other ocular devices 2204 (e.g., an OAD 901 (FIG. 9)) may have some similar characteristics to periscope 2205 that would make them difficult to discriminate from periscopes 2205.

In step 2206, sensor readouts are evaluated to detect a retroreflective effect to discriminate non-ocular clutter 2207 from ocular potential targets 2208. Retroreflection occurs when a refracting optical element and a reflective surface are arranged so that the focal surface of the refractive element coincides with the reflective surface. Optical systems, such as periscopes, binoculars, cameras, monoculars, other optical devices, and eyes, often exhibit retroreflection, at least for incident rays within the field of view of the optical system. The light reflected from a retroreflectors is reflected back to its source with little divergence or no divergence. In some cases, the light reflected back from a retroreflector may have a beam divergence of 0.25° or less. However, in other cases, the light reflected back from a retroreflector may have a greater beam divergence. Accordingly, the retroreflected signal from ocular potential targets 2208 will be greater than the non-ocular clutter 2207, which typically exhibit Lambertian, near-Lambertian, or other divergent scattering. Accordingly, for voxels away from the clutter plane caused by sea level, signal strength may be used to discriminate between non-ocular clutter 2207 and ocular potential targets 2208. Any signals from non-ocular clutter 2207 may be rejected 2212. In some embodiments, the voxel readouts include measured signal strength. In other embodiments, the voxel readouts are binary, with a signal detected if measured signal strength is above a threshold. This threshold may be set to a value likely to exclude non-ocular clutter 2207 from ocular potential targets 2208.

Figure 23:
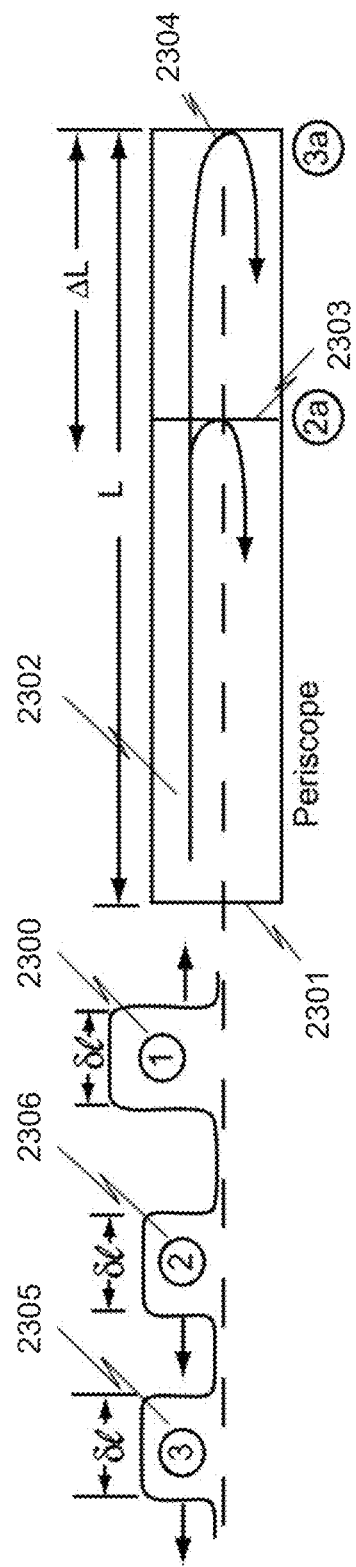
FIG. 23 illustrates an additional method of target detection discrimination for periscopes.

Omnipulse discrimination 2210 may be used to distinguish between ocular clutter 2209 (such as optical device 2204) and periscope targets 2211. Omnipulse discrimination 2210 refers to using the tendency of a periscope to produce multiple retroreflective return signals for target discrimination. FIG. 23 illustrates this method. The omnipulse method is illustrated for two return-pulses, for simplicity. Assuming laser pulse temporal length, $\delta t$, and its spatial length, $\delta l$, we have:

$$\delta l = c \delta t \tag{80}$$

For example, for $\delta t=10$ nsec, $\delta l=3$ m, but for $\delta t=1$ nsec, $\delta l=30$ cm.

In FIG. 23, the incident laser pulse, 2300, is incident at the entrance/exit of perioscope, 2301, penetrating perioscope interior, 2302. Then, it is reflected from the $1^{st}$ retro-surface (which is any focal plane), such as reticle (2a), 2303; then, passing $\Delta L$-distance (with L-periscope length), and reflecting from the $2^{nd}$ retro-surface, such as eye piece, (3a), 2304.

As a result, two return pulses, 2305 and 2306 occur. More than two retroreflective return pulses may occur, including pulses for all possible (relay) focal planes. Such surfaces do not need to have central reflection interface, since, vignetting retro-reflection may occur (reflections from boundaries is sufficient.) In order to obtain the pulse separation, the following condition has to be satisfied:

$$2\Delta L > c\delta t; \Delta L > \frac{c\delta t}{2} \tag{81}$$

For example, for $\delta t=10$ nsec, Eq. (81) yields: $\Delta L>1.5$ m; but, for $\delta t=1$ nsec, $\Delta L>15$ cm. Therefore by reducing laser pulse temporal length, $\delta t$, can increase the omnipulse resolution, since, for $\delta t=1$ nsec, the separation between two retro-surfaces must be larger than only 15 cm. Eq. (81) can be generalized for a number of retro-surfaces larger than two; assuming condition (81) satisfied for any two sequent retro-surfaces.

Returning to FIG. 22, omnipulse discrimination 2210 may be used to distinguish and reject 2213 ocular clutter 2209 from periscopic targets 2211, which cause the occurrence of a detection event 2214. An omnipulse signature is typically characterized by multiple return pulses from a single x,y, location but with different return pulse times (and hence, different z locations in the voxel readout). In one embodiment, omnipulse signatures may be determined for various different periscope types. These omnipulse signatures may be detected in the voxel readouts and used for target identification. In another embodiment, any reading have the characteristics of an omnipulse is viewed as a potential target. Various other inferential rules, such as use of reference integrated clutter may then be applied to distinguish between a false positive and true positive.

Returning to FIG. 16, in some implementations step 1601 comprises obtaining multiple voxel readouts from different times. This allows detection of changes in the detection zone. When multiple time indexed voxel readouts are accumulated, the resultant space may be indexed using four dimensions. The set of four-tuple indexed voxels obtained from multiple readouts from the modules field of view is termed the set of 4D voxels, or hypervoxels. The set of hypervoxels may be obtained by sending next PFF (Pulse Facet Flash), and observe state change from one time moment, $t_1$, to other time moment, $t_2$, where:

$$\Delta t = t_2 - t_1; t_2 > t_1 \tag{82}$$

Where, $\Delta t$ is time difference between those moments. Furthermore, multiple PFFs, in time moments: $t_1$, $t_2$, $t_3$, etc, (either periodically, or not) may be sent to build as large a hypervoxel space as desired. For simplicity of explanation, it is assumed that PFFs are sent periodically. However, the non-periodic case is a straightforward extension. In the periodic case:

$$\Delta t = t_2 - t_1 = t_3 - t_2 = t_4 - t_3 = \ldots \tag{83}$$

Previously, three voxel indices were employed: i, j, m, related to (x, y, z) coordinates, respectively. Now, four voxel indices are related to four voxel coordinates: (x, y, z, t), in the form:

$$(x,y,z,t)^{\nearrow} \cdot (i,j,m,k) \tag{84}$$

where index, k, where k=1, 2, 3, . . . , is related to new time coordinate, t, related to different PFFs, obtained from different time moments: $t_1$, $t_2$, $t_3$, etc.

Therefore, in the case of voxel change detection, Voxel Change Coherency (VCC) may be employed in the method. Voxel change coherence is determined in four-dimensional (4D) space (x, y, z, t), defined by Eq. (84), which is a kind of hyperspace.

The 4D voxels, or hypervoxels, are: elements, quants, or units of 4D space (x, y, z, y), characterizing voxel change coherency (VCC), in the form of indexing: (i, j, m, k), as described in Eq. (82-84). In this case, (x, y)-arc lateral pixel coordinates, z—is longitudinal voxel coordinate, and t—is (independent) time coordinate. In fact, there are two time coordinates: t, and t', the latter one being dependent (connected) time coordinate, connected with z-coordinate, by relation: 2z=ct' (t'-coordinate has, previously, been denoted by t). The sub-set of 4D hyperspace: (x, y, z, t) is called cross-section, and can be itself 3D space, or 2D space. Any subset of 4D space: (x, y, z, t), with constant one coordinate (such, as t, for example), is 3D space cross-section. The 3D voxels discussed above are related to 3D space cross-section: (x, y, z, $t_o$), in the form:

$$(x,y,z,t)/t=t_o=\text{CONSTANT} \quad (85)$$

i.e., for single, PFF (Pulse Facet Flash). Then, 4D hypervoxels are reduced to 3D voxels, quantizing space: (x, y, z).

In kinematics, the general movement of material point (a point object) is described by three (3) equations in 4D space (x, y, z, t), in the form:

$$x=x(t), y=y(t), z=z(t) \quad (86abc)$$

and, the momentary (instant) speed (velocity) vector, is $$\vec{v} = \lim_{\Delta t \to 0} \frac{\Delta \vec{r}}{\Delta t}; \vec{r} = \vec{r}(x, y, z) \quad (87ab)$$

where: $\vec{r}' = \vec{r}(x, y, z)$ is directional vector. Parametrically, the movement:

$$\vec{r} = \vec{r}(t) \quad (88)$$

where $\vec{r}$ is directional vector, v—its instant speed, and (x, y, z)—are its coordinates as functions of time, t. In the VCC case, this movement is described by four discrete coordinates: (x, y, z, t), indexed by: (i, j, k, m). Then, instead of momentary (instant) vector, $\vec{v}$, there is an almost momentary, or momentary-mean (MM) vector, $\vec{v}'$, which, further, will be denoted as, simply, $\vec{v}$, in the form of ratio of $\Delta \vec{r}$ and $\Delta t$:

$$\vec{v}' \Rightarrow \vec{v} = \frac{\Delta \vec{r}}{\Delta t}; \Delta \vec{r} = (\Delta x, \Delta y, \Delta z) \quad (89ab)$$

where, arrow shows changing of symbolics: from $\vec{v}'$ to $\vec{v}$.

The 4D resolution of material point movement, described by MM-velocity vector, $\vec{v}$, is characterized by pixel sizes: $a_x, a_y$, $\delta z$—longitudinal resolution, and time coordinate change, $\Delta t$.

In the lateral movement case, described by (x, y)-coordinate, and their indices: (i,j), the lateral resolving elements: $\delta_x$, and $\delta_y$, are derived from the following relations:

$$a_x=m_x\delta x; a_y=m_y\delta y \quad (90ab)$$

where: $m_x, m_y$ is x, y—IOS system magnification, or, rather de-magnification, because: $m_x \ll 1$, and $m_y \ll 1$.

In the longitudinal movement case, described by z-coordinate, the longitudinal resolving element, $\delta z$, is $$\delta z=(0.5)c\delta t_B \quad (91)$$

where: $\delta t_B = B^{-1}$, and, in ideal case: $\delta t_B = \delta t_L$, where B—photodetector bandwidth, and $\delta t_L$—laser pulse temporal length.

The time resolving element, $\Delta t$, is defined by Eq. (82). In summary, 4D resolution of 3D movement in hypervoxel space: (x, y, z, t), which is time-space, is defined by lateral, longitudinal, and time resolving elements:

$$(\delta x, \delta y, \delta z, \Delta t). \quad (92)$$

Therefore, MM-velocity vector resolution is also described by these four (4) resolving elements.

Figure 24:
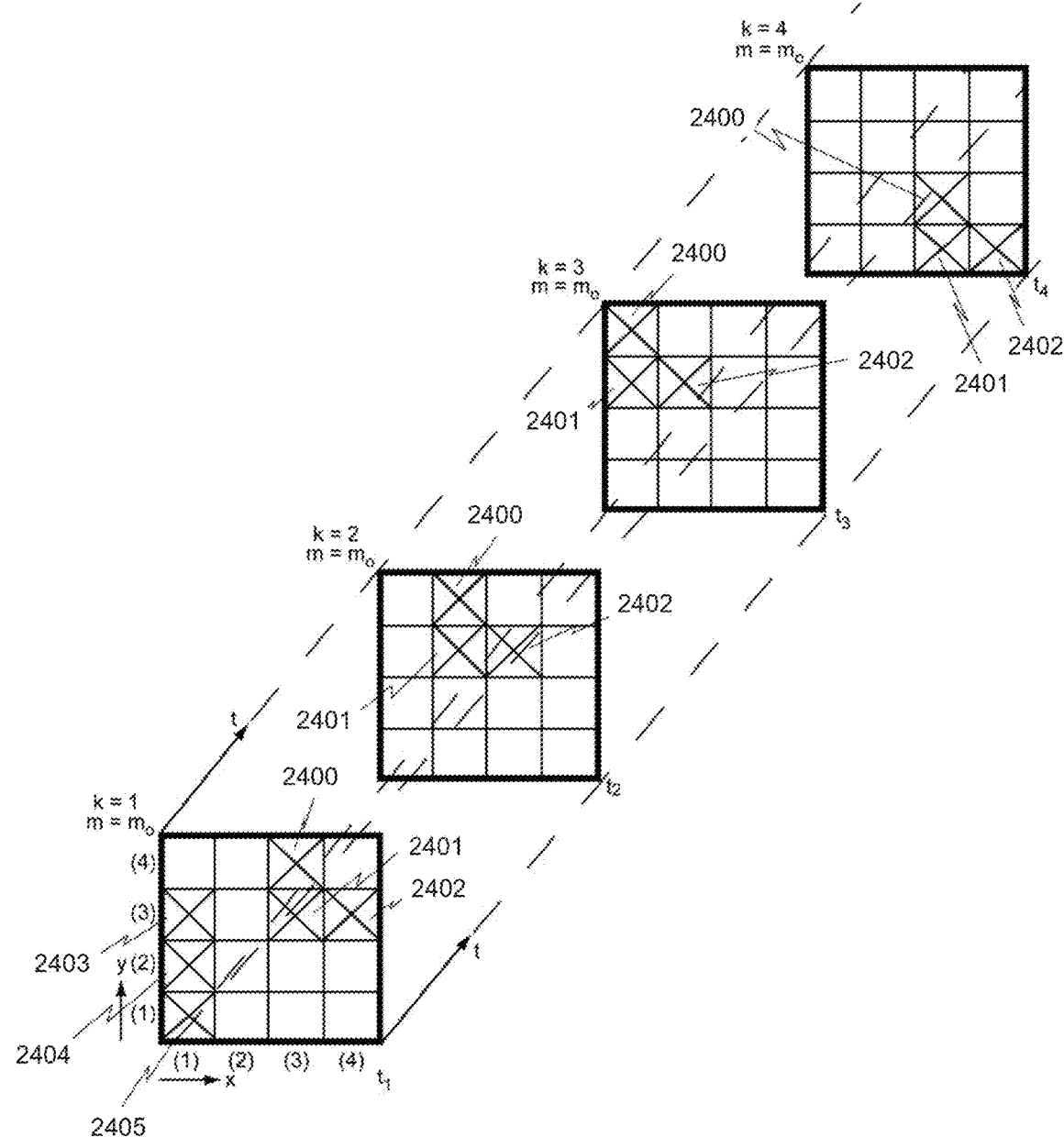
FIG. 24 illustrates an example of rigid foxel group movement.
Figure 25:
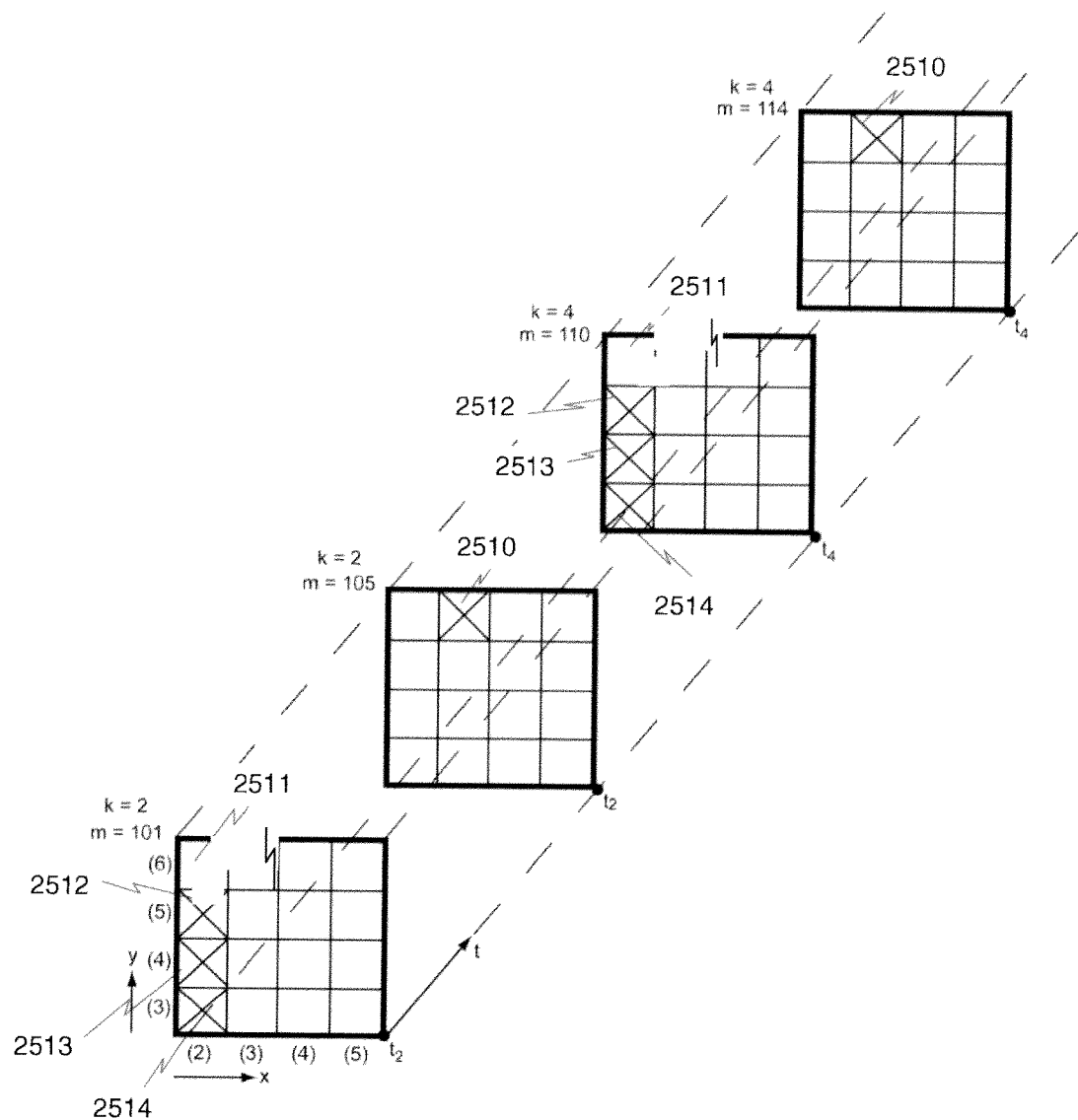
FIG. 25 illustrates a second example of rigid foxel group movement.
Figure 26:
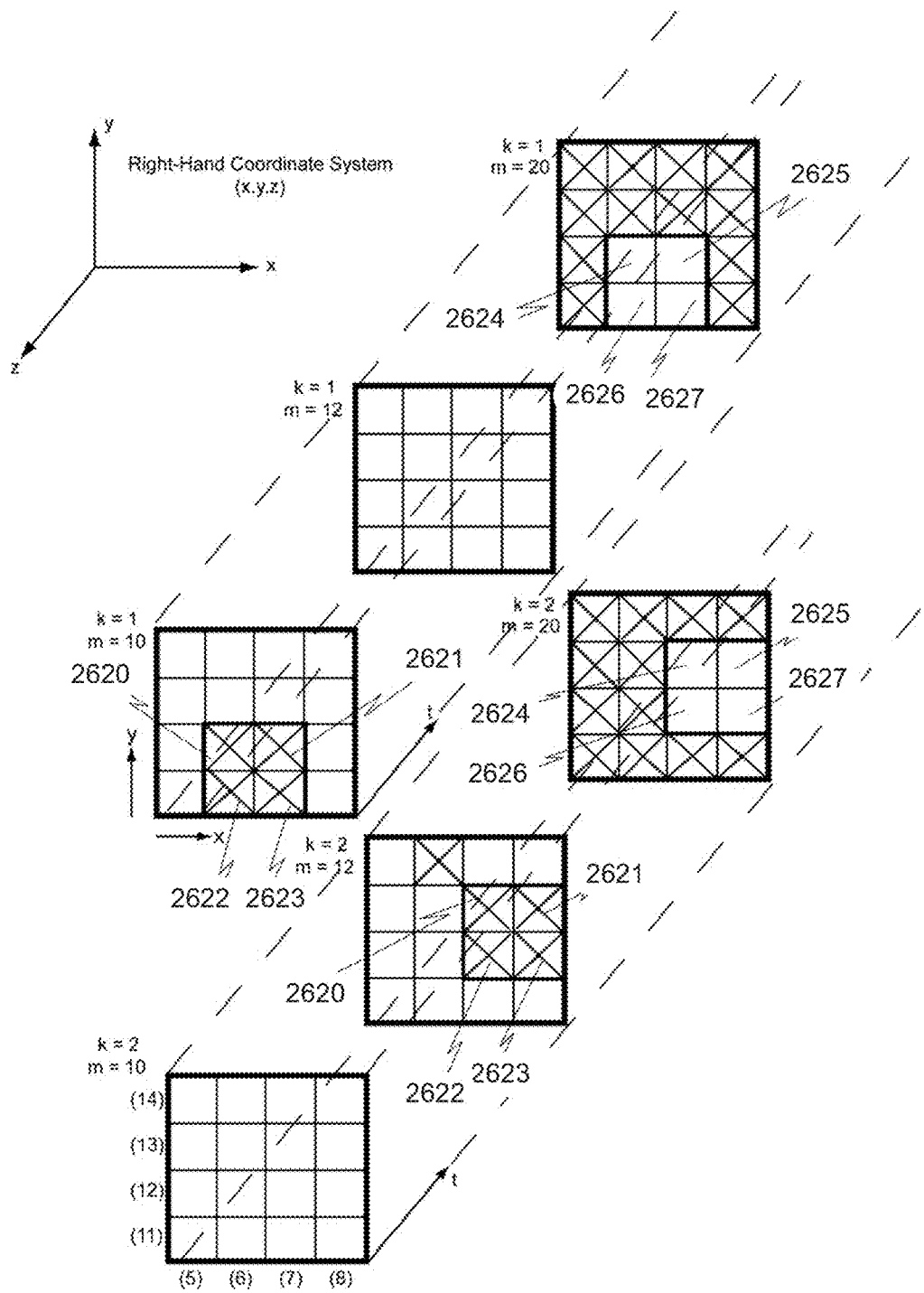
FIG. 26 illustrates an example of non-rigid foxel group movement.

When hypervoxels are introduced in step 1601, the analysis may comprise analyzing movement in the hypervoxel space. FIGS. 24-26 illustrate examples of movement in hypervoxel space.

The term foxel refers to a signal-filled voxel, while the empty voxel, "left" by this foxel, will be called a hole, resulting in foxel-hole pair. When the dynamic cases in time-space (x, y, z, t), foxel-hole pair movement (FH-Pair movement) will occur. Such FH-Pair movement can be either rigid, or elastic. In the 1st (rigid, solid state) case, the distance between foxel and hole remains constant at a time, t, while in the 2nd (elastic) case, this distance changes with time. FIG. 24 illustrates an example of rigid foxel group movement. Here, the 3D cross-section-set (CSS) is illustrated, for $m=m_o$=constant, and variable k-index for four k-values: k=1, 2, 3, 4.

Here, foxels 2400, 2401, and 2402 move rigidly. At $t=t_1$, these foxels have the following pixel (x, y)-locations: for 2400 (i=3, j=4); for 2401 (i=3, j=3); for 2402 (i=4, j=3). At $t=t_2$, these (i,j)-locations are: (2,4), (2,3), and (3,3)—respectively. At $t=t_3$, (or, k=3), the locations are: (1,4), (1,3), and (2,3). At $t=t_4$ (k=4), the locations are: (3,2), (3,1), and (4,1). Therefore, for this foxel rigid group, t first, i.e., for $t_1 \le t \le t_3$, the lateral movement from right to left, along x-coordinate which is decreasing, with the following MM-velocity vector:

$$\vec{v} = \vec{v}(v_x, 0, 0); v_x = -\frac{\delta x}{\Delta t}; \Delta t = t_2 - t_1 = t_3 - t_2 \quad (93abc)$$

where: $\delta x = a_x/m_x$, where $a_x$ is x-pixel size, and $m_x$ is system-de-magnification ($m_x \ll 1$). It should be emphasized that, in this particular PFF (Pulse Facet Flash) case, the absolute distance, z, from an object to platform is known (by measuring beam return time). For example, for z=1 km, and f=50 cm (focal length), we obtain: $m_x^{-1}$=(1 km)/(50 cm)=1000/0.5=2000, and $m_x$=1/2000=5·10$^{-4}$. Then, for $a_x$=20 μm, for example: $\delta x=a_x m_x^{-1}$=(2000) (20 μm)=(2000) (20·10$^{-4}$ cm)=4 cm; i.e., x-resolving element size is 4 cm. Then, for $\Delta t$=0.1 sec. for example:

$$|v_x|=v=(4 \text{ cm})/(0.1) \text{ sec}=40 \text{ cm/sec.} \quad (94)$$

Therefore, by this kind of "forensic" analysis, the system can determine an approximate speed of a given group of foxels: 2400, 2401, 2402. This foxel group represents some object with "L"-profile, as with sizes: $L_x, L_y$, where $L_x=L_y=L$, and $L=2\delta x=8$ cm. At $t=t_4$ (k=4), this foxel group suddenly move to the right-bottom corner. Therefore, for $t_3 \leq t \leq t_4$, its MM-velocity vector, $\vec{v}$, is $$\vec{v}=(v_x, v_y, 0); v_x = \frac{\Delta x}{\Delta t}, v_y = \frac{\Delta y}{\Delta t}; \Delta t = t_4 - t_3 \quad (95abcd)$$

where $\Delta x=3\delta x=12$ cm, $\Delta y=-|\Delta y|=-12$ cm, and, $$v = \frac{\sqrt{(\Delta x)^2 + (\Delta y)^2}}{\Delta t} \quad (96)$$

For example, for $\Delta t=0.1$ sec: v=(17 cm/0.1 sec=1.7 m/sec. In summary, at first, this L-object moves with 40 cm/sec-speed into opposite x-axis direction, and then, it moves, diagonally, into "south-east," with higher 1.7 m/sec-speed. Additionally, a $2^{nd}$ group of foxels: 2003, 2004, and 2005, which arrived at $t-t_1$ (k=1), and then, disappear from this set of voxels. Then, the system would search this group in other sets of voxels. Accordingly, during the analysis step, various foxel groups may be identified and tracked. Their movement patterns may be used for target identification.

FIG. 25 illustrates an example of rigid foxel-hole pair movement in a different projection of the hypervoxel space in two dimensions. This figure represents the rigid foxel-hole (FH)-pair that moves, longitudinally, with $\Delta m=9$ (between m=101 and m=110, for example), and $\Delta k=2$ (from k=2, to k=4). Assuming that: $\Delta t=t_4-t_2=1$ sec, for example, and $\delta z=10$ cm: $\Delta z=\Delta m\delta z=(9)(10$ cm)=90 cm; thus, the longitudinal speed of this pair is: 90 cm/sec. The FH-pair is rigid, because, a longitudinal distance between foxel 2510, and its "hole" 2511 is constant ($\Delta m'=4$, between m=105 and m=101, or, between m=114 and m=110). Also, the integrated clutter (RIC), marked by foxels: 2512, 2513, and 2514, is at the constant distance from foxel 2510, confirming that the FH-pair is rigid, indeed.

FIG. 26 illustrates an example of non-rigid Foxel-Hole (FH) Pair movement, FIG. 26 includes two diagonal columns, indexed by k=1, and k=2, respectively. The (identical) 2D-cross-sections of lateral (x, y)-pixels are only shown (six of them), with indices: i=5, 6, 7, 8; and j=11, 12, 13, 14. The $1^{st}$ diagonal column (k=1) is represented by three (3) 2D lateral cross-section-sets (CSS), indexed by m=10, 12, and 20. The same m-indices (10, 12, 20) are representing the $2^{nd}$ column (k=2). Of course, k=1 represents earlier time than k=2, as illustrated by the direction of t-axis. The foxel-group of four (4) foxels, marked by: 2620, 2621, 2622, 2623, is moving through the following (i, j, m, k)-transformation; related to foxels: 2620, 2621, 2622, 2623:

$$\{i, j, m, k\}: \begin{Bmatrix} 6, 12, 10, 1 \\ 7, 12, 10, 1 \\ 6, 11, 10, 1 \\ 7, 11, 10, 1 \end{Bmatrix} \Rightarrow \begin{Bmatrix} 7, 13, 12, 2 \\ 8, 13, 12, 2 \\ 7, 12, 12, 2 \\ 8, 12, 12, 2 \end{Bmatrix} \quad (97)$$
Column k=1    Column k=2

The hole-group of four (4) holes, marked by: 2624, 2625, 2626, 2627, is moving through the following (i, j, m, k)-transformation:

$$\{i, j, m, k\}: \begin{Bmatrix} 6, 12, 20, 1 \\ 7, 12, 20, 1 \\ 6, 11, 20, 1 \\ 7, 11, 20, 1 \end{Bmatrix} \Rightarrow \begin{Bmatrix} 7, 13, 20, 2 \\ 8, 13, 20, 2 \\ 7, 12, 20, 2 \\ 8, 12, 20, 2 \end{Bmatrix} \quad (98)$$
Column k=1    Column k=2

Comparing Eq. (97) and (98), both foxels and holes have the same lateral (i, j)-indices for both columns: k=1 and k=2. For example, for the $1^{st}$ column (k=1), the foxel 2620, and its hole 2624, have the same indices: (6, 12); the same with k=2, where this FH-pair has indices (7, 13). However, their longitudinal m-indices are different: 10 vs. 20, for the 1st column, and 12 vs. 20, for the $2^{nd}$ column.

Therefore, this FH-pair is elastic one. Also, crossed voxels (foxels) in 2D CSS, denoted by k=1 and m=20, as well as in 2D CSS, with k=2, m=20, represent the RIC (Reference Integrated Clutter), because, their m-index does not change (m=20=constant). In contrast, the foxels in 2D CSS, represented by (m, k)=(10, 1), and (m, k)=(12, 2)nge their longitudinal position. Thus, they represent a moving object, while the RIC represents only its (moving) (x, y)-projection. Accordingly, systems may detect reference clutter signals (e.g., perform step 1602 of FIG. 16) by performing hypervoxel analyses.

The moment of the object represented by foxels: 2620, 2621, 2622, 2623, has an MM-velocity vector, $\vec{v}$, with all three non-zero coordinates: $\vec{v}=(v_x, v_y, v_z)$. For example, for $\Delta t$-representing time difference from k=1 to k=2, equal to: $\Delta t=1$ sec, and for lateral resolving element: $\delta x=\delta y=10$ cm, its x-movement is represented by $\Delta i=1$, only (e.g., from i=6, to i=7). Therefore:

$$v_x = \frac{\Delta x}{\Delta t} = \frac{\delta x}{\Delta t} = 10 \text{ cm/sec} \quad (99)$$

Same with y-movement ($\Delta j=1$); thus, also:

$$v_y=v_x=10 \text{ cm/sec} \quad (100)$$

In order to estimate its longitudinal movement, $\Delta m=2$ (from m=10, to m=12). Thus, according to the orientation of right-hand (x, y, z)-coordinate system its:

$$\Delta z=-2\delta z \quad (101)$$

and, for $\delta z=20$ cm, for example:

$$v_z=-20 \text{ cm/sec} \quad (102)$$

Accordingly its velocity vector is:

$$\vec{v}=(10 \text{ cm/sec}, 10 \text{ cm/sec}, -20 \text{ cm/sec}) \quad (103)$$

The object with size ($2\delta x$, $2\delta y$) has a velocity vector, described by Eq. (103). Its movement is represented by (i, j, m, k)-discrete coordinates (indices) through transformation from column (k=1) table to column (k=2) table, as in Eq. (97), while its lateral (x, y)-projection, represented by RIC (Reference Integrated Clutter), moves through transformation of tables in Eq. (98). However, the specific MM-velocity vector values can be found only when the 4D resolution is known, represented by four (4) resolving elements: $\delta x$, $\delta y$, $\delta z$, and $\Delta t$.

In some implementations, the hypervoxel analysis may be used to perform detection without the use of reference clutter signals.

An example of a detection and analysis method is described with reference to FIG. 27. For sake of TOI extraction from RIC, the system performs a technique based on use of a RISC processor array, assuming hyper-voxel 4D space, by voxel-by-voxel 3D frame comparison (subtraction) at two different times $t_1$ and $t_2$. Additionally, the RISC array may perform a 3D frame virtual translation by shift register. The $1^{st}$ operation is for 3D velocity flow mapping, while the $2^{nd}$ operation is for the COI contour extraction. Both operations are possible, however, only the $1^{st}$ operation is discussed here, for simplicity.

As an example, a 100×100 photodetector array, per facet; thus, for 100-facets per second, the frame has: 100×100×100=$10^6$-pixels. Additionally, with gating there is also signal return z-coordinate. Assume long-range IOS geometry, as in FIGS. 3 and 4. Then, for typical facet angular acceptance of 0.4°-per facet, and marine platform with 50 m—mast, and R=10 km—nominal distance, vertical coverage is of distances between R=5 km and R=15 km. Therefore, for single facet, the $1^{st}$ pulse arrives from R=5 km distance, and the last one from R=15 km distance. Assuming laser pulse length, $\tau_L$, =10 nsec=$10^{-8}$ sec, the average number of temporal cells, $N_t$, is $$N_t = \frac{\Delta R}{c \cdot \tau_L} = \frac{10 \text{ km}}{(3 \cdot 10^5 \text{ km/sec})(10^{-8} \text{ sec})} = \left(\frac{1}{3}\right)(10^{-4})(10^8) \cong 3000 \quad (104)$$

Then, the total number of parallel voxels, is $$n_{3D} = (10^6)(3 \cdot 10^3) = 3 \cdot 10^9 \quad (105)$$

Using a 200 MHz-speed 256-RISC processor array, with total RISC operation time of 4 msec per 8.3 Mb-parallel pixels as an example, for $3 \cdot 10^9$—number of parallel calculations, this time, $t_{RISC}$, is $$t'_{RISC} = (4 \text{ msec}) \left(\frac{3 \cdot 10^9}{8.3 \cdot 10^6}\right) = \left(\frac{12}{8.3}\right) \text{ sec} = 1.45 \text{ sec.} \quad (106)$$

In this method, further the system identifies all COIs, by using virtual 3D frame shift. Then, the system attaches a velocity vector to each COI, by using voxel-by-voxel comparison, and Euclidean distance computing, using RISC processor array. Then, Cluster Voxel Velocity (CV2) flow mapping, or CV2-flow mapping, may be obtained as in FIG. 27.

Figure 27:
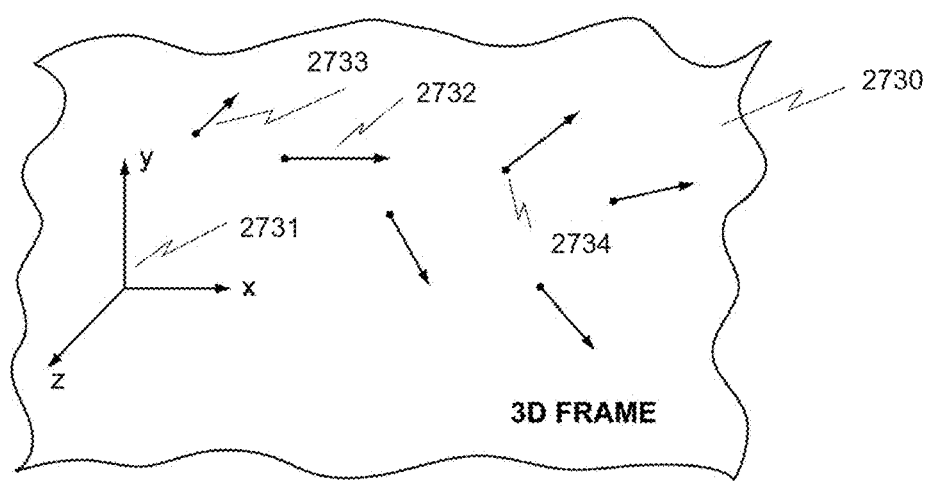
FIG. 27 illustrates an example of velocity flow mapping.

In FIG. 27 a portion 2730 of a cluster voxel velocity (CV2) flow mapping, or, shortly, CV2-flow mapping of COIs is illustrated, by comparing two 3D voxel frames, at times $t_1$ and $t_2$, in (x,y,z)-coordinate system 2731; i.e., this illustration is in 3D, not in 2D. In this example, one velocity vector 2732 is longer than another one 2733. This is because the vector module 2732 is larger than vector value 2733. The dot 2734 denotes the COI-location. By using more such time-comparisons: $t_2$ vs. $t_1$, $t_3$ vs. $t_2$, etc., and using the velocity formulas, the system can determine and analyze the kinematics of these clusters; and, then, make recognition between TOIs and RICs. For the velocities of sea wave spikes, at littoral waters, for example, they are rather random in value and direction, in contrast to those of ships which are rather regular, in both value and direction. Also, such static RICs as rocks, for example, will have zero-velocities. Accordingly, this movement may be used as an additional signature for distinction between TOIs and RICs.

The system and methods detailed above can be applied to other applications then those reflected to marine augmented target with high brightness in retro-reflection. In other words, those targets do not need to be reflective non-Lambertian (RNL) ones only, especially when shorter distances are included. Also, since the VC is based on general integrated reference reflection clutter (IRRC), the IRRC does not need to be sea waves, but, also flat, or folded ground, for example.

Figure 28:
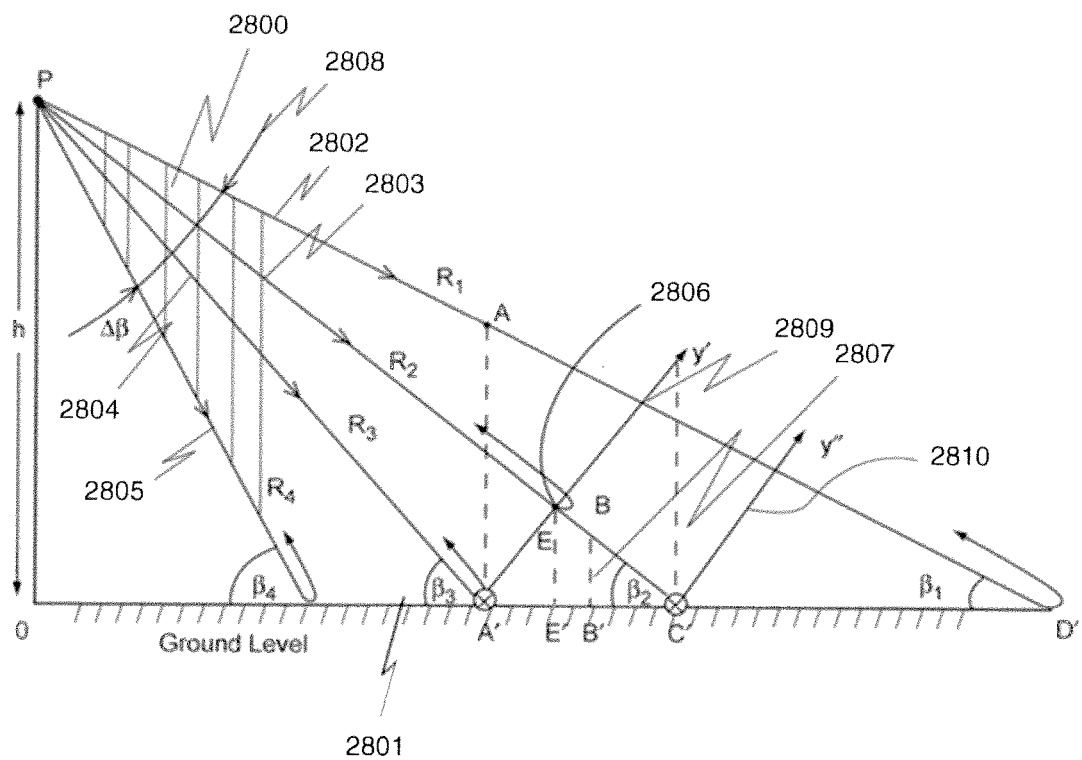
FIG. 28 illustrates an example system implementation for trip-wire detection.

One such application is the detection of a tripwire above ground. In such a case, such low-contrast (e.g., plastic) trip-wire can be almost invisible to human eye. In this case, the reference clutter signal can result from the ground behind such a wire, as shown in FIG. 28. In this figure, the pulse facet flash (PFF) detection of such trip-wire is shown, using the ground level as IRRC, for example. The PFF vertical cross-section is marked by crossed-area 2800. The PFF is illuminating some ground region, 2801, shown as flat one, for simplicity, and the incident rays, 2802, 2803, 2804, and 2805, are reflected (returned) at some points such as A', B', C', and D', where points A', C', and D' are located on the ground, while point B is the point located above the ground, possibly a target. If this target is the wire cross-section, with wire direction perpendicular the figure; then it is single-point, B, marked as 2806. Otherwise, at skew position, the wire will be represented by some line. The broken line 2807 shows that there is no connection, at this point, between point B, and its ground projection, B'.

In order to explain some quantitative parameter values, a reference geometry is introduced, assuming, for example, OA'=50 m, and OD'=100 m. In order to calculate, unknown B'C-distance, as an example: h=3 m, and BB'=20 cm (marked by 2807). Then, the unknown B'C-value, denoted as, w, can be estimated from the following trigonometric similarly relation:

$$\frac{h}{OC'} = \frac{BB'}{B'C'}; OC' = OB' + B'C' \quad (107)$$

Assuming typical BB'-value of 10 cm, Eq. (72) becomes (w=B'C):

$$\frac{h}{OB' + w} = \frac{BB'}{w} \quad (108)$$

Solving this equation, in respect to unknown: w-value, where: h=3 m, BB'=10 cm, OB'=70 m (so, A'B'=20 m): w=B'C'=2.4 m.

In order to identify target, B, as a wire, however, vertical voxel coherency (VVC) is used. Still further confirmation will be provided by horizontal voxel coherency (HVC). Therefore, the 2D photodetector pixel array (or, 2D PPA) is preferable. 2D PPA with moderate 60×40-pixel resolution is assumed for sake of simplicity of explanation. First, horizontal pixel resolution for single facet, with typical narrow FOV=3° is estimated. Then, at 100 m-distance, the horizontal range is about 10.5 m; thus, horizontal object resolving element is: (105 cm)/(60)=1.75 cm. For simplicity, vertical angular size of the PPF is assumed to be similar to that of horizontal; i.e., $\Delta\beta$=6°, marked as 2808.

Another example of system generalization is the changes in soil density. Changes in density in highly-porous soils (e.g., highly-humid, or poorly settled dirt) that be partially penetrated by high pulse-power IR-beam may be detected.

Assuming: 10 MW-pulse optical power and super-high-sensitivity of photodetector array, with noise equivalent power of 0.1 pW, for example, extremely high detection dynamic range of $10^7/10^{-13}=10^{20}=200$ dB is obtained. In this application, voxel temporal resolution is also high, with $\delta z=100$ μm=0.1 mm, for example. Then, laser pulse temporal length, $\delta t$, must be 0.67 psec obtained from relation: $\delta z=(0.5)c\cdot\delta t$, or $0.67\cdot 10^{-12}$ sec. In such a case, from voxel distance, the soil penetration profile:

$$z=z(x,y) \qquad (109)$$

The profile varies with internal structure, modified by, perhaps man-made modification, either by introducing more humidity, or by digging in ground. The profile; $z=z(x,y)$, is obtained from photodetector pixel structure, while longitudinal resolution is defined by $\delta z$-value which is proportional to laser pulse length, $\delta t$.

Figure 29:
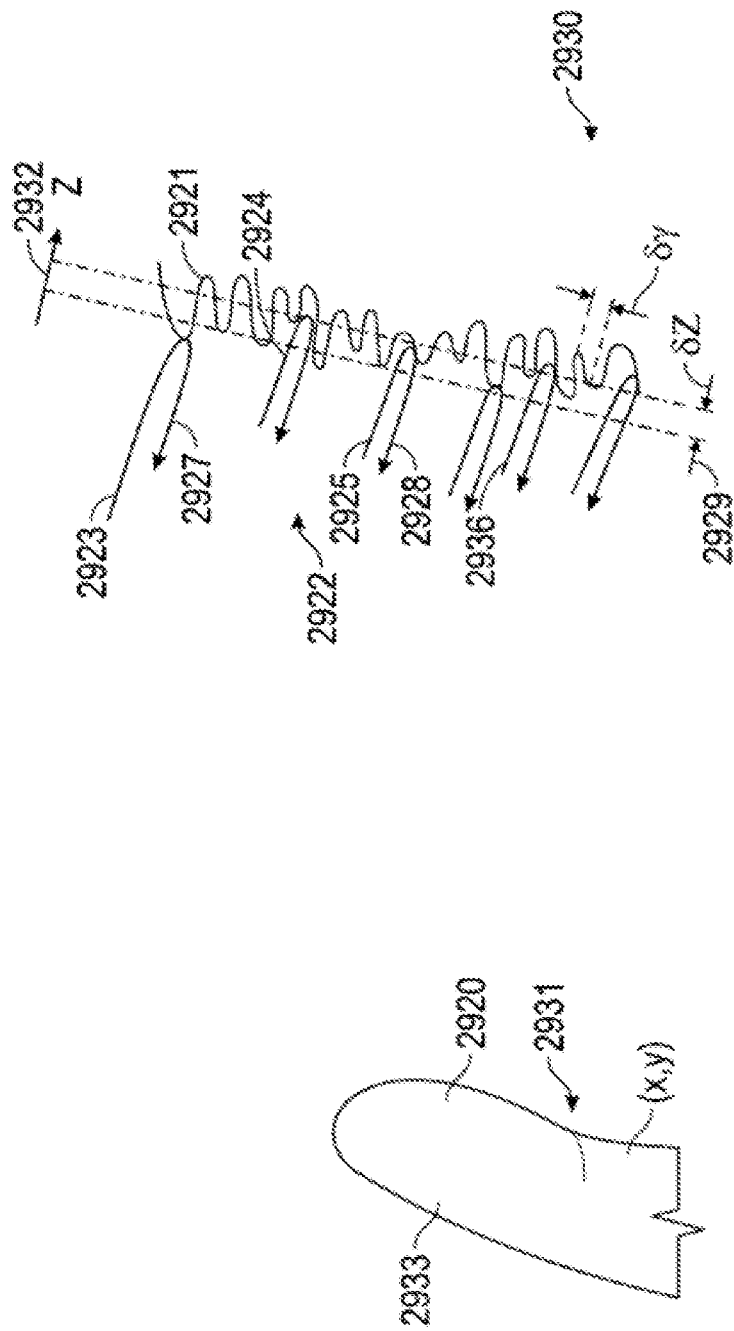
FIGS. 29A-B illustrate an example system implementation for fingerprint detection.

A third additional application is the detection of fingerprints. The applied laser pulse beam has a pulse length, $\delta t$, and equivalent longitudinal resolution, $\delta z$, defined by relation: $\delta z=(0.5)c\delta t$. Additionally, eye-safe infrared beams may be used with wavelengths of greater than 1.3 or 1.5 μm. In FIGS. 29A-B, the finger papillary lines are shown, marked as 2920, and the finger-print cross-section profile 2921, is shown in including the PFF, 2922, represented by incident rays 2923, 2924, 2925, 2926 and their reflected rays 2927, 2928. If the laser pulse longitudinal resolution, $\delta z$, or 2929 is sufficiently high, the reflected rays 2927 and 2928 will belong to different voxels. In such case, if also vertical pixel resolution, $\delta y$, or 2930, is sufficiently high then three dimensional (x,y,z)-mapping of finger prints, such as (x,y), or 2931 is obtained. As a result, by using standard software, we can obtain the finger print profile, where z-axis is marked as 2932, while (x,y)-mapping is marked as 2931. Then, by using the second standard finger-print software, we can find all characteristic fiducial markings, such as 2933, for example, and, as a result, reconstruct whole finger characteristic.

Since, for typical finger print profile sizes, $\delta z\sim200$-400 μm, and $\delta y\sim300$ μm, the system comprises a pixel array zoomed on finger-region. Thus, for typical rather small pixel-numbers, for such long wavelengths (~1.5 μm), in the range: 60×40, for example, the system employs a second standard camera, in order to find region of interest (ROI), which is human hand with visible finger prints, we need to either manually, or automatically, find the ROI. In the latter case, the system applies some standard pattern recognition algorithm.

A further application may be the detection of objects under the ground. Here, the system applies soil profilimetry in connection with detection of trip wires described with respect to FIG. 28.

Figure 30:
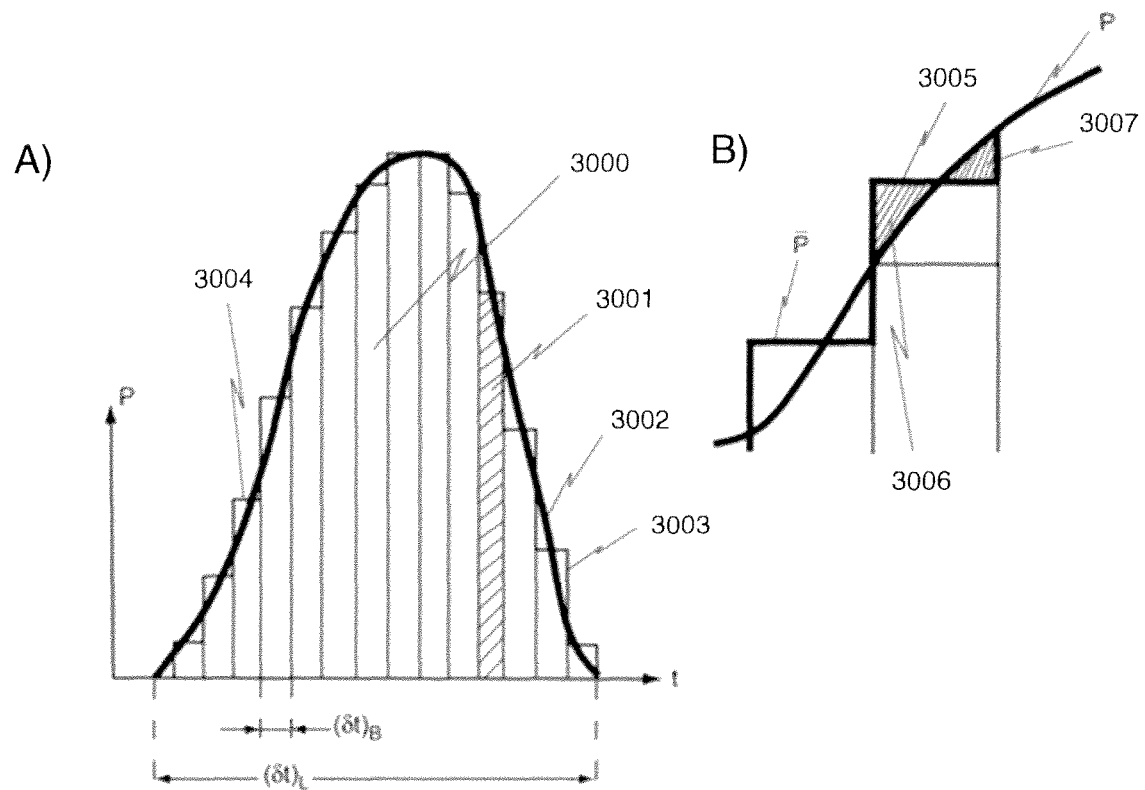
FIGS. 30A-B illustrate an example of pulse partition sampling.

As described above, various application time gate the sensor to provide voxel readouts. In some embodiments, the time gating may be performed at a faster rate to sample the reflected laser pulses. This may be used to provide pulse partition voxel coherency (PPVC), related to laser pulse partition/sampling as shown in FIGS. 30A-B. The laser pulse 3000, with pulse temporal length, $(\delta t)_L$, is sampled, with sampling constant $(\delta t)_B$, and temporal samples 3001 (crossed area). As a result, the continuous instant power, P, line 3002, is replaced by discrete, "stairs"—line 3003, characterized by Momentary/Mean-power, $\overline{P}$, 3004. This laser pulse partition/sampling process is shown with continuous instant/momentary power, P, and discrete, momentary-mean (M2)-power, $\overline{P}$. Here sampling 3005 is performed such that areas 3006 and 3007 are equal. (This procedure is similar to Riemann-limit integration, for mathematical integrals.) M2-power, power values, $\overline{P}$, are those measured by photodetector gating process, with photodetector pixel bandwidth, B, where $$B=\frac{1}{(\delta t)_B}; (\delta t)_B<(\delta t)_L \qquad (110)$$

where $(\delta t)_L$ is laser pulse temporal length, previously denoted as $(\delta t)$. Of course, when $(\delta t)_B\rightarrow 0$ (or, B→∞), then, the discrete M2-power line 3003, becomes continuous (analog) line 3002.

It should be noted that the analog instant (optical) power line 3002 can be only measured as discrete M2-power line 3003, while inequality (Eq. 110) can be written as:

$$(\delta t)_B = \frac{(\delta t)_L}{m} \qquad (111)$$

where m is integer: m=1, 2, 3, . . . . For example, for pulse length: $(\delta t)_L$=10 nsec=$10^{-8}$ sec, and m=10, $(\delta t)_B$=1 nsec=$10^{-9}$ sec, and, according to Eq. (77), B=1 GHz.

Such pulse sampling allows the system to measure reflected pulses, with higher precision than, without sampling. For example, if soil penetration depth is equal to:

$$\Delta z=k(\delta z)_B; k=1,2,3,\ldots \qquad (112)$$

where $(\delta t)_B$ is voxel resolving element, determined by relation:

$$2(\delta z)_B=(C/n)(\delta t)_B \qquad (113)$$

where C is light speed in air, and n—soil refractive index; then, reflected pulse will be deformed, respectively.

Figure 31:
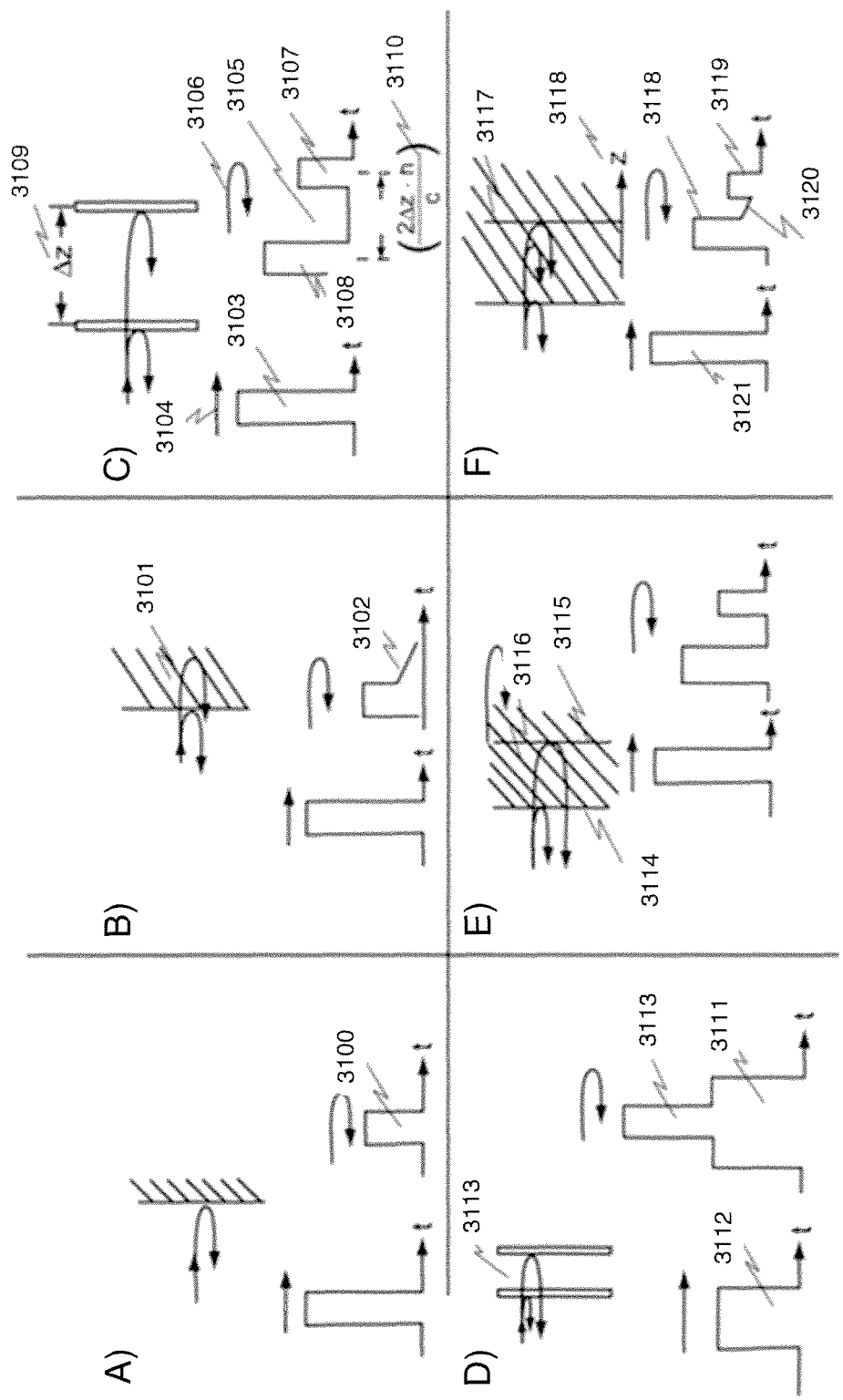
FIGS. 31A-F illustrate detection of pulse reflection deformation by various surfaces.

Various targets may be detected according to their temporal signatures of reflected pulse and related pulse partition voxel coherency (PPVC), which is a generalization of voxel coherency (VC). For sake of explanation rectangular pulse are illustrated instead of analog (Gaussian) pulse. Then, the reflected pulse from hard interface, as in FIG. 31A, will be (almost) un-deformed, 3100, while pulse reflected also from soft interface, 3101 as in FIG. 31B, will have tail, 3102. In FIG. 31C, the reflection from partially-transparent two hard interfaces is shown, with incident pulse, 3103, marked by left-to right arrow, 3104, is shown, including reflected pulse, 3105, marked by right-to-left arrow, 3106. $2^{nd}$ reflected pulse, 3107, is lower than the $1^{st}$ reflected pulse, 3108, with separation, $\Delta z$, denoted as 3109, and its equivalent temporal separation, equal to: $(2\Delta z\cdot n)/c$, marked as 3110. In FIG. 31D, the reflected pulse signature 3111, is shown, versus incident pulse, 3112, out of scale, for closer separation, 3113. Then, the reflected pulse signature has an extra top addition, 3113, assuming incoherent superposition (beam intensities, not amplitudes, are added). In FIG. 31E, the reflection from two hard interfaces, 3114 and 3115, is shown, with attenuation in region 3116, without reflection from soft interface, however. This is, because we assume that there is no reflection/scattering centers, in region 3116. In contrast, in FIG. 31F, such centers exit in soft interface region, 3117. As a result, in addition to two strong reflection signatures, 3118 and 3119, we have also weak reflection tail, 3120.

Figure 32:
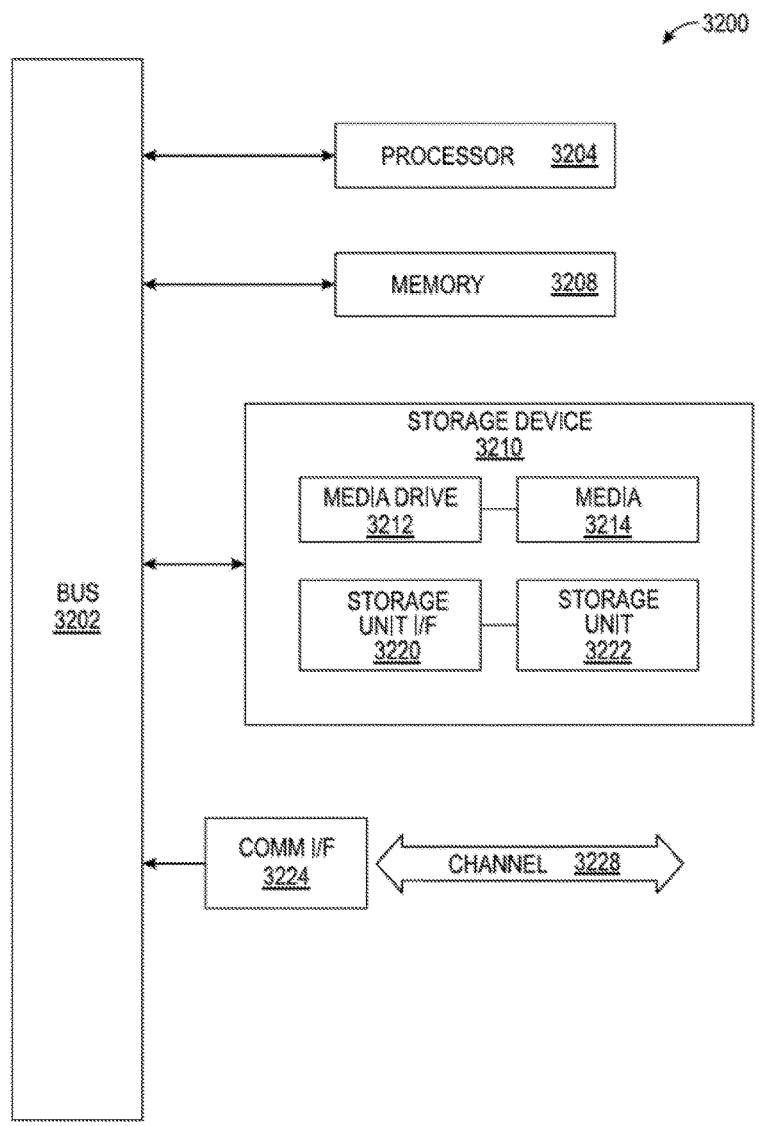
FIG. 32 illustrates an example computing module that may be used in implementing various features of embodiments of the invention.

As used herein, the term module might describe a given unit of functionality that can be performed in accordance with one or more embodiments of the present invention. As used herein, a module might be implemented utilizing any form of hardware, software, or a combination thereof. For example, one or more processors, controllers, ASICs, PLAs, PALs, CPLDs, FPGAs, logical components, software routines or other mechanisms might be implemented to make up a module. In implementation, the various modules described herein might be implemented as discrete modules or the functions and features described can be shared in part or in total among one or more modules. In other words, as would be apparent to one of ordinary skill in the art after reading this description, the various features and functionality described herein may be implemented in any given application and can be implemented in one or more separate or shared modules in various combinations and permutations. Even though various features or elements of functionality may be individually described or claimed as separate modules, one of ordinary skill in the art will understand that these features and functionality can be shared among one or more common software and hardware elements, and such description shall not require or imply that separate hardware or software components are used to implement such features or functionality.

Where components or modules of the invention are implemented in whole or in part using software, in one embodiment, these software elements can be implemented to operate with a computing or processing module capable of carrying out the functionality described with respect thereto. One such example computing module is shown in FIG. 32. Various embodiments are described in terms of this example-computing module 3200. After reading this description, it will become apparent to a person skilled in the relevant art how to implement the invention using other computing modules or architectures.

Referring now to FIG. 32, computing module 3200 may represent, for example, computing or processing capabilities found within desktop, laptop and notebook computers; hand-held computing devices (PDA's, smart phones, cell phones, palmtops, etc.); mainframes, supercomputers, workstations or servers; or any other type of special-purpose or general-purpose computing devices as may be desirable or appropriate for a given application or environment. Computing module 3200 might also represent computing capabilities embedded within or otherwise available to a given device. For example, a computing module might be found in other electronic devices such as, for example, digital cameras, navigation systems, cellular telephones, portable computing devices, modems, routers, WAPs, terminals and other electronic devices that might include some form of processing capability.

Computing module 3200 might include, for example, one or more processors, controllers, control modules, or other processing devices, such as a processor 3204. Processor 3204 might be implemented using a general-purpose or special-purpose processing engine such as, for example, a microprocessor, controller, or other control logic. In the illustrated example, processor 3204 is connected to a bus 3202, although any communication medium can be used to facilitate interaction with other components of computing module 3200 or to communicate externally.

Computing module 3200 might also include one or more memory modules, simply referred to herein as main memory 3208. For example, preferably random access memory (RAM) or other dynamic memory, might be used for storing information and instructions to be executed by processor 3204. Main memory 3208 might also be used for storing temporary variables or other intermediate information during execution of instructions to be executed by processor 3204. Computing module 3200 might likewise include a read only memory ("ROM") or other static storage device coupled to bus 3202 for storing static information and instructions for processor 3204.

The computing module 3200 might also include one or more various forms of information storage mechanism 3210, which might include, for example, a media drive 3212 and a storage unit interface 3220. The media drive 3212 might include a drive or other mechanism to support fixed or removable storage media 3214. For example, a hard disk drive, a floppy disk drive, a magnetic tape drive, an optical disk drive, a CD or DVD drive (R or RW), or other removable or fixed media drive might be provided. Accordingly, storage media 3214 might include, for example, a hard disk, a floppy disk, magnetic tape, cartridge, optical disk, a CD or DVD, or other fixed or removable medium that is read by, written to or accessed by media drive 3212. As these examples illustrate, the storage media 3214 can include a computer usable storage medium having stored therein computer software or data.

In alternative embodiments, information storage mechanism 3210 might include other similar instrumentalities for allowing computer programs or other instructions or data to be loaded into computing module 3200. Such instrumentalities might include, for example, a fixed or removable storage unit 3222 and an interface 3220. Examples of such storage units 3222 and interfaces 3220 can include a program cartridge and cartridge interface, a removable memory (for example, a flash memory or other removable memory module) and memory slot, a PCMCIA slot and card, and other fixed or removable storage units 3222 and interfaces 3220 that allow software and data to be transferred from the storage unit 3222 to computing module 3200.

Computing module 3200 might also include a communications interface 3224. Communications interface 3224 might be used to allow software and data to be transferred between computing module 3200 and external devices. Examples of communications interface 3224 might include a modem or softmodem, a network interface (such as an Ethernet, network interface card, WiMedia, IEEE 802.XX or other interface), a communications port (such as for example, a USB port, IR port, RS232 port Bluetooth® interface, or other port), or other communications interface. Software and data transferred via communications interface 3224 might typically be carried on signals, which can be electronic, electromagnetic (which includes optical) or other signals capable of being exchanged by a given communications interface 3224. These signals might be provided to communications interface 3224 via a channel 3228. This channel 3228 might carry signals and might be implemented using a wired or wireless communication medium. Some examples of a channel might include a phone line, a cellular link, an RF link, an optical link, a network interface, a local or wide area network, and other wired or wireless communications channels.

In this document, the terms "computer program medium" and "computer usable medium" are used to generally refer to media such as, for example, memory 3208, storage unit 3220, media 3214, and channel 3228. These and other various forms of computer program media or computer usable media may be involved in carrying one or more sequences of one or more instructions to a processing device for execution. Such instructions embodied on the medium, are generally referred to as "computer program code" or a "computer program product" (which may be grouped in the form of computer programs or other groupings). When executed, such instructions might enable the computing module 3200 to perform features or functions of the present invention as discussed herein.

While various embodiments of the present invention have been described above, it should be understood that they have been presented by way of example only, and not of limitation. Likewise, the various diagrams may depict an example architectural or other configuration for the invention, which is done to aid in understanding the features and functionality that can be included in the invention. The invention is not restricted to the illustrated example architectures or configurations, but the desired features can be implemented using a variety of alternative architectures and configurations. Indeed, it will be apparent to one of skill in the art how alternative functional, logical or physical partitioning and configurations can be implemented to implement the desired features of the present invention. Also, a multitude of different constituent module names other than those depicted herein can be applied to the various partitions. Additionally, with regard to flow diagrams, operational descriptions and method claims, the order in which the steps are presented herein shall not mandate that various embodiments be implemented to perform the recited functionality in the same order unless the context dictates otherwise.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A target detection subsystem, comprising:
 a pseudoimaging detection optics subsystem for detecting a target object by discriminating between the target object and clutter;
 an image sensor coupled to the pseudoimaging detection optics subsystem;
 a detector electronics subsystem coupled to the image sensor for increasing the size of a target signal in relation to the reference clutter signal to determine whether the target object is detected;
 a detection processor coupled to the detector electronics subsystem; and
 wherein the pseudoimaging detection optics subsystem does not meet a Rayleigh resolution criteria for a predetermined target type at a predetermined detection range.

2. The target detection subsystem of claim 1, wherein the detector electronics comprises a RISC array.

3. The target detection subsystem of claim 2, wherein the RISC array comprises a plurality of RISC processors, with each RISC processor coupled to a plurality of photodetectors of the image sensor.

4. The target detection subsystem of claim 3, wherein each RISC processor is configured to perform novelty filtering on signals received from its respective coupled photodetector.

5. The target detection subsystem of claim 1, wherein the image sensor comprises an array of photodetectors.

6. The target detection subsystem of claim 1, further comprising an optical filter coupled to the detection optics.

7. The target detection subsystem of claim 1, wherein pseudoimaging detection optics subsystem produces a circle of confusion that spans a blank space between adjacent photodetectors of the image sensor.

8. A target detection system, comprising:
 a pseudoimaging detection optics subsystem;
 a first detection subsystem comprising a first photodetector array coupled to receive an optical signal from the detection optics and first detector electronics coupled to the first photodetector array;
 a second detection subsystem comprising a second photodetector array coupled to receive an optical signal from the detection optics and second detector electronics coupled to the second photodetector array; and
 a detection processor coupled to receive data from the first and second detector electronics and configured to determine if a target is detected;
 wherein the first detection subsystem is configured to detect a target signal and the second detection subsystem is configured to detect a reference clutter signal, and the detection processor is configured to evaluate the target signal in relation to the reference clutter signal to determine whether a target is detected;

wherein the second detection subsystem further comprises a pupil configured to control an effective aperture of the second detection subsystem.

9. The target detection system of claim 8, wherein the pupil is configured to be adjusted to reduce or eliminate false signals that do not have correlative clutter.

10. The target detection system of claim 8, wherein pixel sizes of the first and second photodetector arrays are chosen so that a power attained by the first detection subsystem is equal to or within a predetermined range of the power attained by the second detection subsystem.

11. The target detection system of claim 10, wherein a pixel size used in the second photodetector array is larger than a pixel size used in the first photodetector array.

12. The target detection system of claim 10, wherein pixels in the second photodetector array are clustered together in groups to form a larger effective pixel size.

13. The target detection system of claim 10, wherein power is increased in the second detection subsystem by increasing a linear pixel size in the photodetector array, reducing the f value of the second detection subsystem, or both.

\* \* \* \* \*